United States Patent [19]
Ohtsuka et al.

[11] Patent Number: 5,840,809
[45] Date of Patent: Nov. 24, 1998

[54] EPOXIDIZED BLOCK COPOLYMER, ITS PRODUCTION, AND ITS COMPOSITION

[75] Inventors: Yoshihiro Ohtsuka; Yasuhiro Oshino; Masaki Tanaka, all of Hiroshima, Japan

[73] Assignee: Daicel Chemical Industries, Ltd., Osaka, Japan

[21] Appl. No.: 793,710

[22] PCT Filed: Jul. 3, 1996

[86] PCT No.: PCT/JP96/01843

§ 371 Date: Mar. 3, 1997

§ 102(e) Date: Mar. 3, 1997

[87] PCT Pub. No.: WO97/02296

PCT Pub. Date: Jan. 23, 1997

[30] Foreign Application Priority Data

| Jul. 3, 1995 | [JP] | Japan | 7-191230 |
| Sep. 1, 1995 | [JP] | Japan | 7-248450 |
| Sep. 28, 1995 | [JP] | Japan | 7-274673 |
| Dec. 18, 1995 | [JP] | Japan | 7-348374 |
| Dec. 18, 1995 | [JP] | Japan | 7-348376 |
| Dec. 18, 1995 | [JP] | Japan | 7-348377 |
| Apr. 10, 1996 | [JP] | Japan | 8-088500 |

[51] Int. Cl.⁶ .............. C08F 8/00; C08F 8/08; C08L 53/02
[52] U.S. Cl. .......... 525/316; 525/314; 525/333.9
[58] Field of Search .............. 525/316, 314, 525/332.9

[56] References Cited

U.S. PATENT DOCUMENTS

| H1597 | 9/1996 | Erickson | 522/158 |
| 3,265,765 | 8/1966 | Holden et al. | |
| 3,333,024 | 7/1967 | Haefele et al. | |
| 3,595,942 | 7/1971 | Wald et al. | |
| 3,699,184 | 10/1972 | Taylor et al. | 525/314 X |
| 3,700,633 | 10/1972 | Wald et al. | |
| 3,706,817 | 12/1972 | Wald et al. | |
| 4,051,199 | 9/1977 | Udipi et al. | 525/314 |
| 4,131,725 | 12/1978 | Udipi | 526/56 |
| 5,229,464 | 7/1993 | Erickson et al. | |
| 5,382,604 | 1/1995 | Erickson | 522/158 |
| 5,389,701 | 2/1995 | Erickson | |
| 5,412,040 | 5/1995 | Custro et al. | 525/332.9 |
| 5,446,104 | 8/1995 | Handlin et al. | 525/314 |
| 5,449,718 | 9/1995 | Erickson et al. | 525/314 |
| 5,491,193 | 2/1996 | Erickson | |
| 5,491,197 | 2/1996 | Custro et al. | |
| 5,516,824 | 5/1996 | Masse et al. | 524/270 |

FOREIGN PATENT DOCUMENTS

| 4-023798 | 10/1940 | Japan . |
| 42-8704 | 4/1942 | Japan . |
| 43-6636 | 3/1943 | Japan . |
| 47-3252 | 1/1972 | Japan . |
| 48-2423 | 1/1973 | Japan . |
| 55-40604 | 10/1980 | Japan . |
| 56-28925 | 7/1981 | Japan . |
| 5-125197 | 5/1993 | Japan . |
| 1436812 | 5/1976 | United Kingdom . |

*Primary Examiner*—Irina S. Zemel
*Attorney, Agent, or Firm*—Birch, Stewart, Kolasch & Birch, LLP

[57] ABSTRACT

A process for producing an epoxidized block copolymer, which comprises the steps of: (1) mixing a block copolymer (C) comprising a polymer block (A) composed mainly of a vinyl aromatic hydrocarbon compound and a polymer block (B) composed mainly of a conjugated diene compound, or a hydrogenation product (D) of the block copolymer (C), with an organic solvent so as to obtain an organic solvent solution or organic solvent slurry having a polymer concentration of 5 to 50% by weight; (2) epoxidizing unsaturated carbon bonds contained in a polymer block (B) composed mainly of a conjugated diene compound with an epoxidizing agent that is an acetic ester solution of peracetic acid, not containing water; and (3) evaporating off the organic solvent from the reaction mixture to thereby obtain an epoxidized block copolymer.

12 Claims, No Drawings

EPOXIDIZED BLOCK COPOLYMER, ITS PRODUCTION, AND ITS COMPOSITION

TECHNICAL FIELD

The present invention relates to an epoxidized block copolymer suitable for use in modifiers or modifier auxiliaries for rubbery or resinous polymers, adhesives, sealants, etc.

BACKGROUND ART

A block copolymer formed from a vinyl aromatic hydrocarbon compound and a conjugated diene compound and a hydrogenation product of the block copolymer are transparent, have the same elasticity as that of a vulcanized natural or synthetic rubber at ordinary temperatures even when it is not vulcanized and exhibits the same processability as that of a thermoplastic resin at high temperatures. Therefore, the above block copolymer is widely utilized in the field of various modifiers, adhesives, etc. To improve further the above performance of the block copolymer, the inventors have made many proposals for the use of an epoxidized block copolymer obtained by epoxidizing unsaturated carbon bonds attributed to the diene block of a block copolymer or a hydrogenation product thereof.

JP-A-5-125197 (1993) describes a (radiation) crosslinkable adhesive composition containing a polybutadiene block polymer provided with epoxy functionality and further describes that the obtained polymer can be melt-processed before it is crosslinked and has a high gel content after it is crosslinked to thereby improve the heat and solvent resistances.

However, it is described that the epoxidized block copolymer of this prior art can be one containing both epoxide and hydroxyester groups, attributed to partial opening of the epoxy ring, when the epoxidation reaction is conducted in the presence of an acid catalyst. Further, even if an epoxidized block copolymer having a low gel content is obtained before the crosslinking, further gelation may occur during the subsequent molding through heat melting. This gelation causes a drawback that moldability is gravely deteriorated.

DISCLOSURE OF THE INVENTION

The present invention provides an epoxidized block copolymer (E) obtained by epoxidizing a block copolymer (C) comprising a polymer block (A) composed mainly of a vinyl aromatic hydrocarbon compound and a polymer block (B) composed mainly of a conjugated diene compound or a hydrogenation product (D) thereof, meeting at least one of the following requisites:

(1) having a molar ratio (R) of existing hydroxyl to existing epoxy ranging from 0.001 to 0.1, the molar ratio (R) being represented by the formula:

$$R=[\text{hydroxyl}]/[\text{epoxy}]$$

wherein [hydroxyl] represents the mole number of hydroxyl groups contained per unit weight of the epoxidized block copolymer and [epoxy] represents the mole number of epoxy groups contained per unit weight of the epoxidized block copolymer;

(2) having a gel content of not greater than 5% by weight; and (3) having a chloride (chlorine) ion content of not greater than 7 ppm.

Preferably, the epoxidized block copolymer (E) is provided, further meeting at least one of the following requisites:

(4) having an acid value of not greater than 10 mgKOH/g;
(5) having a residual organic solvent content of not greater than 5000 ppm; and
(6) having an epoxy equivalent of 140 to 2700.

It is preferred that the hydrogenation product, being hydrogenated in part, have a hydrogenation ratio of 20 to 99% in the block (B) unit; that the molar ratio (R) range from 0.001 to 0.05; that the acid value be not greater than 5 mgKOH/g; and that the gel content range from 0.0001 to 1% by weight per copolymer unit.

Moreover, the present invention provides a process for producing an epoxidized block copolymer, which comprises the steps of:

(1) mixing the above block copolymer (C) or a hydrogenation product (D) thereof with an organic solvent so as to obtain an organic solvent solution or organic solvent slurry having a polymer concentration of 5 to 50% by weight;

(2) epoxidizing unsaturated carbon bonds contained in the above polymer block (B) with use of an epoxidizing agent in the organic solvent solution or organic solvent slurry; and (3) evaporating off the organic solvent from the reaction mixture to thereby obtain an epoxidized block copolymer.

The epoxidation reaction mixture obtained in the step (2) in the form of a solution or slurry can be washed with water and/or neutralized so that the acid value of the solution or slurry may not exceed 5 mgKOH/g prior to being fed to the step (3). Thus, the above epoxidized block copolymer can be obtained. In particular, the epoxidized block copolymer which meets at least one of the above requisites (1), (2) and (3) can be obtained.

In the process of the present invention, a phenolic stabilizer and/or a phosphorous stabilizer can be added to the epoxidation reaction mixture before the organic solvent is directly evaporated off from the epoxidation reaction mixture. Preferably, in the step (3), a phenolic stabilizer and/or a phosphorous stabilizer can be added to the epoxidation reaction mixture in an amount of 0.005 to 5 parts by weight per 100 parts by weight of the finally obtained epoxidized block copolymer before the organic solvent is removed from the epoxidation reaction mixture. Further, preferably, the step (3) can be conducted in such a manner that the epoxidation reaction mixture in the form of a solution or slurry is quantitatively fed into an evaporator; a phenolic stabilizer and/or a phosphorous stabilizer is added to the epoxidation reaction mixture in an amount of 0.005 to 10 parts by weight per 100 parts by weight of the finally obtained epoxidized block copolymer; and the organic solvent is removed from the epoxidation reaction mixture. A preferred epoxidizing agent is an acetic ester solution containing peracetic acid but not containing water.

In the step (3), the epoxidation reaction mixture can be fed into an evaporator to thereby directly evaporate off the organic solvent. The evaporation is conducted by heating. This solvent's removal preferably involves one or two stages of operation.

The two-stage solvent's removal can be conducted in such a manner that in the step (3), the epoxidation reaction mixture is fed into an evaporator to thereby evaporate the organic solvent so that the epoxidation reaction mixture is concentrated and the concentrate is fed into a kneading evaporator to thereby remove the organic solvent. In the step (3), each of the evaporator and kneading evaporator can be at a temperature of 80° to 300° C. and an internal pressure of not greater than 500 Torr. Preferably, in the step (3), the epoxidation reaction mixture is fed into a thin-film evaporator to thereby evaporate the organic solvent so that the epoxidation reaction mixture is concentrated and the concentrate is fed into a vented twin-screw extruder as one type of kneading evaporator to thereby remove the organic solvent.

The one-stage solvent's removal can be conducted by, in the step (3), feeding the epoxidation reaction mixture into an evaporator which is preferred to be a vented twin-screw extruder. This vented twin-screw extruder can have such a structure that a heating medium can be passed through the internal part of each screw.

Moreover, the present invention provides an epoxidized block copolymer composition comprising 100 parts by weight of an epoxidized block copolymer (F) obtained by epoxidizing a block copolymer (C) comprising a polymer block (A) composed mainly of a vinyl aromatic hydrocarbon compound and a polymer block (B) composed mainly of a conjugated diene compound or a hydrogenation product (D) of the block copolymer (C), 0.005 to 10 parts by weight of at least one phenolic and/or phosphorous stabilizer and/or 0.001 to 5 parts by weight of at least one antiblocking agent.

That is, the epoxidized block copolymer (E) or (F) is useful as an additive to adhesives, sealants, coatings and asphalt.

The inventors have made intensive studies and as a result have found that the ratio of hydroxyl groups to epoxy groups of the epoxidized block copolymer exerts a substantial influence on the amount of formed gel. The first embodiment of the present invention has been completed on the basis of this finding.

Illustratively, the first embodiment of the present invention is directed to an epoxidized block copolymer (E) obtained by epoxidizing a block copolymer (C) comprising a polymer block (A) composed mainly of a vinyl aromatic hydrocarbon compound and a polymer block (B) composed mainly of a conjugated diene compound or a product (D) of hydrogenation of the block copolymer (C), this epoxidized block copolymer (E) having a molar ratio (R) of contained hydroxyl to epoxy ranging from 0.001 to 0.1, this molar ratio (R) being represented by the formula:

$$R=[\text{hydroxyl}]/[\text{epoxy}]$$

wherein [hydroxyl] represents the amount, in terms of the number of moles, of hydroxyl contained per unit weight of the epoxidized block copolymer and [epoxy] represents the amount, in terms of the number of moles, of epoxy contained per unit weight of the epoxidized block copolymer. Further, the first embodiment of the present invention is directed to a process for producing the above epoxidized block copolymer (E) and a composition obtained from the epoxidized block copolymer (E).

In the first embodiment of the present invention, an epoxidized block copolymer is obtained which has a low gel content and is excellent in moldability. This epoxidized block copolymer can most suitably be used in thermoplastic resin and rubbery polymer compositions, coating compositions, sealant compositions, thermosetting compositions, adhesives, asphalt improvers and the like because the amount of formed gel is small especially during the melt kneading while heating.

The term "block copolymer" as used in the first embodiment of the present invention means the block copolymer (C) comprising a polymer block (A) composed mainly of a vinyl aromatic hydrocarbon compound and a polymer block (B) composed mainly of a conjugated diene compound. The term "product (D) of hydrogenation of the block copolymer" means a polymer obtained by partially hydrogenating unsaturated carbon bonds contained in the polymer block (B) of the block copolymer through a hydrogenation reaction. The term "epoxidized block copolymer (E)" as used in the first embodiment of the present invention means a polymer obtained by epoxidizing unsaturated carbon bonds contained in the polymer block (B) of the block copolymer (C) or product (D) of hydrogenation thereof.

Representative examples of the vinyl aromatic hydrocarbon compounds which can be employed in the formation of the block copolymer (C) include styrene, various alkyl-substituted styrenes such as α-styrenes, alkoxy-substituted styrenes, vinylnaphthalene, alkyl-substituted vinylnaphthalenes, divinylbenzene and vinyltoluene. Of these, styrene is especially preferred. These can be used either individually or in combination.

Representative examples of the conjugated diene compounds which can be employed in the formation of the block copolymer (C) include 1,3-butadiene, isoprene, 1,3-pentadiene, 2,3-dimethyl-1,3-butadiene, piperylene, 3-butyl-1,3-octadiene and phenyl-1,3-butadiene. Of these, 1,3-butadiene and isoprene are preferred because these are inexpensive and readily available. The above compounds can be used either individually or in combination.

In the block copolymer (C), the vinyl aromatic hydrocarbon compound and conjugated diene compound which can be employed in the formation thereof are preferably used in a ratio (by weight) of 5/95 to 80/20, still preferably, 10/90 to 60/40. The number average molecular weight of the block copolymer suitable for use in the present invention is preferred to range from 5000 to 500,000, especially, 10,000 to 100,000. When the molecular weight is lower, rubbery elastomer properties are hardly exhibited. On the other hand, when the molecular weight is higher, unfavorably the melting becomes difficult. Herein, the number average molecular weight means the molecular weight determined in terms of standard polystyrene by the use of GPC.

Although the structure of the block copolymer (C) is not particularly limited, it may be, for example, vinyl aromatic hydrocarbon compound/conjugated diene compound block copolymers represented by the formulae: A-B-A, B-A-B and A-B-A-B-A. The structure of the molecule per se thereof may be any of linear, branched and radial configurations or an arbitrary combination of these. In the block copolymer, the vinyl aromatic hydrocarbon compound may be distributed either uniformly or in tapered form. In the copolymer part, the part where the vinyl aromatic hydrocarbon compound is uniformly distributed and/or the part where the vinyl aromatic hydrocarbon compound is distributed in tapered form may be copresent each in plurality.

The process for producing the unepoxidized block copolymer (C) is not particularly limited and any known process can be used. For example, the processes as described in Japanese Patent Publication Nos. 23798/1965, 3252/1972, 2423/1973 and 2892/1981 can be mentioned in which the production is carried out in the presence of, for example, a lithium catalyst in an inert solvent.

The process for producing the block copolymer hydrogenation product (D) is not particularly limited and any known process can be used. For example, the process as described in Japanese Patent Publication Nos. 8074/1967 and 6636/1968 can be mentioned in which the block copolymer (C) is hydrogenated in the presence of a hydrogenation catalyst in an inert solvent. Although the degree of hydrogenation is not particularly limited, when the epoxidation reaction follows, it is required that unsaturated carbon bonds capable of reacting with the epoxidizing agent remain in the molecule of the hydrogenation product (D). This is because the site epoxidized by the epoxidizing agent is the unsaturated bond contained in the polymer block (B).

The process for producing the epoxidized block copolymer (E) according to the first embodiment of the present invention will now be described.

The process according to the first embodiment of the present invention produces an epoxidized block copolymer by subjecting the above-obtained block copolymer (C) or hydrogenation product (D) thereof to the following first to fourth steps.

In the first step according to the first embodiment of the present invention, an organic solvent is added to the block copolymer (C) or product (D) of hydrogenation thereof and mixed together so as to obtain an organic solvent solution having a polymer concentration of 5 to 50% by weight. Representative examples of suitable organic solvents include linear and branched hydrocarbons such as pentane, hexane, heptane and octane and alkyl-substituted derivatives thereof, alicyclic hydrocarbons such as cyclopentane, cyclohexane and cycloheptane and alkyl-substituted derivatives thereof, aromatic hydrocarbons such as benzene, naphthalene, toluene and xylene and alkyl-substituted derivatives thereof, aliphatic carboxylic acid esters such as methyl, ethyl and propyl acetates and halogenated hydrocarbons such as chloroform. Of these, the use of cyclohexane, ethyl acetate, chloroform, toluene, xylene and hexane is preferred from the viewpoint of the solubility of the block copolymer (C) or product (D) of hydrogenation thereof and the easiness of subsequent solvent recovery.

When the concentration of the block copolymer (C) or product (D) of hydrogenation thereof is lower than 5% by weight, actually too much a solvent must be used to an economic disadvantage. On the other hand, when the concentration is higher than 50% by weight, unfavorably the melt viscosity is so high that the mixing of the epoxidizing agent and the organic solvent solution or slurry is unsatisfactory in the second step and that removal of the reaction heat is difficult.

In the second step of the first embodiment of the present invention, unsaturated bonds present in the polymer contained in the organic solvent solution are epoxidized with an epoxidizing agent.

The epoxidation of the block copolymer (C) or product (D) of hydrogenation thereof can be performed by a reaction with the conventional epoxidizing agent.

Examples of epoxidizing agents which can be used in the epoxidation reaction include organic peracids such as peracetic acid, perbenzoic acid, performic acid and trifluoroperacetic acid, hydrogen peroxide and mixtures of hydrogen peroxide, and low molecular fatty acids. Of these, peracetic acid is the most suitable epoxidizing agent because not only is it industrially produced in large quantity so that it can be procured at lowered cost but also its stability is relatively high. It is especially preferred to use peracetic acid in the form of a solution thereof in a solvent such as ethyl acetate. In particular, a peracetic acid/ethyl acetate solution is the most suitable. A catalyst can be used in the epoxidation according to necessity.

Although the amount of added epoxidizing agent is not particularly limited and can be arbitrarily selected depending on, for example, the reactivity of the epoxidizing agent, the desired degree of epoxidation and the amount of unsaturated carbon bonds contained in the employed block copolymer or product of hydrogenation thereof, it is preferred that the amount of epoxidizing agent be determined so that the epoxy equivalent of the finally obtained epoxidized block copolymer (E) range from 140 to 2700.

Still preferably, the epoxy equivalent ranges from 200 to 2000. Herein, the epoxy equivalent is calculated by the formula: epoxy equivalent=1600/{concentration (wt. %) of oxirane oxygen contained in the epoxidized block copolymer} and represents the weight of epoxidized block copolymer per mol of oxirane oxygen.

The concentration of oxirane oxygen is determined by titration using an acetic acid solution of hydrogen bromide. The larger the epoxy equivalent, the lower the concentration of oxirane oxygen. Contrarily, the smaller the epoxy equivalent, the higher the concentration of oxirane oxygen. When the epoxy equivalent is smaller than 140, unfavorably, elastic properties of polymer are hardly exhibited. On the other hand, when the epoxy equivalent is larger than 2700, peculiar properties attributed to the epoxidation are hardly exhibited unfavorably.

The epoxidation reaction temperature is varied depending on, for example, the employed epoxidizing agent, the employed organic solvent and the type and amount of the block copolymer or hydrogenation product thereof and is not particularly limited. For example, when peracetic acid is used as the epoxidizing agent, the reaction temperature preferably ranges from 0° to 70° C. When the reaction temperature is lower than 0° C., the reaction rate is too low. On the other hand, when the reaction temperature exceeds 70° C., unfavorably the formed epoxy ring is opened and decomposition of peracetic acid is promoted. For improving the stability of peracetic acid, a phosphate salt may be added to the reaction system prior to the epoxidation reaction. From the viewpoint of productivity, it is preferred that the epoxidation reaction time be selected within the range of 0.1 to 72 hr, especially, 0.2 to 10 hr.

In the third step of the first embodiment of the present invention, the epoxidation reaction mixture is washed with water and/or neutralized so that the acid value of the reaction mixture does not exceed 5 mgKOH/g. Herein, the acid value is the weight of potassium hydroxide required to neutralize acids contained in 1 g of the crude reaction mixture resulting from the epoxidation reaction, which weight is measured by titration.

The purpose of the water washing and/or neutralization is to remove acids and other by-products incidentally formed by the epoxidation reaction carried out in the preceding step. When the acid value is higher than 5 mgKOH/g, unfavorably, the epoxy ring of the epoxidized block copolymer is opened and the properties of the epoxidized block copolymer are deteriorated.

The water washing may be conducted either continuously or batchwise. In the batchwise washing, it is preferred that washing be repeated a few times with the use of 50 to 1000 parts by weight of water per 100 parts by weight of the crude reaction mixture resulting from the epoxidation. In particular, when a large amount of epoxidizing agent is used, acids are incidentally formed in a large amount corresponding thereto. Thus, it is preferred that, for example, the frequency of washing be increased so as to achieve satisfactory removal of the acids. In the water washing, an inorganic salt such as sodium chloride or sodium sulfate may be added for achieving effective separation of the organic phase from the water phase.

Representative examples of alkaline aqueous solutions which can be used in the above neutralization include aqueous solutions of lithium hydroxide, sodium hydroxide, potassium hydroxide, calcium hydroxide, lithium carbonate, sodium carbonate, potassium carbonate, calcium carbonate, lithium hydrogen carbonate, sodium hydrogen carbonate, potassium hydrogen carbonate, sodium acetate and potassium acetate. The above alkali is used in a molar amount required for neutralizing the acids which are present in the reaction mixture. When the amount of alkali is too large, unfavorably the epoxy ring is opened to thereby form hydroxyl. On the other hand, when the amount of alkali is too small, unfavorably acids remain so as to cause deterioration leading to poor properties. For suppressing the opening of epoxy ring caused by exothermic neutralization, it is preferred that the neutralization be conducted while cooling the crude reaction mixture. The neutralization is conducted so that the molar ratio (R) of contained hydroxyl to epoxy ranges from 0.001 to 0.1, preferably, from 0.001 to 0.05.

In the fourth step of the first embodiment of the present invention, the obtained epoxidation reaction mixture containing the epoxidized block copolymer (E) is quantitatively fed by means of, for example, a pump into an evaporator, where the organic solvent is directly evaporated off from the reaction mixture to thereby recover the epoxidized block copolymer. In this step, the content of organic solvent in the epoxidized block copolymer (E) is regulated so as to be not greater than 5000 ppm.

Examples of evaporators which can be used in the first embodiment of the present invention include a flash vessel evaporator, an agitating vessel evaporator, a thin-film evaporator, a wetted wall column evaporator, a longitudinal screwed evaporator and a vented extruder which enable one-stage or at least two stage, i.e., multi-stage concentration. At least two evaporators selected from among the above ones can be used in combination for increasing the production capacity. Of the evaporators, the use of a vented extruder is especially preferred from the viewpoint that the solvent removing capacity is large and that the amount of scorched resin is small.

The vented extruder preferably used in the practice of the first embodiment of the present invention will be described now. The vented extruder is one having at least one, preferably, 1 to 10 and, still preferably, 1 to 5 deairing vent parts. In the extruder, the number of screws is at least one, preferably, at least two. Of these, a vented twin-screw extruder is especially preferred from the viewpoint of the availability for general purposes.

With respect to the vented extruder of the above structure, it is preferred that L/D (L representing the length of screw and D the outer diameter of screw) range from about 2 to 50, especially, from about 4 to 40. It is no matter whether the screws are structured so as to engage with each other or not and whether they are corotating or counterrotating.

A vented twin-screw extruder having such a structure that a heating medium can be passed through the internal part of each screw is the most suitable among the available varieties. The extruder of this structure is preferred from the viewpoint that a large amount of heat taken away at the time of evaporation of the organic solvent can satisfactorily be supplemented by a heat supply. Further, an extruder having a continuous gas phase zone at the upper part of the inside of the extruder is preferred from the viewpoint of the efficiency of removal of the organic solvent.

The internal temperature and internal pressure of the evaporator are determined taking into account, for example, the processing capacity, the properties of polymer (viscosity, thermal stability, etc.), the type and concentration of the organic solvent and the quality of the product. It is preferred that the internal temperature of the evaporator range from 80° to 300° C., especially, 120° to 250° C. When the internal temperature of the evaporator is lower than 80° C., removal of the organic solvent is not satisfactory and so causes low viscosity. On the other hand, when it is higher than 300° C., a large amount of gel occurs in the polymer unfavorably. In particular, when the epoxidized block copolymer remains in the evaporator used in the fourth step at high temperatures with the result of occurrence of a large amount of gel, unfavorably not only is the melt viscosity too high but also fisheyes are likely to occur to thereby cause molding defects. The gel content is preferred to be not greater than 5% by weight, especially, not greater than 3% by weight and, still especially, not greater than 1% by weight.

The internal pressure of the evaporator is determined so as to be preferably not greater than 500 Torr, still preferably, within the range of from 1 to 400 Torr. The internal pressure of the evaporator means the pressure at a point exhibiting the lowest pressure in the gas phase zone brought into contact with the resin within the evaporator. With respect to the extruder, generally, the above internal pressure means the value read from a pressure gauge mounted to the vent part. When the internal pressure of the evaporator is higher than 500 Torr, unfavorably, the organic solvent cannot satisfactorily be removed. In the use of the vented extruder, the screw revolution speed ranges from 20 to 500 rpm, preferably, from 30 to 400 rpm.

It is preferred that the organic solvent be directly evaporated off from the epoxidation reaction mixture by the above operation (hereinafter also referred to as the "direct solvent removal") so that the residual organic solvent content of the finally obtained epoxidized block copolymer is not greater than 5000 ppm, preferably, not greater than 2000 ppm and, still preferably, not greater than 1000 ppm. The organic solvent may involve the one used in the production of the block copolymer (C) or product (D) of hydrogenation thereof, the one used in the epoxidation reaction and the one used in other steps. When the residual organic solvent content is greater than 5000 ppm, unfavorably foaming and odor development are invited in the molding of the epoxidized block copolymer into a product configuration. The residual organic solvent content can easily be regulated by changing the conditions such as the temperature of the evaporator, the internal pressure of the evaporator and the processing speed.

The epoxidized block copolymer having undergone the direct solvent removal by the evaporator can be obtained in the form of any of foamed crumbs, granules and powder and also can be obtained in the form of strands and pellets. Preferably, the epoxidized block copolymer is obtained in the form of pellets.

In the practice of the first embodiment of the present invention, the fourth step can be performed in such a manner that the obtained organic solvent solution of the block copolymer (C) or product (D) of hydrogenation thereof (product obtained upon completion of the above third step) is quantitatively fed by means of, for example, a pump into an evaporator, then a phenolic stabilizer and/or a phosphorous stabilizer is added to the epoxidation reaction mixture and finally the organic solvent is directly evaporated off from the epoxidation reaction mixture. The epoxidized block copolymer (E) obtained in the above manner exhibits a markedly improved thermal stability, has a less tendency for gelation even if allowed to stand still at high temperature and enables marked suppression of a hue deterioration. Moreover, for adding a stabilizer to a plastic or rubber, it is generally needed to knead the stabilizer into the copolymer by the use of a device such as a kneading extruder. However, in the above method according to the first embodiment of the present invention, it is only needed to put the stabilizer in the epoxidation reaction mixture containing the epoxidized block copolymer (E) and thus it is not needed to conduct kneading of the stabilizer. This ensures operational and economic advantages.

Representative examples of phenolic stabilizers which can be used in the first embodiment of the present invention include tetrakis(methylene-3-(3',5'-di-tert-butyl-4'-hydroxyphenyl)propionate)methane, 1,3,5-trimethyl-2,4,6-tris(3,5-di-tert-butyl-4'-hydroxybenzyl)benzene, 2,6-di-tert-butyl-4-methylphenol, 4-hydroxymethyl-2,6-di-tert-butylphenol, 2,4-bis(n-octylthio)-6-(4-hydroxy-3,5-di-tert-butylanilino)-1,3,5-triazine, octadecyl 3-(3,5-di-tert-butyl-4-hydroxyphenyl)propionate, triethylene glycol bis(3-(3-tert-butyl-5-methyl-4-hydroxyphenyl)propionate), 1,3,5-tris(4-tert-butyl-3-hydroxy-2,6-dimethylbenzyl)isocyanuric acid, 2,2'-methylenebis(4-methyl-6-tert-butylphenol), 3,9-bis(2-(3-(3-tert-butyl-4-hydroxy-5-methylphenyl)propionyloxy)-1,1-dimethylethyl)-2,4,8,10-tetraoxaspiro[5.5]undecane, 2,6-di-tert-butyl-4-ethylphenol, butylated hydroxyanisole, 2,2'-dihydroxy-3,3'-dicyclohexyl-5,5'-dimethyldiphenylmethane, 1,1,3-tris(2-methyl-4-hydroxy-5-tert-butylphenyl)butane, 4,4'-butylidene-bis(6-tert-butyl-m-cresol), bis(3-cyclohexyl-2-hydroxy-5-methylphenyl)methane, 2,2'-methylenebis(4-ethyl-6-tert-butylphenol) and 1,1-methylenebis(2'-methyl-4'-hydroxy-5'-tert-butylphenyl)butane. These phenolic stabilizers can be used in combination Representative examples of phosphorous stabilizers which can be used in the first embodiment of the present invention include trisnonylphenyl phosphite, tris(2,5-di-tert-butylphenyl) phosphite, tris(2-di-tert-butylphenyl) phosphite and tris(2,4-bis(1,1-dimethylpropyl)phenyl) phosphite. These phosphorous stabilizers can be used in combination.

In the first embodiment of the present invention, the phenolic stabilizer and the phosphorous stabilizer may be used each independently or in combination. The phenolic stabilizer and/or phosphorous stabilizer is added in an amount of 0.005 to 10 parts by weight, preferably, 0.05 to 3 parts by weight and, still preferably, 0.1 to 2 parts by weight in terms of the amount of each of the stabilizers per 100 parts by weight of epoxidized block copolymer finally obtained after the removal of the solvent. The amount of stabilizer to be added can be easily calculated from the concentration of block copolymer in the solution and from the desired concentration. When the amount of added stabilizer is smaller than 0.005 part by weight, the thermal stability would be deteriorated. On the other hand, even when the amount is greater than 10 parts by weight, further thermal stability improving effect is trivial. Therefore, the use of stabilizer in such a large amount is not desired from the economic point of view.

In the practice of the first embodiment of the present invention, the fourth step can comprise removing the organic solvent from the above produced organic solvent solution of block copolymer (C) or product (D) of hydrogenation thereof (product obtained upon completion of the above third step) by means of a first evaporator (first-stage concentration) and then evaporating off the remaining volatile component by means of a second evaporator of the kneading type (second-stage concentration), so that the organic solvent can be evaporated off under condition such that the time of residence of polymer is short, i.e., the polymer having a residual organic solvent concentration of not greater than 500 ppm can be produced without suffering from long heat history.

Examples of evaporators which can be used in the first-stage concentration of this step (first evaporators) include a shell and tube evaporator, a liquid film evaporator, a centrifugal thin-film evaporator and a plate evaporator. Of these, a shell and tube evaporator, a centrifugal thin-film evaporator and a plate evaporator are preferred. These have a large surface brought into contact with the epoxidation reaction mixture and are suitable for use in the concentration conducted at a high solvent content. The first-stage concentration is conducted so that the organic solvent content (volatile component content) ranges from 5 to 70% by weight, preferably, from 20 to 30% by weight. The use of the first evaporator enables reducing the size of the second evaporator.

Examples of kneading evaporators which can be used in the second-stage concentration (second evaporators) include a twin-screw evaporator of the surface renewing, self-cleaning type and a vented extruder each having kneading shafts. For realizing a large heating surface area, it is preferred to employ a kneading evaporator in which a heating medium can be passed through the internal part of each screw. The kneading evaporator with this structure can satisfactorily supply a large amount of heat required for evaporating the organic solvent. Further, this kneading evaporator is especially preferred from the viewpoint that the piston flow properties free of back mixing are exhibited to thereby ensure excellent blending performance and that the evaporation surface area can be large. With respect to the structure of the kneading evaporator, it is preferred that L/D (L representing the length of screw and D the outer diameter of screw) range from about 2 to 50, especially, from about 4 to 40. It is no matter whether the screws are structured so as to engage with each other or not and whether they are corotating or counterrotating. The kneading evaporator enables removing the organic solvent without detriment to the stability of the epoxidation product even from the epoxidation reaction mixture whose viscosity has increased because of the reduction in the organic solvent content.

Oil and other heating media, steam and electrical heater can be used as the heating source for each evaporator.

In a practical embodiment of this method, first, the epoxidation reaction mixture is continuously fed by means of a gear pump into the first evaporator, in which the solvent is distilled off within a flash tank at heating temperature not lower than the boiling point of the solvent. The epoxidation reaction mixture may be one washed with water in advance. The water washing may be conducted either continuously or batchwise. In the batchwise washing, it is preferred that washing be repeated a few times with the use of 50 to 1000 parts by weight of water per 100 parts by weight of the crude reaction mixture resulting from the epoxidation.

The organic solvent contained in large quantity in the epoxidation reaction mixture can easily be removed by conducting heating evaporation in the first evaporator.

In this method, the volatile component is distilled off from the concentrate obtained by evaporation by means of the first evaporator with the use of the second evaporator to thereby separate the epoxidized block copolymer from the organic solvent. Distilling off the volatile component with the use of the second evaporator enables stably evaporating the organic solvent remaining in the concentrate under condition such that the time of residence of concentrate is short, i.e., the epoxidized block copolymer can be produced without suffering from long heat history.

The obtained epoxidized block copolymer can be extrusion molded in the customary manner into any form selected from among those of strands, pellets, foamed crumbs, granules and powder, preferably, into the form of pellets.

The internal temperature and internal pressure of each of the evaporator and the kneading evaporator are determined taking into account, for example, the processing capacity, the properties of polymer (viscosity, thermal stability, etc.), the type and concentration of the solvent and the quality of the product. It is preferred that the internal temperature of each of both the evaporators range from 80° to 300° C., especially, 120° to 250° C. When the internal temperature of the evaporator is lower than 80° C., the viscosity is increased with the result that removal of the organic solvent becomes difficult unless the degree of pressure reduction is raised. On the other hand, when it is higher than 300° C., unfavorably gelation occurs in the polymer. In particular, when the epoxidized block copolymer remains in the evaporator with the result of occurrence of a large amount of gel, unfavorably not only is the melt viscosity too high but also fisheyes are likely to occur in the product to thereby cause molding defects. The gel content is preferred to be not greater than 5% by weight, especially, not greater than 3% by weight and, still especially, not greater than 1% by weight. The gel content is expressed as the weight percentage of insolubles in tetrahydrofuran (THF).

The first embodiment of the present invention is characterized in that the epoxidized block copolymer (E) obtained by the above method has a molar ratio (R) of contained hydroxyl to epoxy ranging from 0.001 to 0.1, this molar ratio (R) being represented by the formula:

$$R=[OH]/[epoxy]$$

wherein [OH] represents the amount, in terms of the number of moles, of hydroxyl contained per unit weight of the epoxidized block copolymer and [epoxy] represents the amount, in terms of the number of moles, of epoxy contained per unit weight of the epoxidized block copolymer.

The hydroxyl is mainly formed by the opening of epoxy ring by the action of, for example, an acid or a base. The ratio R preferably ranges from 0.001 to 0.05. When the ratio R is greater than 0.1, unfavorably gelation is likely to occur in the polymer.

It has been found that the following measures are effective in controlling so that the ratio R of hydroxyl to epoxy is low as above. (1) Peracetic acid is used as the epoxidizing agent so the reaction is effected under mild temperature condition. (2) A peracetic acid/ethyl acetate epoxidizing agent is used to thereby enable suppressing the epoxy ring opening reaction (formation of hydroxyester group, etc.) more effectively than in the use of epoxidizing agents containing a strong acid such as sulfuric acid or p-toluenesulfonic acid and/or water, so that the value R becomes small. (3) Acetic acid is removed by washing with water and neutralization to thereby enable suppressing the epoxy ring opening at high temperatures during the removal of solvent, so that the value R becomes small.

The acid value of the epoxidized block copolymer is preferred to be not greater than 10 mgKOH/g. Herein, the acid value of the epoxidized block copolymer is the weight of potassium hydroxide required to neutralize acids contained in 1 g of the epoxidized block copolymer obtained through epoxidation reaction, solvent removal and drying, which weight is measured by titration. The acids are mainly formed as by-products in the epoxidation reaction. For example, when peracetic acid is used as the epoxidizing agent, acetic acid is formed as by-product in the epoxidation reaction. Further, acids attributed to starting material impurities and to various additives used in the above production of epoxidized block copolymer are also included in the acid value referred to in the first embodiment of the present invention as long as the amount thereof is determined by titration with potassium hydroxide. When the acid value is higher than 10 mgKOH/g, the gel content of finally obtained epoxidized block copolymer is so high that the melt flow processability is deteriorated unfavorably. In particular, when the acid value is too high in the melt kneading of the epoxidized block copolymer together with other resin or rubber at high temperatures, a large amount of gel is formed during the melt kneading, so that the moldability of the composition is gravely deteriorated.

It is preferred that the chloride ion content of the epoxidized block copolymer be not greater than 7 ppm. One of the measures for lowering the chloride ion content of the epoxidized block copolymer is to use a peracetic acid epoxidizing agent containing no chloride ion as the epoxidizing agent.

The epoxidized block copolymer according to the first embodiment of the present invention can be obtained in the form of any of liquid, foamed crumbs, strands, pellets and powder. Preferably, the epoxidized block copolymer is obtained in the form of pellets.

According to necessity, the epoxidized block copolymer according to the first embodiment of the present invention can be blended with various additives, e.g., a thermal stabilizer, an age resister, a crosslinking agent, an ultraviolet absorber, an inorganic filler such as silica, talc, carbon or glass fiber, an organic filler, a plasticizer and a softening agent such as oil before use thereof. The time of addition is not particularly limited and the additives can be incorporated at any time before finally obtaining the epoxidized block copolymer.

In the first embodiment of the present invention, an antiblocking agent can be added in an amount of 0.001 to 5 parts by weight, preferably, 0.01 to 2 parts by weight and, still preferably, 0.05 to 1 part by weight per 100 parts by weight of the epoxidized block copolymer (E) for inhibiting mutual blocking of the epoxidized block copolymer (E) according to the first embodiment of the present invention. When the amount of added antiblocking agent is less than 0.001 part by weight, unfavorably, satisfactory antiblocking effect cannot be exerted. On the other hand, when the amount is greater than 5 parts by weight, also unfavorably, the inherent properties of the epoxidized block copolymer, especially, the transparency thereof is gravely deteriorated although the blocking can be avoided. Mutual blocking of the obtained epoxidized block copolymer composition is substantially inhibited not only in the composition per se of powdery or pelletized form but also in various products of film or sheet form prepared therefrom.

Examples of suitable antiblocking agents include silicon compounds, fatty acid salts, fatty acid esters, fatty acid amides and nonionic surfactants. Representative examples of the silicon compounds include silicon oxide, silicone oil, silicone emulsion and other silicone fluids. The silicone fluids include alkyl, aryl and cycloalkyl-substituted silicone compounds having 0 to 12 carbon atoms per unit. Of these, silicon oxide and polydimethylsiloxane are especially preferred. It is preferred that silicon oxide have an average particle size ranging from 0.005 to 25 $\mu$m.

In the fatty acid residue employed to constitute a fatty acid salt or fatty acid ester as the antiblocking agent, the number of carbon atoms per molecule is selected within the range of 10 to 20, preferably, 12 to 18. When the number of carbon atoms is less than 10 or greater than 20, unfavorably, satisfactory antiblocking effect cannot be exerted. Representative examples of the fatty acid salts include salts composed of metals belonging to Groups I, II, III and IV of the periodic table and acids such as lauric acid, myristic acid, palmitic acid, stearic acid and oleic acid. Of these, calcium stearate is especially preferred. Representative examples of the fatty acid esters include glycerol monostearate, glycerol distearate and glycerol tristearate. Glycerol monostearate is especially preferred. Both the fatty acid salts and fatty acid esters may be used either individually or in combination.

Representative examples of the fatty acid amides as the antiblocking agents include stearamide, oleamide and ethylenebisstearamide. Representative examples of the noionic surfactants as the antiblocking agents include sorbitan esters, propylene glycol fatty acid esters, sucrose fatty acid esters, citric acid mono(di or tri)stearates, pentaerythritol fatty acid esters, trimethylol fatty acid esters, polyglycerol fatty acid esters, polyoxyethylene glycerol fatty acid esters, polyesters, polyoxyethylene sorbitan fatty acid esters, polyethylene glycol fatty acid esters, polypropylene glycol fatty acid esters, polyoxyethylene glycol aliphatic alcohol ethers, polyoxyethylene alkylphenyl ethers, N,N-bis(2-hydroxyethylene) fatty amines, fatty acid/diethanolamine condensates, polyoxyethylene/polyoxypropylene block polymers, polyethylene glycol and polypropylene glycol. Especially preferred nonionic surfactants are those having polyoxyethylene units, such as polyoxyethylene glycerol fatty acid esters, polyoxyethylene sorbitan fatty acid esters, polyoxyethylene aliphatic alcohol ethers, polyoxyethylene alkylphenyl ethers and polyoxyethylene/polyoxypropylene block polymers.

At least one member may be selected from each of the above antiblocking agent groups or, occasionally, at least two members may be selected therefrom and used in mixture. Also, members may be selected from a plurality of groups selected from the various antiblocking agent groups consisting of the silicon compound, fatty acid salt, fatty acid ester, fatty acid amide and nonionic surfactant groups and used in mixture.

With respect to the method of incorporating the antiblocking agent, it is preferred that the anti-blocking agent be deposited on the surfaces of pellets of the epoxidized block copolymer (E) from the economic point of view. Examples of the methods include (1) the method in which the pellets are directly covered with the antiblocking agent, or the pellets are coated with the antiblocking agent and, according to necessity, dried; (2) the method in which the strand extruded through an extruder die is cut in water in which the antiblocking agent has been dissolved or suspended in advance and the obtained wet pellets are dried to thereby deposit the antiblocking agent on the pellet surface; and (3) the method in which the polymer (E) and the antiblocking agent are dryblended, and kneaded and pelletized by the use of a general-purpose extruder.

The epoxidized block copolymer according to the first embodiment of the present invention can also be used in the form of a thermoplastic resin composition containing a thermoplastic resin and/or rubbery polymer. The thermoplastic resin composition according to the first embodiment of the present invention comprises 99 to 1% by weight of the epoxidized block copolymer (a) and 1 to 99% by weight of the thermoplastic resin and/or rubbery polymer (b).

The thermoplastic resin as the component (b) used in the first embodiment of the present invention generally refers to the resin which is melted by heating and moldable into any desired configuration. Examples of the thermoplastic resins include polyolefin resins such as polyethylene and polypropylene; polyamide resins such as nylon 46, nylon 6 and nylon 66; polyester resins such as polyethylene terephthalate and polybutylene terephthalate; crystalline thermoplastic polymers such as polyamide elastomers and polyester elastomers; rubber-modified polymers such as ABS, AES, AAS and MBS resins; noncrystalline thermoplastic polymers such as acrylonitrile/styrene copolymer, styrene/methyl methacrylate copolymer, polystyrene, polymethyl methacrylate, polycarbonate and polyphenylene oxide; graft polymers comprising polymer units whose main repeating structural units are composed of an α-monoolefin having 2 to 8 carbon atoms, the polymer units being grafted with another polymer, such as graft polymer comprising ethylene/propylene copolymer grafted with acrylonitrile/styrene copolymer, graft polymer comprising ethylene/butene copolymer grafted with acrylonitrile/styrene copolymer, graft polymer comprising ethylene/butene copolymer grafted with butyl acrylate/methyl methacrylate copolymer and graft polymer comprising ethylene/butene copolymer grafted with methyl methacrylate copolymer. The polyamide resins, polyester resins and polycarbonate are especially preferred as a component capable of improving the heat resistance of the composition.

The rubbery polymer as another component constituting the above component (b) generally refers to natural and synthetic rubbers. Representative examples of the rubbery polymers include styrene/butadiene rubber and product of hydrogenation thereof; isoprene rubber, nitrile rubber and products of hydrogenation thereof; and chloroprene rubber, butyl rubber, ethylene/propylene rubber, ethylene/propylene/diene rubber, ethylene/butene rubber, ethylene/butene/diene rubber, acrylic rubber, α,β-unsaturated nitrile/acrylic ester/conjugated diene terpolymer rubber, chlorinated polyethylene rubber, fluororubber, silicone rubber, urethane rubber, epichlorohydrin rubber, polysulfide rubber, styrene/butadiene block polymer and products of hydrogenation thereof.

Of these, preferred rubbery polymers are rubbers whose degree of saturation or unsaturation is essentially low, such as product of hydrogenation of styrene/butadiene rubber; products of hydrogenation of ethylene/propylene rubber, ethylene/propylene/diene rubber, ethylene/butene rubber, ethylene/butene/diene rubber, acrylic rubber, chlorinated polyethylene rubber, fluororubber, silicone rubber, urethane rubber, epichlorohydrin rubber, polysulfide rubber and styrene/butadiene block polymer; and α,β-unsaturated nitrile/acrylic ester/conjugated diene terpolymer rubber, and are modified rubbers comprising these and, bonded therewith, functional groups.

The thermoplastic resin composition or elastomer composition according to the first embodiment of the present invention comprises the epoxidized block copolymer (a) and the thermoplastic resin and/or rubbery polymer (b) as main components. In the composition, the component (a) is blended in an amount of 99 to 1% by weight, preferably, 95 to 5% by weight and, still preferably, 90 to 10% by weight and the component (b) is blended in an amount of 1 to 99% by weight, preferably, 5 to 95% by weight and, still preferably, 10 to 90% by weight.

When the amount of the component (a) exceeds 99% by weight, the property improving effect is unsatisfactory. On the other hand, when it is less than 1% by weight, the various properties as the elastomer are deteriorated unfavorably. When the amount of the component (b) is less than 1% by weight, the property improving effect of the addition of the component (b) is not recognized. On the other hand, when it exceeds 99% by weight, the characteristics of the thermoplastic elastomer are lost unfavorably.

A very wide range of components (b) are used in the first embodiment of the present invention. This is because the epoxidized block copolymer as the component (a) widely changes from a rubbery very flexible form to a hard resin form.

Therefore, whether to employ the thermoplastic resin, the rubbery polymer or a mixture thereof as the component (b)

depends mainly on the properties of the component (a) and the purpose of the composition to be obtained.

Specifically, generally, when the vinyl aromatic compound content of the component (a) is not greater than 40% by weight, the component (a) has rubbery flexible properties. Thus, it is desired to design so that the thermoplastic resin is blended as the component (b) to thereby obtain a well balanced thermoplastic polymer composition.

On the other hand, when the vinyl aromatic compound content of the component (a) is greater than 60% by weight, the component (a) exhibits rather resinous properties. Thus, it is desired to design the composition as a thermoplastic elastomer by adding the rubbery polymer as the component (b). When the vinyl aromatic compound content of the component (a) is greater than 40% by weight but less than 60% by weight, it is desired to design the composition as a well balanced thermoplastic elastomer as a whole by simultaneously employing the thermoplastic resin and the rubbery polymer as the component (b).

Moreover, in the first embodiment of the present invention, a composition design can be made taking advantage of an inherent property of the epoxidized block copolymer as the component (a), i.e., the property of acting as a compatibilizer between polymers different from each other. In the use of the block polymer as a compatibilizer, the amount of added block polymer is generally known to be satisfactory if it is about a few percents by weight. The minimum usage of the component (a) of the present invention of about 1% by weight results from taking into consideration the use of the component (a) as a compatibilizer.

That is, in the use of the component (a) as a compatibilizer, joint use is made of the thermoplastic resin and rubbery polymer as the component (b) and, for example, a thermosetting resin as a component (c).

Combinations of specified thermoplastic resins and specified rubbery polymers can be mentioned as enabling an effective action of the component (a) as the compatibilizer.

Examples of such specified thermoplastic resins include styrene resins (such as polystyrene, AS resin, ABS resin, AAS resin, AES resin, ACS resin, MBS resin, HIPS resin and styrene/butadiene copolymer), aromatic polyethers (such as polyphenylene ether), polycarbonate resin, polyolefin resins such as polyethylene, polypropylene and polybutene-1, graft polymers comprising a polymer composed mainly of an α-monoolefin having 2 to 8 carbon atoms grafted with another polymer and mixtures thereof.

Examples of the above rubbery polymers include monoolefinic copolymer rubbers such as ethylene/propylene rubber, ethylene/propylene/diene rubber, ethylene/butene rubber and ethylene/butene/diene rubber, chlorinated polyethylene rubber, product of hydrogenation of styrene/butadiene rubber, product of hydrogenation of nitrile rubber and product of hydrogenation of styrene/butadiene block polymer. The above combination of thermoplastic resin and rubbery polymer is a combination of polymers having a polystyrene structure which is the fundamental structure of the epoxidized block copolymer according to the first embodiment of the present invention, a structure similar to the polyolefin structure and a structure which has affinity with the aromatic vinyl polymer. However, the epoxidized block copolymer according to the first embodiment of the present invention has epoxy groups, so that it acts as a compatibilizer with polymers having generally been incompatible therewith through the affinity and chemical reaction between functional groups. Examples of the thermoplastic resins having the affinity and reactivity with epoxy, with which the epoxidized block copolymer of the present invention effectively acts as the compatibilizer (the term "having the affinity and reactivity with epoxy" used herein means the presence in the resin of residue (e.g., carboxyl, hydroxyl or amino residue) or bond (e.g., ester bond or amide bond)) include polyamide resins such as nylon 6, nylon 66, nylon 46, nylon 11 and nylon 12, polyester resins such as polyethylene terephthalate and polybutylene terephthalate, polycarbonate, polyimides, polyamideimides, carboxylated polyolefins (such as ethylene/(meth)acrylic acid copolymer and polypropylene modified with maleic acid), polyvinyl acetate, ethylene/vinyl acetate copolymer and mixtures thereof.

Further, examples of the rubbery polymers reactive with epoxy capable of effectively acting as the compatibilizer include polyamide elastomers, polyester elastomers, epichlorohydrin rubber and urethane rubber.

Even when the component (a) is used as the compatibilizer, other thermoplastic resin and/or rubbery polymer than mentioned above can be blended in the composition.

Moreover, for example, phenol, epoxy, melamine, unsaturated polyester and alkyd resins may be blended as the component (c) in the composition.

With respect to the above particulars of the combination of the components (a) and (b), a generalized description has been given of the relationship between the properties of the component (a) and the polymer used as the component (b). The composition of the present invention is not limited to the above particulars and the particular of component (b) can be selected according to the purpose.

The polymer used as the component (b) may be composed of a mixture of a plurality of thermoplastic resins and/or a plurality of rubbery polymers.

When the thermoplastic resin and the rubbery polymer are to be used in combination as the component (b), they can be used in arbitrary proportions according to the desired performance of the final composition.

The above thermoplastic polymer composition comprising the components (a) and (b) according to the first embodiment of the present invention can be kneaded by the use of conventional kneading apparatus such as rubber mill, Brabender mixer, Banbury mixer, pressure kneader and twin-screw extruder. These may be of hermetically closed or open type but those which can be flashed with inert gas are preferred.

The kneading is conducted at a temperature at which all the blended components are melted, which temperature is generally preferred to range from 140° to 300° C., especially, from 160° to 280° C. In the kneading, all the components may simultaneously be kneaded together or the multistage division kneading method may be adopted in which any arbitrary component are kneaded and remaining components are added, followed by further kneading.

The thermoplastic resin composition of the first embodiment of the present invention can be blended with various additives, e.g., an age resister, a crosslinking agent, a thermal stabilizer, an ultraviolet absorber, an inorganic filler such as silica, talc, carbon or glass fiber, a plasticizer and a softening agent such as oil according to necessity before use thereof.

Moreover, the epoxidized block copolymer according to the first embodiment of the present invention can be used in the form of a thermosetting resin composition. Examples of the thermosetting resins which can be blended with the epoxidized block copolymer employed in the first embodiment of the present invention include a phenolic resin, an epoxy resin, a melamine resin, an unsaturated polyester resin and an alkyd resin. Of these, the phenolic resin, epoxy resin and unsaturated polyester resin are preferred from the viewpoint that the blending can be easily made.

Although the blending proportion of the epoxidized block copolymer to the thermosetting resin is varied according to the purpose, the content of epoxidized block copolymer in the composition ranges from 1 to 80% by weight, preferably, from 1 to 50% by weight and, still preferably, from 2 to 25% by weight.

When the content of epoxidized block copolymer is less than 1% by weight, the impact resistance improving effect is poor. On the other hand, when it exceeds 80% by weight, the high strength which is the inherent feature of the thermosetting resin cannot be maintained.

Although the method of blending the thermosetting resin composition according to the first embodiment of the present invention is not particularly limited, it is preferred that the composition be heated and kneaded. Use can be made of a hermetically closed mixer such as Banbury mixer, a roll mill or an extruder.

The thermosetting resin composition of the first embodiment of the present invention can be blended with various additives, e.g., an age resister, a stabilizer, a plasticizer, a softening agent, inorganic and organic fillers, a reinforcement and a curing agent according to necessity before use thereof.

Curing agents commonly used in the curing of epoxy resins can be employed as the curing agent in the first embodiment of the present invention. Examples thereof include amines, polyamide resins, acid anhydrides, polymercaptan resins, novolak resins, dicyandiamide and amine complex of boron trifluoride. Examples of the amines include aliphatic polyamines such as diethylenetriamine, triethylenetetramine, menthenediamine, m-xylylenediamine and bis(4-amino-3-methylcyclohexyl)methane; adducts obtained by the reaction thereof with conventional epoxy compounds and products obtained by reacting the aliphatic polyamines with any of acrylonitrile and ketones; aromatic polyamines such as m-phenylenediamine, diaminodiphenylmethane, diaminodiphenylsulfone and diaminodiphenyl sulfide; adducts obtained by the reaction of the aromatic polyamines with conventional epoxy compounds; secondary and tertiary amines such as tris (dimethylaminomethyl)phenol, piperidine, imidazole and derivatives thereof and their salts; and mixtures of the above amines.

Examples of the polyamide resins include products obtained by reacting fatty acids including dimer and trimer acids with aliphatic polyamines.

Examples of the acid anhydrides include phthalic anhydride, trimellitic anhydride, pyromellitic anhydride, benzophenonetetracarboxylic dianhydride, tetrahydrophthalic anhydride, hexahydrophthalic anhydride, methyltetrahydrophthalic anhydride, methylhexahydrophthalic anhydride, methylnudic anhydride, succinic anhydride, dodecenylsuccinic anhydride, and mixtures thereof.

Examples of the novolak resins include resinous low-molecular-weight products obtained by formaldehyde condensation with phenol or a mixture of phenol, cresol and dihydroxybenzene.

Examples of the amine complexes of boron trifluoride include complexes of boron trifluoride with low-molecular-weight amine compounds such as monoethylamine, piperidine, aniline, butylamine, dibutylamine, cyclohexylamine, dicyclohexylamine, tributylamine and triethanolamine.

Also, use can be made of other curing agents, e.g., salts such as diazonium, iodonium, bromonium and sulfinium salts of superstrong acids such as boron tetrafluoride, phosphorus hexafluoride and arsenic hexafluoride.

The epoxidized block copolymer obtained by the process according to the first embodiment of the present invention can be utilized not only as various molded items such as a sheet, a film, variously shaped injection moldings and a hollow shaped article but also as a modifier of various thermoplastic resins, a pressure sensitive adhesive, a raw material of adhesives, an asphalt modifier and raw materials of household electric appliances, automobile parts, industrial parts, household goods and toys.

Of the above usages, the epoxidized block copolymer according to the first embodiment of the present invention is especially useful as adhesives (including a pressure sensitive adhesive, a contact adhesive, a laminating adhesive and an assembly adhesive), a sealant, a coating, an asphalt improver, a film and a printing plate. Still especially, the epoxidized block copolymer of the present invention can suitably be used in an adhesive composition, a sealant composition, a coating composition and an asphalt composition.

Each of the various compositions according to the first embodiment of the present invention is loaded with not only the epoxidized block copolymer and the curing auxiliary or curing agent (described above) but also with various combinations of components including an adhesion promoter or tackifier, a plasticizer, a filler, a solvent, a stabilizer and other components (e.g., asphalt) so as to conform to the performance required for each individual use.

Examples of general tackifiers are a diene/olefin copolymer prepared from piperidine and 2-methyl-2-butene and an aliphatic hydrocarbon resin prepared from 1,3-pentadiene.

Also, an aromatic resin can be used as the tackifier if it is blendable with specified polymers used in the composition. Generally, although use can be made of a mixture of an aromatic resin with a high softening point and an aromatic resin with a low softening point, these resins should simultaneously have ring-and-ball softening points of 80° to 118° C. Examples of the suitable resins include coumarone/indene resin, polystyrene resin, vinyltoluene/α-methylstyrene copolymer and polyindene resin.

Other tackifiers similarly suitable for use in the composition according to the first embodiment of the present invention are, for example, hydrogenated rosin, rosin ester, polyterpene, terpene phenol resin and polymerized mixed olefin, low-softening-point resin and liquid resin. An example of the liquid resin is resin Adtac LV (Adtac being trademark) produced by Hercules. The tackifier is selected from among saturated resins, hydrogenated dicyclopentadiene resin, hydrogenated polystyrene and poly-α-methylstyrene for attaining excellent thermal oxidation resistance and color stability. The tackifier is used in an amount of 0 to 400 parts by weight, preferably, 20 to 350 parts by weight and, optimally, 20 to 150 parts by weight per 100 parts by weight of the epoxidized block copolymer. A specified tackifier is selected mainly on the basis of specified polymer used in the relevant adhesive composition.

The composition according to the first embodiment of the present invention can contain a plasticizer such as a rubber extender plasticizer, a compounding oil, an organic or inorganic pigment and a dye. The compounding oil is well known by experts and includes both an oil of high saturation content and an oil of high aromatic content. Suitable plasticizers are high-saturation oil (e.g., Tufflo 6056 and 6204 oils (Tufflo being trademark) produced by Arco) and processing oil (e.g., Shellflex 371 (Shellflex being trademark) produced by Shell). Also, use may be made of plasticizers such as phthalic esters, aliphatic dibasic acid esters and phosphoric esters. In the composition according to the first embodiment of the present invention, the rubber compounding oil is used in an amount of 0 to 500 parts by weight, preferably, 0 to 100 parts by weight and, optimally, 0 to 60 parts by weight per 100 parts by weight of the epoxidized block copolymer.

Various fillers and pigments can be blended in coating and sealant compounds. As examples thereof, in particular, exterior coatings and sealants can be mentioned to which fillers are added for not only exerting desired effects but also improving coating and sealant properties such as weather resistance. Various fillers can be used, examples of which include calcium carbonate, clay, talc, silica, glass fiber, zinc oxide and titanium dioxide. The amount of filler generally ranges from 0 to 65% by weight based on the weight of nonsolvent components of the compound, depending on the type of filler used and the intended use of coating or sealant. Especially suitable filler is titanium dioxide.

In the application of the coating or sealant in the form of a solution in a solvent, the organic components of the compound are dissolved in a solvent or solvent blend. An aromatic hydrocarbon solvent (e.g., toluene, xylene or Shell Cyclo Sol 53) is suitable. Also, use can be made of aliphatic hydrocarbon solvents such as hexane, naphtha and mineral spirit. According to necessity, use may be made of a solvent blend consisting of a hydrocarbon solvent and a polar solvent. Examples of suitable polar solvents include esters (e.g., isopropyl acetate), ketones (e.g., methyl isobutyl ketone) and alcohols (e.g., isopropyl alcohol). The amount of polar solvent used depends on the structures of selected specified polar solvent and specified polymer which is used in the compound. Generally, the amount of polar solvent used ranges from 0 to 50% by weight based on the weight of solvent blend.

An antioxidant may be added to the composition for protecting the product from deterioration attributed to oxidation during the production and use of the composition. A combination of a primary antioxidant and a secondary antioxidant is suitable. This combination is, for example, a combination of a sterically hindered phenol derivative and a phosphite or thioether, e.g., a combination of hydroxyphenyl propionate and an aryl phosphate or thioether or a combination of aminophenol and an aryl phosphate. Examples of advantageous antioxidant combinations include a combination of 3-(3,5-di-t-butyl-4-hydroxyphenyl)propionate) methane (Irganox 1010 (Irganox being trademark) produced by Ciba-Geigy) and tris(nonylphenyl) phosphite (Polygard HR (Polygard being trademark) produced by Uniroyal) and a combination of Irganox 1010 and bis(2,4-di-t-butyl) pentaerythritol diphosphite (Ultranox 626 (Ultranox being trademark) produced by Borg-Warner).

All the adhesive, coating and sealant compositions based on the epoxidized block copolymer according to the first embodiment of the present invention comprises specified combinations of various compound components disclosed herein. What components are to be used is not particularly limited. Specified types of components can be selected and their concentrations can be regulated so that the composition is securely provided with a combination of required properties in accordance with arbitrary usage of the specified adhesive, coating and sealant. In the above composition, it is preferred that the content of the epoxidized block copolymer be at least 5% by weight.

The two necessarily used components of each of the adhesive, coating and sealant are the epoxidized block copolymer and the curing agent. The curing agent can be selected from among the above large number of varieties. In addition to these two components, whether or not to use various resins, fillers, pigments, plasticizers, reactive oligomers, stabilizers and/or solvents can be determined.

The coating is mostly a thin nonsticky pigment-filled composition applied to a support for protecting or decorating the support. Therefore, it may be required to use an epoxidized block copolymer hydrogenated so as to impart a satisfactory durability. Selection of the resin is made so as to ensure the maximum durability and the minimum dust collection. Selection of the filler and pigment is carefully made so as to impart the optimal durability and color. The coating mostly contains a solvent in relatively high concentration so that the application is facilitated and a smooth dry coating is provided.

The sealant is an agent which fills gaps. Therefore, it is used in a relatively thick layer so that the spacing between two supports is filled. As the two supports often make relative move, the sealant is generally a low-modulus composition which enables taking this move into consideration. As the sealant is often exposed to the open air, usually, use is made of the hydrogenated epoxidized block copolymer. The resin and plasticizer are selected so as to minimize the dust collection while maintaining the low modulus. The filler and pigment are selected so as to provide suitable durability and color. The sealant is applied in a relatively thick layer, so that the solvent concentration is rendered as low as possible for minimizing the shrinkage.

The adhesive, coating and sealant compositions according to the first embodiment of the present invention can be produced by blending the components at high temperature (preferably, 50° to 200° C.) until a uniform blend is obtained (generally, less than 3 hr). Various blending methods are known in the art, any of which can be employed as long as a uniform blend is formed. The obtained composition can be used in various applications. Alternatively, the components may be blended into a solvent.

The adhesive composition according to the first embodiment of the present invention can be used as a large variety of adhesives, e.g., a laminating adhesive, a pressure sensitive adhesive, a bonding adhesive, a hot melt adhesive, a solvent type adhesive and an aqueous adhesive from which water is removed before curing. Although each adhesive may consist only of the epoxidized block copolymer, generally, it is composed of a compounded composition comprising the epoxidized block copolymer as an active ingredient and other commonly known adhesive composition components. When the hot melt is applied at 100° C. or higher temperatures, the effect of the presence of water and other low-molecular-weight cationic polymerization inhibitor can be minimized. Therefore, the optimum hot melt application is conducted at about 100° C. or higher temperatures. The heating of the adhesive before the curing and after the curing can further promote the curing or postcuring.

The composition according to the first embodiment of the present invention is suitably used in the production of a pressure sensitive adhesive tape and label. This pressure sensitive adhesive tape consists of a soft packing sheet and, applied to one main surface thereof, a layer of the adhesive composition of the present invention. The packing sheet can be composed of a plastic film, paper or any other appropriate material. The above tape can include other various layers or coatings commonly used in the production of pressure sensitive adhesive tapes (e.g., primer, release coating and the like). When no tackifier is added, the composition according to the first embodiment of the present invention is used as the adhesive which does not damage, for example, paper and shaped items.

The coating composition according to the first embodiment of the present invention can be used in a large variety of applications, depending on the hardness, adherence, durability and curing conditions selected by the compounder. A pretty soft coating compounded for low adherence can be used as a plastifiable protective coating. A pretty soft coating compounded for high adherence can be used as a breakage preventive coating for carbonated beverage glass bottles. A pretty hard coating compounded for high adherence and long-term durability can be used as an artificial lawn or an anticorrosive coating for metals of an automobile, etc.

The sealant composition according to the first embodiment of the present invention can be used in a large variety of applications. It is most suitable for use as a gap filling agent for building. After the application, the sealant composition is baked (e.g., in a paint stove). This includes the use in automobile and appliance manufacture. Another suitable use of the sealant composition is in a gasket material, for example, caps of food and drink containers.

Asphalt is another customary material which is advantageous when used in combination with the epoxidized block copolymer according to the first embodiment of the present invention. The term "asphalt" used herein means bituminous materials such as straight asphalt, cut back asphalt, blown asphalt, natural asphalt, tar pitch and petroleum pitch. These are used either individually or in combination. Compatible asphalt is suitable for use in the first embodiment of the present invention. The compatible asphalt is asphalt which provides a blend which does not suffer from phase separation even if it is allowed to stand still. The amount of asphalt used in the compound can be largely varied depending on the performance required in specified use. However, the asphalt is generally incorporated in the compound in an amount of 5 to 95% by weight, preferably, 5 to 90% by weight.

The inventors have made further intensive studies and as a result have found that the acid value of the epoxidized block copolymer exerts a substantial influence on the amount of formed gel. The second embodiment of the present invention has been completed on the basis of this finding.

Illustratively, the second embodiment of the present invention is directed to an epoxidized block copolymer obtained by epoxidizing a block copolymer comprising a polymer block (A) composed mainly of a vinyl aromatic hydrocarbon compound and a polymer block (B) composed mainly of a conjugated diene compound or a product of hydrogenation of the block copolymer, this epoxidized block copolymer having an acid value of not greater than 10 mgKOH/g.

The term "block copolymer" as used in the second embodiment of the present invention means the block copolymer comprising a polymer block (A) composed mainly of a vinyl aromatic hydrocarbon compound and a polymer block (B) composed mainly of a conjugated diene compound. The term "product of hydrogenation of the block copolymer" means a polymer obtained by partially hydrogenating unsaturated carbon bonds contained in the polymer block (B) of the block copolymer through a hydrogenation reaction. The term "epoxidized block copolymer" as used in the second embodiment of the present invention means a polymer obtained by epoxidizing unsaturated carbon bonds contained in the polymer block (B) of the block copolymer or product of hydrogenation thereof.

Representative examples of the vinyl aromatic hydrocarbon compounds which can be employed in the formation of the block copolymer include styrene, various alkyl-substituted styrenes such as α-styrenes, alkoxy-substituted styrenes, vinylnaphthalene, alkyl-substituted vinylnaphthalene, divinylbenzene and vinyltoluene. Of these, styrene is especially preferred. These can be used either individually or in combination. Representative examples of the conjugated diene compounds which can be employed in the formation of the block copolymer include 1,3-butadiene, isoprene, 1,3-pentadiene, 2,3-dimethyl-1,3-butadiene, piperylene, 3-butyl-1,3-octadiene and phenyl-1,3-butadiene. Of these, 1,3-butadiene and isoprene are preferred because these are inexpensive and readily available. The above compounds can be used either individually or in combination.

In the block copolymer, the vinyl aromatic hydrocarbon compound and conjugated diene compound which can be employed in the formation thereof are preferably used in a ratio of 5/95 to 70/30, still preferably, 10/90 to 60/40. The number average molecular weight of the block copolymer suitable for use in the present invention is preferred to range from 5000 to 60,000, especially, 10,000 to 50,000. When the molecular weight is lower, rubbery elastomer properties are hardly exhibited. On the other hand, when the molecular weight is higher, unfavorably the melting becomes difficult. Although the structure of the block copolymer is not particularly limited, it may be, for example, vinyl aromatic hydrocarbon compound/conjugated diene compound block copolymers represented by the formulae: A-B-A, B-A-B-A and A-B-A-B-A. The structure of the molecule per se thereof may be any of linear, branched and radial configurations or an arbitrary combination of these. The process for producing the unepoxidized block copolymer is not particularly limited and any known process can be used.

For example, the processes as described in Japanese Patent Publication Nos. 23798/1965, 3252/1972, 2423/1973 and 28925/1981 can be mentioned in which the production is carried out in the presence of, for example, a lithium catalyst in an inert solvent. The process for producing the block copolymer hydrogenation product is not particularly limited and any known process can be used.

For example, the processes as described in Japanese Patent Publication Nos. 8704/1967 and 6636/1968 can be mentioned in which the block copolymer is hydrogenated in the presence of a hydrogenation catalyst in an inert solvent. Although the degree of hydrogenation is not particularly limited, when the epoxidation reaction follows, it is required that unsaturated carbon bonds capable of reacting with the epoxidizing agent remain in the molecule of the hydrogenation product. The block copolymer or product of hydrogenation thereof is dissolved or slurried in an appropriate organic solvent and thereafter epoxidized. The site epoxidized by the epoxidizing agent is an unsaturated bond contained in the polymer block (B).

Representative examples of organic solvents suitable for use in the epoxidation include linear and branched hydrocarbons such as pentane, hexane, heptane and octane and alkyl-substituted derivatives thereof, alicyclic hydrocarbons such as cyclopentane, cyclohexane and cycloheptane and alkyl-substituted derivatives thereof, aromatic hydrocarbons such as benzene, naphthalene, toluene and xylene and alkyl-substituted derivatives thereof and aliphatic carboxylic acid esters such as methyl, ethyl and propyl acetates. Of these, the use of cyclohexane, ethyl acetate, chloroform, toluene, xylene and hexane is preferred from the viewpoint of the solubility of the block copolymer or product of hydrogenation thereof and the easiness of subsequent solvent recovery. Representative examples of epoxidizing agents which can be used in the epoxidation reaction include organic peracids such as peracetic acid, perbenzoic acid, performic acid and trifluoroperacetic acid, hydrogen peroxide and mixtures of hydrogen peroxide and low molecular fatty acids.

According to necessity, a catalyst can be used in the epoxidation. Of the above epoxidizing agents, peracetic acid is the most suitable because not only is it industrially produced in large quantity so that it can be procured at lowered cost but also its stability is relatively high. The amount of added epoxidizing agent is not particularly limited and can be arbitrarily selected depending on, for example, the reactivity of the epoxidizing agent, the desired degree of epoxidation and the amount of unsaturated carbon bonds contained in the employed block copolymer or product of hydrogenation thereof. The epoxidation reaction temperature is varied depending on the types and amounts of epoxidizing agent used, solvent used, block copolymer and product of hydrogenation thereof and is not particularly limited.

For example, when peracetic acid is used as the epoxidizing agent, the reaction temperature preferably ranges from 0° to 70° C. When the reaction temperature is lower than 0° C., the reaction rate is too low. On the other hand, when the reaction temperature exceeds 70° C., unfavorably the formed epoxy ring is opened and decomposition of peracetic acid is promoted. For improving the stability of peracetic acid, a phosphate salt may be added to the reaction system prior to the epoxidation reaction. Thereafter, the solvent is removed and drying is performed, thereby recovering the epoxidized block copolymer.

The solvent removal can be effected by, for example, the method in which steam stripping is conducted in the presence of a surfactant or the method in which the solvent is directly removed by heating. The steam stripping method comprises stripping the solvent in the presence of a cationic, anionic, amphoteric or nonionic surfactant at a temperature which is not lower than the boiling point of the organic solvent or, when the organic solvent forms an azeotrope with water, the azeotropic temperature but not higher than 120° C. to thereby obtain a slurry having crumbled polymer dispersed in the water. The direct solvent removing method comprises removing the solvent by the use of, for example, a vacuum dryer.

Thereafter, dehydration and drying are conducted to thereby obtain the epoxidized block copolymer. The methods of dehydration and drying are not particularly limited and any customary methods may be employed.

The second embodiment of the present invention is characterized in that the acid value of the above obtained epoxidized block copolymer is not greater than 10 mgKOH/g. Herein, the acid value of the epoxidized block copolymer is the weight of potassium hydroxide required to neutralize acids contained in 1 g of the epoxidized block copolymer obtained by performing the epoxidation reaction, solvent removal and drying, which weight is measured by titration. The acids are mainly formed as by-products in the epoxidation reaction. For example, when peracetic acid is used as the epoxidizing agent, acetic acid is formed as by-product in the epoxidation reaction.

Further, acids attributed to starting material impurities and to various additives used in the above production of epoxidized block copolymer are also included in the acid value referred to in the second embodiment of the present invention as long as the amount thereof is determined by titration with potassium hydroxide. When the acid value is higher than 10 mgKOH/g, the gel content of finally obtained epoxidized block copolymer is so high that the melt flow processability is deteriorated unfavorably.

In particular, when the acid value is too high in the melt kneading of the epoxidized block copolymer together with other resin or rubber at high temperatures, a large amount of gel is formed during the melt kneading, so that the moldability of the composition is gravely deteriorated. The acid value can be regulated to 10 mgKOH/g or below by neutralizing and/or washing with water the epoxidized block copolymer solution obtained by the epoxidation reaction to thereby remove acids. When steam stripping follows, not only is steam distillation of the solvent carried out but also the acids are dissolved in water and removed with the result that the epoxidized block copolymer with an especially low acid value can be obtained.

Representative examples of alkaline aqueous solutions which can be used in the above neutralization include aqueous solutions of lithium hydroxide, sodium hydroxide, potassium hydroxide, calcium hydroxide, lithium carbonate, sodium carbonate, potassium carbonate, calcium carbonate, lithium hydrogen carbonate, sodium hydrogen carbonate, potassium hydrogen carbonate, sodium acetate, potassium acetate and ammonia. The above alkali is used in a molar amount required for neutralizing the acids which are present in the reaction mixture. When the amount of alkali is too large, the epoxy ring is opened unfavorably.

On the other hand, when the amount of alkali is too small, unfavorably acids remain and the gel content is increased to thereby deteriorate the properties of the epoxidized block copolymer. The water washing may be conducted either continuously or batchwise. In the batchwise washing, it is preferred that washing be repeated a few times with the use of 50 to 1000 parts by weight of water per 100 parts by weight of the crude reaction mixture resulting from the epoxidation.

In particular, when a large amount of epoxidizing agent is used, acids are incidentally formed in a large amount corresponding thereto. Thus, it is preferred that, for example, the frequency of washing be increased so as to achieve satisfactory removal of the acids. In the water washing, an inorganic salt such as sodium chloride or sodium sulfate may be added for achieving effective separation of the organic phase from the water phase.

The molecular weight distribution of the epoxidized block copolymer obtained in the second embodiment of the present invention is preferred to be 10 or below. The term "molecular weight distribution" used herein means a ratio (Mw/Mn) of weight-average molecular weight (Mw) to number-average molecular weight (Mn) in terms of polystyrene as measured by GPC.

The molecular weight distribution is still preferably 5 or below and optimally 3 or below. When the molecular weight distribution is larger than 10, unfavorably, the melt flowability of the resin is gravely deteriorated to thereby cause poor moldability. It is likely that the greater the amount of formed gel, the larger the molecular weight distribution. According to necessity, the epoxidized block copolymer of the present invention can be blended with various additives, e.g., an age resister, a crosslinking agent, a thermal stabilizer, an ultraviolet absorber, an inorganic filler such as silica, talc or carbon, a plasticizer and a softening agent such as oil before use thereof.

The epoxidized block copolymer according to the second embodiment of the present invention has excellent moldability because of the properties attributed to its peculiar skeletal structure and the low content of gel. Thus, the epoxidized block copolymer can be used in the form of, for example, a thermoplastic resin composition, rubbery polymer composition, asphalt composition, adhesive composition, sealant composition or damping composition. Further, the epoxidized block copolymer can be used in a resin compatibilizer, an impact resistance improver, a latex, an emulsion and a resin filler.

The epoxidized block copolymer with a low gel content and excellent moldability can be obtained by reducing the acid value thereof. In this epoxidized block copolymer, the amount of formed gel is especially small during the melt kneading thereof by heating. Therefore, the epoxidized block copolymer can most suitably be used in a composition with a thermoplastic resin or rubbery polymer, an asphalt composition, an adhesive, a resin filler and the like.

The inventors have studied the method of obtaining the epoxidized block copolymer which is excellent in thermal stability and hue and as a result have found that the object can be attained by the addition of any of specified stabilizers. The third embodiment of the present invention has been completed on the basis of this finding.

Illustratively, the third embodiment of the present invention provides an epoxidized block copolymer composition which comprises 100 parts by weight of an epoxidized block copolymer (hereinafter may be referred to simply as "polymer") obtained by epoxidizing a block copolymer comprising a polymer block (A) composed mainly of a vinyl aromatic hydrocarbon compound and a polymer block (B) composed mainly of a conjugated diene compound or a product of hydrogenation of the block copolymer and, added thereto, 0.005 to 10 parts by weight of a phenolic stabilizer and/or phosphorous stabilizer. Further, the third embodiment of the present invention provides the above defined epoxidized block copolymer composition in which the phenolic stabilizer is a member selected from the group consisting of tetrakis(methylene-3-(3',5'-di-tert-butyl-4'-hydroxyphenyl) propionate)methane, 1,3,5-trimethyl-2,4,6-tris(3,5-di-tert-butyl-4'-hydroxybenzyl)benzene and 2,6-di-tert-butyl-4-methylphenol and in which the phosphorous stabilizer is a member selected from the group consisting of trisnonylphenyl phosphite and tris(2,5-di-tert-butylphenyl) phosphite.

The most characteristic feature of the third embodiment of the present invention resides in the addition of the phenolic stabilizer and/or phosphorous stabilizer to the epoxidized block copolymer for obtaining the epoxidized block copolymer which is excellent in thermal stability and hue. The addition of these stabilizers enables markedly suppressing the deterioration of the epoxidized block copolymer by heating.

Representative examples of phenolic stabilizers which can be used in the third embodiment of the present invention include tetrakis(methylene-3-(3',5'-di-tert-butyl-4'-hydroxyphenyl)propionate)methane, 1,3,5-trimethyl-2,4,6-tris(3,5-di-tert-butyl-4'-hydroxybenzyl)benzene, 2,6-di-tert-butyl-4-methylphenol, 4-hydroxymethyl-2,6-di-tert-butylphenol, 2,4-bis(n-octylthio)-6-(4-hydroxy-3,5-di-tert-butylanilino)-1,3,5-triazine, octadecyl 3-(3,5-di-tert-butyl-4-hydroxyphenyl)propionate, triethylene glycol bis(3-(3-tert-butyl-5-methyl-4-hydroxyphenyl)propionate), 1,3,5-tris(4-tert-butyl-3-hydroxy-2,6-dimethylbenzyl)isocyanuric acid, 2,2'-methylenebis(4-methyl-6-tert-butylphenol), 3,9-bis(2-(3-(3-tert-butyl-4-hydroxy-5-methylphenyl) propionyloxy)-1,1-dimethylethyl)-2,4,8,10-tetraoxaspiro [5.5]undecane, 2,6-di-tert-butyl-4-ethylphenol, butylated hydroxyanisole, 2,2'-dihydroxy-3,3'-dicyclohexyl-5,5'-dimethyldiphenylmethane, 1,1,3-tris(2-methyl-4-hydroxy-5-tert-butylphenyl)butane, 4,4'-butylidene-bis(6-tert-butyl-m-cresol), bis(3-cyclohexyl-2-hydroxy-5-methylphenyl) methane, 2,2'-methylenebis(4-ethyl-6-tert-butylphenol) and 1,1-methylenebis(2'-methyl-4'-hydroxy-5'-tert-butylphenyl) butane. These phenolic stabilizers can be used in combination.

Representative examples of phosphorous stabilizers which can be used in the third embodiment of the present invention include trisnonylphenyl phosphite, tris(2,5-di-tert-butylphenyl) phosphite, tris(2-di-tert-butylphenyl) phosphite and tris(2,4-bis(1,1-dimethylpropyl)phenyl) phosphite. These phosphorous stabilizers can be used in combination.

In the third embodiment of the present invention, the phenolic stabilizer and the phosphorous stabilizer may be used either independently or in combination. In the third embodiment of the present invention, the phenolic stabilizer and/or phosphorous stabilizer is added in an amount of 0.005 to 10 parts by weight, preferably, 0.05 to 3 parts by weight and, still preferably, 0.1 to 2 parts by weight in terms of the amount of each of the stabilizers per 100 parts by weight of epoxidized block copolymer. When the amount of added stabilizer is smaller than 0.005 part by weight, the thermal stability would be deteriorated. On the other hand, even when the amount is greater than 10 parts by weight, further thermal stability improving effect is trivial. Therefore, the use of stabilizer in such a large amount is not desired from the economic point of view. The time of addition of the stabilizer is not particularly limited and the stabilizer can be incorporated at any step before finally obtaining the epoxidized block copolymer. For example, the thermal stabilizer may be added to the organic solution or slurry of the epoxidized block copolymer prior to steam stripping. Also, the thermal stabilizer may be added simultaneously with the dehydration and drying of hydrous crumbe after steam stripping with the use of an extruder. Further, the thermal stabilizer may be kneaded into the dried polymer again with the use of a kneading extruder.

Sulfur and amine stabilizers having been conventionally used may be added to the copolymer composition of the third embodiment of the present invention. Further, according to necessity, the copolymer composition can be loaded with various additives, e.g., an age resister, a crosslinking agent, an ultraviolet absorber, an inorganic filler such as silica, talc, carbon or glass fiber, a plasticizer and a softening agent such as oil before use thereof. The time of addition thereof is not particularly limited and these can be incorporated at any step before finally obtaining the epoxidized block copolymer. The epoxidized block copolymer composition having excellent thermal stability obtained by the process according to the third embodiment of the present invention can be utilized not only as various molded items such as a sheet, a film, variously shaped injection moldings and a hollow shaped article but also as a modifier of various thermoplastic resins, a pressure sensitive adhesive, a raw material of adhesives, an asphalt improver and raw materials of household electric appliances, automobile parts, industrial parts, household goods and toys.

The third embodiment of the present invention enables providing the epoxidized block copolymer composition having excellent thermal stability and hue, which is prepared through epoxidation of the block copolymer comprising the polymer block (A) composed mainly of the vinyl aromatic hydrocarbon compound and the polymer block (B) composed mainly of the conjugated diene compound or the product of hydrogenation of the block copolymer.

The inventors have further made intensive studies and as a result have found that the mutually blocking properties can effectively be suppressed without detriment to the inherent properties of the epoxidized block copolymer by adding a specified compound. The fourth embodiment of the present invention has been completed on the basis of this finding.

Illustratively, the fourth embodiment of the present invention provides a composition which comprises 100 parts by weight of an epoxidized block copolymer (E) obtained by epoxidizing a block copolymer (C) comprising a polymer block (A) composed mainly of a vinyl aromatic hydrocarbon compound and a polymer block (B) composed mainly of a conjugated diene compound or a product (D) of hydrogenation of the block copolymer and, added thereto, 0.001 to 5 parts by weight of an antiblocking agent.

The composition according to the fourth embodiment of the present invention is loaded with an antiblocking agent in an amount of 0.001 to 5 parts by weight, preferably, 0.01 to 2 parts by weight and, still preferably, 0.05 to 1 part by weight per 100 parts by weight of the epoxidized block copolymer (E) for inhibiting mutual blocking of the thus obtained epoxidized block copolymer (E). When the amount of added antiblocking agent is less than 0.001 part by weight, unfavorably, satisfactory antiblocking effect cannot be exerted. On the other hand, when the amount is greater than 5 parts by weight, also unfavorably, the inherent properties of the epoxidized block copolymer, especially, the transparency thereof, are gravely deteriorated although the blocking can be avoided. Mutual blocking of the obtained epoxidized block copolymer composition is substantially inhibited not only in the composition per se of powdery or pelletized form but also in various products of film or sheet form prepared therefrom.

Examples of antiblocking agents which can be used in the formation of the composition according to the fourth embodiment of the present invention include silicon compounds, fatty acid salts, fatty acid esters, fatty acid amides and nonionic surfactants. Representative examples of the silicon compounds include silicon oxide, silicone oil, silicon emulsion and other silicone fluids. The silicone fluids include alkyl, aryl and cycloalkyl-substituted silicone compounds having 0 to 12 carbon atoms per unit. Of these, silicon oxide and polydimethylsiloxane are especially preferred. It is preferred that silicon oxide have an average particle size ranging from 0.005 to 25 μm.

In the fatty acid residue employed to constitute a fatty acid salt or fatty acid ester as the antiblocking agent, the number of carbon atoms per molecule is selected within the range of 10 to 20, preferably, 12 to 18. When the number of carbon atoms is less than 10 or greater than 20, unfavorably, satisfactory antiblocking effect cannot be exerted. Representative examples of the fatty acid salts include salts composed of metals belonging to Groups I, II, III and IV of the periodic table and acids such as lauric acid, myristic acid, palmitic acid, stearic acid and oleic acid. Of these, calcium stearate is especially preferred. Representative examples of the fatty acid esters include glycerol monostearate, glycerol distearate and glycerol tristearate. Glycerol monostearate is especially preferred. Both the fatty acid salts and fatty acid esters may be used either individually or in combination.

Representative examples of the fatty acid amides as the antiblocking agents include stearamide, oleamide and ethylenebisstearamide. Representative examples of the noionic surfactants as the antiblocking agents include sorbitan esters, propylene glycol fatty acid esters, sucrose fatty acid esters, citric acid mono(di or tri)stearates, pentaerythritol fatty acid esters, trimethylol fatty acid esters, polyglycerol fatty acid esters, polyoxyethylene glycerol fatty acid esters, polyesters, polyoxyethylene sorbitan fatty acid esters, polyethylene glycol fatty acid esters, polypropylene glycol fatty acid esters, polyoxyethylene glycol aliphatic alcohol ethers, polyoxyethylene alkylphenyl ethers, N,N-bis(2-hydroxyethylene) fatty amines, fatty acid/diethanolamine condensates, polyoxyethylene/polyoxypropylene block polymers, polyethylene glycol and polypropylene glycol.

Especially preferred nonionic surfactants are those having polyoxyethylene units, such as polyoxyethylene glycerol fatty acid esters, polyoxyethylene sorbitan fatty acid esters, polyoxyethylene aliphatic alcohol ethers, polyoxyethylene alkylphenyl ethers and polyoxyethylene/polyoxypropylene block polymers.

At least one member may be selected from each of the above antiblocking agent groups or, occasionally, at least two members may be selected therefrom and used in mixture in order to obtain the composition according to the fourth embodiment of the present invention. Also, members may be selected from a plurality of groups selected from the various antiblocking agent groups consisting of the silicon compound, fatty acid salt, fatty acid ester, fatty acid amide and nonionic surfactant groups and used in mixture.

With respect to the method of incorporating the antiblocking agent, it is preferred that the anti-blocking agent be deposited on the surfaces of pellets of the epoxidized block copolymer (E) from the economic point of view. Examples of the methods include (1) the method in which the pellets are directly covered with the antiblocking agent, or the pellets are coated with the antiblocking agent and, according to necessity, dried; (2) the method in which the strand extruded through an extruder die is cut in water in which the antiblocking agent has been dissolved or suspended in advance and the obtained wet pellets are dried to thereby deposit the antiblocking agent on the pellet surface; and (3) the method in which the polymer (E) and the antiblocking agent are dryblended, and kneaded and pelletized by the use of a general-purpose extruder.

The epoxidized block copolymer composition according to the fourth embodiment of the present invention can be loaded with other various resin additives according to necessity. Examples of the other resin additives include an age resister, a crosslinking agent, a thermal stabilizer, an ultraviolet absorber, an inorganic filler such as silica, talc or carbon, a plasticizer and a softening agent such as oil.

The time of addition of these additives is not particularly limited and they can be incorporated at any step of the process of preparing the epoxidized block copolymer composition. For example, the thermal stabilizer may be added to the organic solution or slurry of the epoxidized block copolymer prior to steam stripping.

The epoxidized block copolymer composition obtained in the fourth embodiment of the present invention can be molded by the use of the molding technique for thermoplastic resins such as injection molding, extrusion molding, blow molding, compression molding or rotational molding into various products such as a sheet, a film, variously shaped injection moldings and a hollow shaped article. For example, the epoxidized block copolymer composition can be utilized not only as raw materials for molding of household electric appliances, automobile parts, industrial parts, household goods, toys and the like but also in a modifier of various thermoplastic resins, a pressure sensitive adhesive, a raw material of adhesives, an asphalt improver and the like.

The fourth embodiment of the present invention exerts the following especially advantageous effects and the value thereof is very high in industrial applications.

(1) The epoxidized block copolymer composition according to the fourth embodiment of the present invention has substantially suppressed mutually blocking properties, irrespective of the shape thereof. For example, the crumbs or pellets do not adhere to each other, and neither do the products prepared from this composition, e.g., films, sheets and other molded items.

(2) The epoxidized block copolymer composition according to the fourth embodiment of the present invention contains only a small amount of antiblocking agent, so that the transparency and other properties of the copolymer composition are not deteriorated.

The inventors have further made intensive studies and as a result have found that the epoxidized block copolymer can be recovered through a simple process without any economic problem by feeding the organic solvent solution of epoxidized block copolymer into an evaporator and directly evaporating off the organic solvent therein instead of the steam stripping method. The fifth embodiment of the present invention has been completed on the basis of this finding.

Illustratively, the fifth embodiment of the present invention provides a process for recovering an epoxidized block copolymer, the process comprising recovering an epoxidized block copolymer (E) obtained by epoxidizing in an organic solvent a block copolymer (C) comprising a polymer block (A) composed mainly of a vinyl aromatic hydrocarbon compound and a polymer block (B) composed mainly of a conjugated diene compound or a product (D) of hydrogenation of the block copolymer from an organic solvent solution thereof, wherein the organic solvent solution is fed into an evaporator to thereby directly evaporate off the organic solvent. The epoxidized block copolymer which does not suffer from odor development and appearance defects such as foaming during the molding step can be provided by lowering the residual organic solvent content to not greater than 5000 ppm according to the above process.

The fifth embodiment of the present invention will now be described in detail.

The characteristic feature of the fifth embodiment of the present invention resides in that the obtained organic solvent solution of epoxidized block copolymer (E) is quantitatively fed by means of, for example, a pump into an evaporator, where the organic solvent is directly evaporated off from the organic solvent solution to thereby recover the epoxidized block copolymer (E). Examples of such evaporators include a flash vessel evaporator, an agitating vessel evaporator, a thin-film evaporator, a wetted wall column evaporator, a longitudinal screwed evaporator and a vented extruder which enable one-stage or at least two-stage, i.e., multi-stage concentration. At least two evaporators selected from among the above ones may be used in combination for increasing the production capacity. Of the evaporators, the use of a vented extruder is especially preferred from the viewpoint that the solvent removing capacity is large and that the amount of scorched resin is small.

The vented extruder preferably used in the practice of the fifth embodiment of the present invention will be described now. The vented extruder is one having at least one, preferably, 1 to 10 and, still preferably, 1 to 5 deairing vent parts. In the extruder, the number of screws is at least one, preferably, at least two. Of these, a vented twin-screw extruder is especially preferred from the viewpoint of the availability for general purposes.

With respect to the vented extruder of the above structure, it is preferred that L/D (L representing the length of screw and D the outer diameter of screw) range from about 2 to 50, especially, from about 4 to 40. It is no matter whether the screws are structured so as to engage with each other or not and whether they are corotating or counterrotating.

A vented twin-screw extruder having such a structure that a heating medium can be passed through the internal part of each screw is the most suitable among the available varieties. The extruder of this structure is preferred from the viewpoint that a large amount of heat taken away at the time of evaporation of the organic solvent can satisfactorily be supplemented by a heat supply. Further, an extruder having a continuous gas phase zone at the upper part of the inside of the extruder is preferred from the viewpoint of the efficiency of removal of the organic solvent.

The temperature and internal pressure of the evaporator are determined taking into account, for example, the processing capacity, the properties of polymer (viscosity, thermal stability, etc.), the type and concentration of the organic solvent and the quality of the product. It is preferred that the temperature of the evaporator range from 80° to 300° C., especially, 120° to 250° C. When the temperature of the evaporator is lower than 80° C., removal of the organic solvent is not satisfactory. On the other hand, when it is higher than 300° C., unfavorably a large amount of gel occurs in the polymer. The internal pressure of the evaporator is determined so as to be preferably not greater than 500 Torr, still preferably, within the range of from 1 to 400 Torr. The internal pressure of the evaporator means the pressure at a point exhibiting the lowest pressure in the gas phase zone brought into contact with the resin within the evaporator. With respect to the extruder, generally, the above internal pressure means the value read from a pressure gauge mounted to the vent part. When the internal pressure of the evaporator is higher than 500 Torr, unfavorably, the organic solvent cannot satisfactorily be removed. In the use of the vented extruder, the screw revolution speed ranges from 20 to 500 rpm, preferably, from 30 to 400 rpm.

It is preferred that the organic solvent be directly evaporated off by the above operation (hereinafter also referred to as the "direct solvent removal") so that the residual organic solvent content of the finally obtained epoxidized block copolymer is not greater than 5000 ppm, preferably, not greater than 2000 ppm and, still preferably, not greater than 1000 ppm. When the residual organic solvent content is greater than 5000 ppm, unfavorably foaming and odor development are invited in the molding of the epoxidized block copolymer into a product configuration. The residual organic solvent content can easily be regulated by changing the conditions such as the temperature of the evaporator, the internal pressure of the evaporator and the processing speed.

The epoxidized block copolymer having undergone the direct solvent removal by the evaporator can be obtained in the form of any of foamed crumbs, granules and powder and also can be obtained in the form of strands and pellets. Preferably, the epoxidized block copolymer is obtained in the form of pellets.

According to necessity, the epoxidized block copolymer according to the fifth embodiment of the present invention can be loaded with various additives, e.g., a thermal stabilizer, an age resister, a crosslinking agent, an ultraviolet absorber, an inorganic filler such as silica, talc or carbon, a plasticizer and a softening agent such as oil before use thereof. The time of addition thereof is not particularly limited and these can be incorporated at any step before finally obtaining the epoxidized block copolymer.

The epoxidized block copolymer obtained by the process according to the fifth embodiment of the present invention per se can be utilized not only as various molded items such as a sheet, a film, variously shaped injection moldings and a hollow shaped article but also as a modifier of various thermoplastic resins, a pressure sensitive adhesive, a raw material of adhesives, an asphalt improver and raw materials of household electric appliances, automobile parts, industrial parts, household goods and toys.

The fifth embodiment of the present invention enables recovering the epoxidized block copolymer (E) synthesized by epoxidizing in the organic solvent the block copolymer (C) comprising the polymer block (A) composed mainly of the vinyl aromatic hydrocarbon compound and the polymer block (B) composed mainly of the conjugated diene compound or the product (D) of hydrogenation of the block copolymer from the organic solvent solution thereof through the simple economic process.

The inventors have still further studied the process for producing the epoxidized block copolymer and as a result have found that the above problems can be solved by conducting the first-stage concentration of the epoxidation reaction mixture with the use of an evaporator and the second-stage concentration with the use of a kneading evaporator (two-stage concentration) to thereby effect solvent removal. The sixth embodiment of the present invention has been completed on the basis of this finding.

Illustratively, the sixth embodiment of the present invention provides a process for producing an epoxidized block copolymer, which comprises the steps of:

mixing the block copolymer (C) comprising in its molecule not only a polymer block (A) composed mainly of a vinyl aromatic hydrocarbon compound but also a polymer block (B) composed mainly of a conjugated diene compound or a product (D) of hydrogenation of the block copolymer with an organic solvent so as to obtain an organic solvent solution or organic solvent slurry (hereinafter the "solution" may include the slurry) having a polymer concentration of 5 to 50% by weight;

conducting epoxidation with the use of an epoxidizing agent to thereby obtain an epoxidation reaction mixture;

feeding the epoxidation reaction mixture into an evaporator to thereby evaporate the organic solvent so that the epoxidation reaction mixture is concentrated; and feeding the concentrate into a kneading evaporator to thereby remove the organic solvent. Moreover, the epoxidized block copolymer producing process is provided in which each of the evaporator and kneading evaporator is at a temperature of 80° to 300° C. and an internal pressure of not greater than 500 Torr. Further, the epoxidized block copolymer producing process is provided in which the obtained epoxidized block copolymer (E) has an epoxy equivalent ranging from 140 to 2700. Still further, the epoxidized block copolymer producing process is provided in which the produced epoxidized block copolymer has a residual organic solvent concentration of not greater than 500 ppm. The sixth embodiment of the present invention will now be described in detail.

The sixth embodiment of the present invention is characterized in that the organic solvent is removed from the above obtained epoxidation reaction mixture containing the epoxidized block copolymer by means of a first evaporator (first-stage concentration) and then the remaining volatile component is distilled off by means of a second evaporator of the kneading type (second-stage concentration), so that the organic solvent can be evaporated off under condition such that the time of residence of polymer is short, i.e., the polymer having a residual organic solvent concentration of not greater than 500 ppm can be produced without suffering from long heat history.

Examples of evaporators which can be used in the first-stage concentration (first evaporators) in the sixth embodiment of the present invention include a shell and tube evaporator, a liquid film evaporator, a centrifugal thin-film evaporator and a plate evaporator. Of these, a shell and tube evaporator, a centrifugal thin-film evaporator and a plate evaporator are preferred. These have a large surface brought into contact with the epoxidation reaction mixture and are suitable for use in the concentration conducted at a high solvent content. The first-stage concentration is conducted so that the organic solvent content (volatile component content) ranges from 5 to 70% by weight, preferably, from 20 to 30% by weight. The use of the first evaporator enables reducing the size of the second evaporator.

Examples of kneading evaporators which can be used in the second-stage concentration (second evaporators) include a twin-screw evaporator of the surface renewing, self-cleaning type and a vented extruder each having kneading shafts. For realizing a large heating surface area, it is preferred to employ a kneading evaporator in which a heating medium can be passed through the internal part of each screw. The kneading evaporator with this structure can satisfactorily supply a large amount of heat required for evaporating the organic solvent. Further, this kneading evaporator is especially preferred from the viewpoint that the piston flow properties free of back mixing are exhibited to thereby ensure excellent blending performance and that the evaporation surface area can be large. With respect to the structure of the kneading evaporator, it is preferred that L/D (L representing the length of screw and D the outer diameter of screw) range from about 2 to 50, especially, from about 4 to 40. It is no matter whether the screws are structured so as to engage with each other or not and whether they are corotating or counterrotating. The kneading evaporator enables stably removing the organic solvent even from the epoxidation reaction mixture whose viscosity has increased because in the reduction of the organic solvent concentration.

Oil and other heating media, steam and an electrical heater can be used as the heating source for each evaporator.

In a practical mode of the epoxidized block copolymer producing process according to the sixth embodiment of the present invention, first, the epoxidation reaction mixture is continuously fed by means of a gear pump into the first evaporator, in which the solvent is distilled off within a flash tank at heating temperature not lower than the boiling point of the solvent. The epoxidation reaction mixture may be one washed with water in advance. The water washing may be conducted either continuously or batchwise. In the batchwise washing, it is preferred that washing be repeated a few times with the use of 50 to 1000 parts by weight of water per 100 parts by weight of the crude reaction mixture resulting from the epoxidation.

The organic solvent contained in large quantity in the epoxidation reaction mixture can easily be removed by conducting heating evaporation in the first evaporator.

In the sixth embodiment of the present invention, the volatile component is distilled off from the concentrate obtained by evaporation by means of the first evaporator with the use of the second evaporator to thereby separate the epoxidized block copolymer from the organic solvent. Distilling off the volatile component with the use of the second evaporator enables stably evaporating the organic solvent remaining in the concentrate under condition such that the time of residence of concentrate is short, i.e., the epoxidized block copolymer can be produced without suffering from long heat history.

The obtained epoxidized block copolymer can be extrusion molded in the customary manner into any form selected from among those of strands, pellets, foamed crumbs, granules and powder, preferably, into the form of pellets.

The internal temperature and internal pressure of each of the evaporator and the kneading evaporator are determined taking into account, for example, the processing capacity, the properties of polymer (viscosity, thermal stability, etc.), the type and concentration of the solvent and the quality of the product. It is preferred that the internal temperature of each of both the evaporators range from 80° to 300° C., especially, 120° to 250° C. When the internal temperature of the evaporator is lower than 80° C., the viscosity is increased with the result that removal of the organic solvent becomes difficult unless the degree of pressure reduction is raised. On the other hand, when it is higher than 300° C., unfavorably gelation occurs in the polymer. In particular, when the epoxidized block copolymer remains in the evaporator with the result of occurrence of a large amount of gel, unfavorably not only is the melt viscosity too high but also fisheyes are likely to occur in the product to thereby cause molding defects. The gel content is preferred to be not greater than 5% by weight, especially, not greater than 3% by weight and, still especially, not greater than 1% by weight. The gel content is expressed as the weight percentage of insolubles in tetrahydrofuran (THF).

The internal pressure of each evaporator is determined so as to be preferably not greater than 500 Torr, still preferably, within the range of from 1 to 400 Torr. When the internal pressure of the evaporator is higher than 500 Torr, unfavorably, the solvent cannot satisfactorily be removed.

It is preferred that the residual organic solvent content of the finally obtained epoxidized block copolymer be not greater than 5,000 ppm, preferably, not greater than 2000 ppm, still preferably, not greater than 1000 ppm and, most especially, not greater than 500 ppm. When the residual organic solvent content is too high, foaming and odor development are invited in the molding of the epoxidized block copolymer unfavorably.

According to necessity, the epoxidized block copolymer according to the sixth embodiment of the present invention can be blended with various additives, e.g., a thermal stabilizer, an age resister, a crosslinking agent, an ultraviolet absorber, an inorganic filler such as silica, talc or carbon, a plasticizer and a softening agent such as oil before use thereof. The time of addition thereof is not particularly limited and the additives can be incorporated at any time before finally obtaining the epoxidized block copolymer.

The epoxidized block copolymer obtained by the process according to the sixth embodiment of the present invention is suitable for use in modifiers or modifier auxiliaries for rubbery or resinous polymers, adhesives, sealants, asphalt improvers and the like.

The sixth embodiment of the present invention enables separating the epoxidized block copolymer from the organic solvent without causing the epoxidized block copolymer to suffer from long-time heat history to thereby obtain the epoxidized block copolymer whose heat deterioration is trivial by removing the organic solvent from the epoxidation reaction mixture through the two-stage concentration.

The inventors have still further studied the direct removal of the solvent from the epoxidation reaction mixture and as a result have found that the epoxidized block copolymer having excellent thermal stability can be easily obtained at lowered cost by mixing a specified stabilizer with the epoxidation reaction mixture and then removing the organic solvent. The seventh embodiment of the present invention has been completed on the basis of this finding.

Illustratively, the seventh embodiment of the present invention provides a process for producing an epoxidized block copolymer, which comprises the steps of:

epoxidizing in an organic solvent a block copolymer (C) comprising a polymer block (A) composed mainly of a vinyl aromatic hydrocarbon compound and a polymer block (B) composed mainly of a conjugated diene compound or a product (D) of hydrogenation of the block copolymer to thereby obtain an epoxidation reaction mixture containing an epoxidized block copolymer (E);

adding a phenolic stabilizer and/or a phosphorous stabilizer to the epoxidation reaction mixture in an amount of 0.005 to 5 parts by weight per 100 parts by weight of finally obtained epoxidized block copolymer; and removing the organic solvent from the epoxidation reaction mixture. Further, the epoxidized block copolymer producing process is provided in which the organic solvent is directly evaporated off from the epoxidation reaction mixture having the phenolic stabilizer and/or phosphorous stabilizer added thereto. Still further, the epoxidized block copolymer producing process is provided in which, after the removal of the organic solvent, the epoxidized block copolymer has a residual organic solvent content of not greater than 5000 ppm. The seventh embodiment of the present invention will now be described in detail.

The characteristic feature of the seventh embodiment of the present invention resides in that the obtained epoxidation reaction mixture containing the epoxidized block copolymer (E) is quantitatively fed by means of, for example, a pump into an evaporator, then a phenolic stabilizer and/or a phosphorous stabilizer is added to the epoxidation reaction mixture and finally the organic solvent is directly evaporated off from the epoxidation reaction mixture. The epoxidized block copolymer (E) obtained in the above manner exhibits a markedly improved thermal stability, has a less tendency for gelation even if allowed to stand still at high temperature and enables marked suppression of a hue deterioration. Moreover, for adding a stabilizer to a plastic or rubber, it is generally needed to knead the stabilizer into the copolymer by the use of a device such as a kneading extruder. However, in the above method according to the seventh embodiment of the present invention, it is only needed to put the stabilizer in the epoxidation reaction mixture containing the epoxidized block copolymer (E) and thus it is not needed to conduct kneading of the stabilizer. This ensures operational and economic advantages.

Representative examples of phenolic stabilizers which can be used in the seventh embodiment of the present invention include tetrakis(methylene-3-(3',5'-di-tert-butyl-4'-hydroxyphenyl)propionate)methane, 1,3,5-trimethyl-2,4,6-tris(3,5-di-tert-butyl-4'-hydroxybenzyl)benzene, 2,6-di-tert-butyl-4-methylphenol, 4-hydroxymethyl-2,6-di-tert-butylphenol, 2,4-bis(n-octylthio)-6-(4-hydroxy-3,5-di-tert-butylanilino)-1,3,5-triazine, octadecyl 3-(3,5-di-tert-butyl-4-hydroxyphenyl)propionate, triethylene glycol bis(3-(3-tert-butyl-5-methyl-4-hydroxyphenyl)propionate), 1,3,5-tris(4-tert-butyl-3-hydroxy-2,6-dimethylbenzyl)isocyanuric acid, 2,2'-methylenebis(4-methyl-6-tert-butylphenol), 3,9-bis(2-(3-(3-tert-butyl-4-hydroxy-5-methylphenyl)propionyloxy)-1,1-dimethylethyl)-2,4,8,10-tetraoxaspiro[5.5]undecane, 2,6-di-tert-butyl-4-ethylphenol, butylated hydroxyanisole, 2,2'-dihydroxy-3,3'-dicyclohexyl-5,5'-dimethyldiphenylmethane, 1,1,3-tris(2-methyl-4-hydroxy-5-tert-butylphenyl)butane, 4,4'-butylidene-bis(6-tert-butyl-m-cresol), bis(3-cyclohexyl-2-hydroxy-5-methylphenyl)methane, 2,2'-methylenebis(4-ethyl-6-tert-butylphenol) and 1,1-methylenebis(2'-methyl-4'-hydroxy-5'-tert-butylphenyl)butane. Of these, tetrakis(methylene-3-(3',5'-di-tert-butyl-4'-hydroxyphenyl)propionate)methane and 2,6-di-tert-butyl-4-methylphenol are preferred. The above phenolic stabilizers can be used in combination.

Representative examples of phosphorous stabilizers which can be used in the seventh embodiment of the present invention include trisnonylphenyl phosphite, tris(2,5-di-tert-butylphenyl) phosphite, tris(2,4-di-tert-butylphenyl) phosphite and tris(2,4-bis(1,1-dimethylpropyl)phenyl) phosphite. These phosphorous stabilizers can be used in combination.

In the seventh embodiment of the present invention, the phenolic stabilizer and the phosphorous stabilizer may be used either independently or in combination. The phenolic stabilizer and/or phosphorous stabilizer is added in an amount of 0.005 to 5 parts by weight, preferably, 0.05 to 3 parts by weight and, still preferably, 0.1 to 2 parts by weight per 100 parts by weight of epoxidized block copolymer finally obtained after the removal of the solvent. The amount of stabilizer to be added to the epoxidation reaction mixture can be easily calculated from the concentration of block copolymer in the mixture and from the desired concentration. When the amount of added stabilizer is smaller than 0.005 part by weight, the thermal stability would be deteriorated. On the other hand, even when the amount is greater than 5 parts by weight, further thermal stability improving effect is trivial. Therefore, the use of stabilizer in such a large amount is not desired from the economic point of view.

Examples of evaporators which can be used in the seventh embodiment of the present invention include a flash vessel evaporator, an agitating vessel evaporator, a thin-film evaporator, a wetted wall column evaporator, a longitudinal screwed evaporator and a vented extruder which enable one-stage or at least two-stage, i.e., multi-stage concentration. At least two evaporators selected from among the above may be used in combination for increasing the production capacity. Of the evaporators, the use of a vented extruder is especially preferred from the viewpoint that the solvent removing capacity is large and that the amount of scorched resin is small.

The vented extruder preferably used in the practice of the seventh embodiment of the present invention will be described now.

The vented extruder is one having at least one, preferably, 1 to 10 and, still preferably, 1 to 5 deairing vent parts. In the extruder, the number of screws is at least one, preferably, at least two. Of these, a vented twin-screw extruder is especially preferred from the viewpoint of the availability for general purposes. With respect to the vented extruder of the above structure, it is preferred that L/D (L representing the length of screw and D the outer diameter of screw) range from about 2 to 50, especially, from about 4 to 40. It is no matter whether the screws are structured so as to engage with each other or not and whether they are corotating or counterrotating.

A vented twin-screw extruder having such a structure that a heating medium can be passed through the internal part of each screw is the most suitable among the available varieties. The extruder of this structure is preferred from the viewpoint that a large amount of heat taken away at the time of evaporation of the organic solvent can satisfactorily be supplemented by a heat supply. Further, an extruder having a continuous gas phase zone at the upper part of the inside of the extruder is preferred from the viewpoint of the efficiency of removal of the organic solvent.

The internal temperature and internal pressure of the evaporator are determined taking into account, for example, the processing capacity, the properties of polymer (viscosity, thermal stability, etc.), the type and concentration of the organic solvent and the quality of the product. It is preferred that the internal temperature of the evaporator range from 80° to 300° C., especially, 120° to 250° C. When the internal temperature of the evaporator is lower than 80° C., removal of the organic solvent is not satisfactory. On the other hand, when it is higher than 300° C., a large amount of gel occurs in the polymer unfavorably. In particular, when the epoxidized block copolymer remains in the evaporator at high temperature with the result of occurrence of a large amount of gel, unfavorably not only is the melt viscosity too high but also fisheyes are likely to occur to thereby cause molding defects. The gel content is preferred to be not greater than 5% by weight, especially, not greater than 3% by weight and, still especially, not greater than 1% by weight.

The internal pressure of the evaporator is determined so as to be preferably not greater than 500 Torr, still preferably, within the range of from 1 to 400 Torr. The internal pressure of the evaporator means the pressure at a point exhibiting the lowest pressure in the gas phase zone brought into contact with the resin within the evaporator. With respect to the extruder, generally, the above internal pressure means the value read from a pressure gauge mounted to the vent part. When the internal pressure of the evaporator is higher than 500 Torr, unfavorably, the organic solvent cannot satisfactorily be removed. In the use of the vented extruder, the screw revolution speed ranges from 20 to 500 rpm, preferably, from 30 to 400 rpm.

It is preferred that the organic solvent be directly evaporated off from the epoxidation reaction mixture so that the residual organic solvent content of the finally obtained epoxidized block copolymer is not greater than 5000 ppm, especially, not greater than 2000 ppm, still especially, not greater than 1000 ppm and, optimally, not greater than 500 ppm. When the residual organic solvent content is greater than 5000 ppm, unfavorably foaming and odor development are invited in the molding of the epoxidized block copolymer into a product configuration. The residual organic solvent content can easily be regulated by changing the conditions such as the temperature of the evaporator, the internal pressure of the evaporator and the processing speed.

The epoxidized block copolymer having undergone the direct solvent removal by the evaporator can be obtained in any form selected from among strands, pellets, foamed crumbs, granules and powder. Preferably, the epoxidized block copolymer is obtained in the form of pellets.

According to necessity, the epoxidized block copolymer according to the seventh embodiment of the present invention can be loaded with various additives, e.g., a thermal stabilizer, an age resister, a crosslinking agent, an ultraviolet absorber, an inorganic filler such as silica, talc or carbon, a plasticizer and a softening agent such as oil before use thereof. The time of addition thereof is not particularly limited and these can be incorporated at any step before finally obtaining the epoxidized block copolymer.

The epoxidized block copolymer obtained by the process according to the seventh embodiment of the present invention can be utilized not only as various molded items such as a sheet, a film, variously shaped injection moldings and a hollow shaped article but also as a modifier of various thermoplastic resins, a pressure sensitive adhesive, a raw material of adhesives, an asphalt improver and raw materials of household electric appliances, automobile parts, industrial parts, household goods and toys.

The seventh embodiment of the present invention enables producing the epoxidized block copolymer of excellent hue in which the amount of gel formed is trivial at heating by the economically advantageous process.

The inventors have further made intensive studies and as a result have found that the object can be attained by specified steps including a step in which the organic solvent is directly removed from the epoxidation reaction mixture in the process for producing the epoxidized block copolymer. The eighth embodiment of the present invention has been completed on the basis of this finding.

Illustratively, the eighth embodiment of the present invention provides a process for producing an epoxidized block copolymer (E) through epoxidation of a block copolymer (C) comprising a polymer block (A) composed mainly of a vinyl aromatic hydrocarbon compound and a polymer block (B) composed mainly of a conjugated diene compound or a product (D) of hydrogenation of the block copolymer, which process comprises the steps of:

(1) mixing the block copolymer (C) or product (D) of hydrogenation thereof with an organic solvent so as to obtain an organic solvent solution or organic solvent slurry having a polymer concentration of 5 to 50% by weight (hereinafter may be referred to simply as the "organic solvent solution");

(2) epoxidizing unsaturated carbon bonds contained in the polymer block (B) with the use of an epoxidizing agent in the organic solvent solution or organic solvent slurry to thereby obtain a reaction mixture;

(3) washing with water and/or neutralizing the epoxidation reaction solution or slurry obtained in the step (2) (hereinafter may be referred to simply as the "epoxidation reaction mixture") so that the acid value of the epoxidation reaction mixture does not exceed 5 mgKOH/g; and (4) feeding the epoxidation reaction mixture having undergone the water washing and/or neutralization into an evaporator to thereby directly evaporate off the organic solvent, so that an epoxidized block copolymer (E) is obtained whose residual organic solvent content is not greater than 5000 ppm and whose gel content is not greater than 5% by weight.

Further, the epoxidized block copolymer producing process is provided in which the epoxy equivalent of the epoxidized block copolymer (E) ranges from 140 to 2700. The eighth embodiment of the present invention will now be described in detail.

In the eighth embodiment of the present invention, the produced block copolymer (C) or product (D) of hydrogenation thereof is subjected to the following first to fourth steps to thereby obtain the epoxidized block copolymer.

In the first step according to the eighth embodiment of the present invention, an organic solvent is mixed with the block copolymer (C) or product (D) of hydrogenation thereof so as to obtain an organic solvent solution having a polymer concentration of 5 to 50% by weight. Representative examples of suitable organic solvents include linear and branched hydrocarbons such as pentane, hexane, heptane and octane and alkyl-substituted derivatives thereof, alicyclic hydrocarbons such as cyclopentane, cyclohexane and cycloheptane and alkyl-substituted derivatives thereof, aromatic hydrocarbons such as benzene, naphthalene, toluene and xylene and alkyl-substituted derivatives thereof, aliphatic carboxylic acid esters such as methyl, ethyl and propyl acetates and halogenated hydrocarbons such as chloroform. Of these, the use of cyclohexane, ethyl acetate, chloroform, toluene, xylene and hexane is preferred from the viewpoint of the solubility of the block copolymer. (C) or product (D) of hydrogenation thereof and the easiness of subsequent solvent recovery.

When the concentration of the block copolymer (C) or product (D) of hydrogenation thereof is lower than 5% by weight, actually a too large amount of solvent must be used to an economic disadvantage. On the other hand, when the concentration is higher than 50% by weight, the solution viscosity is unfavorably too high, so that the mixing of the epoxidizing agent and the organic solvent solution or slurry is unsatisfactory in the second step and that removal of the reaction heat is difficult.

In the second step of the eighth embodiment of the present invention, unsaturated bonds present in the polymer block (B) contained in the organic solvent solution are epoxidized with an epoxidizing agent.

The epoxidation of the block copolymer (C) or product (D) of hydrogenation thereof can be performed by a reaction with, for example, an organic peracid.

Examples of epoxidizing agents which can be used in the epoxidation reaction include organic peracids such as peracetic acid, perbenzoic acid, performic acid and trifluoroperacetic acid, hydrogen peroxide and mixtures of hydrogen peroxide and low molecular fatty acids. Of these, peracetic acid is the most suitable epoxidizing agent because not only is it industrially produced in large quantity so that it can be obtained at lowered cost but also its stability is relatively high. A catalyst can be used in the epoxidation according to necessity.

The epoxidation reaction temperature is varied depending on, for example, the employed epoxidizing agent, the employed organic solvent and the type and amount of block copolymer or hydrogenation product thereof and is not particularly limited. For example, when peracetic acid is used as the epoxidizing agent, the reaction temperature preferably ranges from 0° to 70° C., When the reaction temperature is lower than 0° C., the reaction rate is too low. On the other hand, when the reaction temperature exceeds 70° C., unfavorably the formed epoxy ring is opened and decomposition of peracetic acid is promoted. For improving the stability of peracetic acid, a phosphate salt may be added to the reaction system prior to the epoxidation reaction. From the viewpoint of productivity, it is preferred that the epoxidation reaction time be selected within the range of 0.1 to 72 hr, especially, 0.2 to 10 hr.

In the third step of the eighth embodiment of the present invention, the epoxidation reaction mixture is washed with water and/or neutralized so that the acid value of the reaction mixture does not exceed 5 mgKOH/g. Herein, the acid value is the weight of potassium hydroxide required to neutralize acids contained in 1 g of the crude reaction mixture resulting from the epoxidation reaction, which weight is measured by titration.

The purpose of the water washing and/or neutralization is to remove acids and other by-products incidentally formed by the epoxidation reaction carried out in the preceding step. When the acid value is higher than 5 mgKOH/g, unfavorably, the epoxy ring of the epoxidized block copolymer is opened and the properties of the epoxidized block copolymer are deteriorated.

The water washing may be conducted either continuously or batchwise. In the batchwise washing, it is preferred that washing be repeated a few times with the use of 50 to 1000 parts by weight of water per 100 parts by weight of the crude reaction mixture resulting from the epoxidation. In particular, when a large amount of epoxidizing agent is used, acids are incidentally formed in a large amount corresponding thereto. Thus, it is preferred that, for example, the frequency of washing be increased so as to achieve satisfactory removal of the acids. In the water washing, an inorganic salt such as sodium chloride or sodium sulfate may be added for achieving effective separation of the organic phase from the water phase.

Representative examples of alkaline aqueous solutions which can be used in the above neutralization include aqueous solutions of lithium hydroxide, sodium hydroxide, potassium hydroxide, calcium hydroxide, lithium carbonate, sodium carbonate, potassium carbonate, calcium carbonate, lithium hydrogen carbonate, sodium hydrogen carbonate, potassium hydrogen carbonate, sodium acetate and potassium acetate. The above alkali is used in a molar amount required for neutralizing the acids which are present in the reaction mixture. When the amount of alkali is too large, unfavorably the epoxy ring is opened. On the other hand, when the amount of alkali is too small, unfavorably acids remain so as to cause deterioration leading to poor properties. For suppressing the opening of epoxy ring caused by exothermic neutralization, it is preferred that the neutralization be conducted while cooling the crude reaction mixture.

In the fourth step of the eighth embodiment of the present invention, the obtained epoxidation reaction mixture containing the epoxidized block copolymer (E) is quantitatively fed by means of, for example, a pump into an evaporator, where the organic solvent is directly evaporated off from the reaction mixture to thereby recover the epoxidized block copolymer.

Examples of evaporators which can be used in the eighth embodiment of the present invention include a flash vessel evaporator, an agitating vessel evaporator, a thin-film evaporator, a wetted wall column evaporator, a longitudinal screwed evaporator and a vented extruder which enable one-stage or at least two-stage, i.e., multi-stage concentration. At least two evaporators selected from among the above can be used in combination for increasing the production capacity. Of the evaporators, the use of a vented extruder is especially preferred from the viewpoint that the solvent removing capacity is large and that the amount of scorched resin is small.

The vented extruder preferably used in the practice of the eighth embodiment of the present invention will now be described in detail.

The vented extruder is preferred to have at least one, especially, 1 to 10 and, still especially, 1 to 5 deairing vent parts. In the extruder, the number of screws is preferred to be at least one, especially, at least two. Of these, a vented twin-screw extruder is especially preferred from the viewpoint of the availability for general purposes. With respect to the vented extruder of the above structure, it is preferred that L/D (L representing the length of screw and D the outer diameter of screw) range from about 2 to 50, especially, from about 4 to 40. It is no matter whether the screws are structured so as to engage with each other or not and whether they are corotating or counterrotating.

A vented twin-screw extruder having such a structure that a heating medium can be passed through the internal part of each screw is the most suitable among the available varieties. The extruder of this structure is preferred from the viewpoint that a large amount of heat taken away at the time of evaporation of the organic solvent can satisfactorily be supplemented by a heat supply. Further, an extruder having a continuous gas phase zone at the upper part of the inside of the extruder is preferred from the viewpoint that the efficiency of removal of the solvent is high.

The internal temperature and internal pressure of the evaporator are determined taking into account, for example, the processing capacity, the properties of polymer (viscosity, thermal stability, etc.), the type and concentration of the solvent and the quality of the product. It is preferred that the internal temperature of the evaporator range from 80° to 300° C., especially, 120° to 250° C. When the internal temperature of the evaporator is lower than 80° C., removal of the organic solvent is not satisfactory to thereby cause low viscosity. On the other hand, when it is higher than 300° C., a large amount of gel occurs in the polymer unfavorably. In particular, when the epoxidized block copolymer remains in the evaporator used in the fourth step at high temperatures with the result of occurrence of a large amount of gel, unfavorably not only is the melt viscosity too high but also fisheyes are likely to occur to thereby cause molding defects. The gel content is preferred to be not greater than 5% by weight, especially, not greater than 3% by weight and, still especially, not greater than 1% by weight.

The internal pressure of the evaporator is determined so as to be preferably not greater than 500 Torr, still preferably, within the range of from 1 to 400 Torr. The internal pressure of the evaporator means the pressure at a point exhibiting the lowest pressure in the gas phase zone brought into contact with the resin within the evaporator. With respect to the extruder, generally, the above internal pressure means the value read from a pressure gauge mounted to the vent part. When the internal pressure of the evaporator is higher than 500 Torr, unfavorably, the organic solvent cannot satisfactorily be removed. In the use of the vented extruder, the screw revolution speed ranges from 20 to 500 rpm, preferably, from 30 to 400 rpm.

It is preferred that the organic solvent be directly evaporated off from the epoxidation reaction mixture by the above operation (hereinafter also referred to as the "direct solvent removal") so that the residual organic solvent content of the finally obtained epoxidized block copolymer is not greater than 5000 ppm, especially, not greater than 2000 ppm, still especially, not greater than 1000 ppm and, optimally, not greater than 500 ppm. When the residual organic solvent content is greater than 5000 ppm, foaming and odor development are invited in the molding of the epoxidized block copolymer into a product configuration unfavorably. The residual organic solvent content can easily be regulated by changing the conditions such as the temperature of the evaporator, the internal pressure of the evaporator and the processing speed.

The epoxidized block copolymer having undergone the direct solvent removal by the evaporator can be obtained in any form selected from among strands, pellets, foamed crumbs, granules and powder. Preferably, the epoxidized block copolymer is obtained in the form of pellets.

According to necessity, the epoxidized block copolymer according to the eighth embodiment of the present invention can be loaded with various additives, e.g., a thermal stabilizer, an age resister, a crosslinking agent, an ultraviolet absorber, an inorganic filler such as silica, talc or carbon, a plasticizer and a softening agent such as oil before use thereof. The time of addition thereof is not particularly limited and these can be incorporated at any step before finally obtaining the epoxidized block copolymer.

The epoxidized block copolymer obtained by the process according to the eighth embodiment of the present invention can be utilized not only as various molded items such as a sheet, a film, variously shaped injection moldings and a hollow shaped article but also as a modifier of various thermoplastic resins, a pressure sensitive adhesive, a raw material of adhesives, an asphalt improver and raw materials of household electric appliances, automobile parts, industrial parts, household goods and toys.

The eighth embodiment of the present invention provides the economic and simple process comprising the above combination of four specified steps, which process enables producing the epoxidized block copolymer (E) whose residual organic solvent content and gel content are small by epoxidizing the block copolymer (C) comprising the polymer block (A) composed mainly of the vinyl aromatic hydrocarbon compound and the polymer block (B) composed mainly of the conjugated diene compound or the product (D) of hydrogenation of the block copolymer.

BEST MODE FOR CARRYING OUT THE INVENTION

The first to eighth embodiments of the present invention will be described below with reference to the following Examples which in no way limit the scope of the invention.

First Embodiment

Example 1-1

300 parts by weight of polystyrene-polybutadiene-polystyrene (SBS) block copolymer (trade name: TR-2000, produced by Japan Synthetic Rubber Co., Ltd.) was completely dissolved in 1500 parts by weight of ethyl acetate. 169 parts by weight of an ethyl acetate solution containing 30% peracetic acid was continuously dropped into the copolymer solution and an epoxidation reaction was carried out at 40° C. for 3 hr under agitation. The resultant reaction mixture was cooled to room temperature and washed thrice with pure water which was used in the same amount as that of the reaction mixture, thereby obtaining an ethyl acetate solution of epoxidized polystyrene-polybutadiene-polystyrene polymer (ESBS) having an acid value of 1.5 mgKOH/g. This solution was fed into a deaerator, in which the solution was heated in a vacuum to thereby remove the ethyl acetate. The total chlorine concentration of the obtained resin was 4.9 ppm. The molar ratio of OH group to epoxy group (hereinafter referred to as the "R-value"), melt viscosity, etc. of the obtained epoxidized block copolymer are given in Table 1-1.

Example 1-2

A solution of ESBS having an acid value of 0.9 mgKOH/g was obtained in the same manner as in Example 1-1, except that, after the completion of the epoxidation reaction, the reaction mixture was washed with a 0.1N aqueous sodium carbonate solution in place of the pure water. The R-value, melt viscosity, etc. of the obtained epoxidized block copolymer are given in Table 1-1.

Example 1-3

ESBS was obtained in the same manner as in Example 1-1, except that, in the epoxidation reaction, the amount of the ethyl acetate solution containing 30% peracetic acid was changed to 422.5 parts by weight. The R-value, melt viscosity, etc. of the obtained epoxidized block copolymer are given in Table 1-1.

Example 1-4

300 parts by weight of polystyrene-polybutadiene-polystyrene block copolymer (trade name: TR-2000, produced by Japan Synthetic Rubber Co., Ltd.) was dissolved in 3000 parts by weight of cyclohexane in a jacketed reactor equipped with an agitator and a thermometer. 40 ml of a cyclohexane solution of di-p-tolylbis(1-cyclopentadienyl) titanium (concentration: 1 mmol/liter) and 8 ml of an n-butyllithium solution (concentration: 5 mmol/liter) were mixed together at 0° C. under a hydrogen pressure of 2 kg/cm$^2$ and, as a hydrogenation catalyst, added to the above polymer solution. A reaction was carried out under a partial pressure of hydrogen of 2.5 kg/cm$^2$ for 30 min. The solvent was removed from the resultant partially hydrogenated polymer solution by vacuum drying, thereby obtaining a polymer (percentage of hydrogenation of double bonds ascribed to butadiene: 30%).

300 parts by weight of this partially hydrogenated block copolymer was dissolved in 1500 parts by weight of cyclohexane. 300 parts by weight of an ethyl acetate solution containing 30% peracetic acid was continuously dropped into the copolymer solution and an epoxidation reaction was carried out at 40° C. for 3 hr under agitation. The resultant reaction mixture was cooled to room temperature and washed thrice with pure water which was used in the same amount as that of the reaction mixture, thereby obtaining a solution of epoxidized partially hydrogenated polystyrene-polybutadiene-polystyrene copolymer (ESEBS) having an acid value of 1.2 mgKOH/g. Solvent removal and resin recovery from this solution were performed in exactly the same manner as in Example 1-1. The R-value, melt viscosity, etc. of the obtained epoxidized block copolymer are given in Table 1-1.

Example 1-5

300 parts by weight of polystyrene-polyisoprene-polystyrene (SIS) block copolymer (trade name: Cariflex TR1111, produced by Shell Chemical Co., Ltd.) was dissolved in 1500 parts by weight of cyclohexane. 222 parts by weight of an ethyl acetate solution containing 30% peracetic acid was continuously dropped into the copolymer solution and an epoxidation reaction was carried out at 40° C. for 3 hr under agitation. The resultant reaction mixture was cooled to room temperature and washed thrice with pure water which was used in the same amount as that of the reaction mixture, thereby obtaining a solution of epoxidized polystyrene-polyisoprene-polystyrene polymer (ESIS) having an acid value of 1.5 mgKOH/g. Solvent removal and resin recovery from this solution were performed in exactly the same manner as in Example 1-1. The R-value, melt viscosity, etc. of the obtained epoxidized block copolymer are given in Table 1-1.

Comparative Example 1-1

A polymer was obtained in the same manner as in Example 1-1, except that the epoxidation reaction was performed with the use of 145 parts by weight of a 35% aqueous peracetic acid solution (peracetic acid/acetic acid/aqueous hydrogen peroxide/sulfuric acid/water) as the epoxidizing agent in place of the ethyl acetate solution containing 30% peracetic acid. The R-value, melt viscosity, etc. of the obtained epoxidized block copolymer are given in Table 1-1.

Comparative Example 1-2

A polymer was obtained in the same manner as in Example 1-1, except that the epoxidation reaction was performed with the use of a mixture of 169 parts by weight of the ethyl acetate solution containing 30% peracetic acid and 20 parts by weight of water as the epoxidizing agent. The R-value, melt viscosity, etc. of the obtained epoxidized block copolymer are given in Table 1-1.

TABLE 1-1

| | R-value[*1] | gel content (wt %) | melt viscosity[*2] (P) | epoxy equiv. |
|---|---|---|---|---|
| Ex. 1-1 | 0.01 | 0.10 | 4000 | 515 |
| Ex. 1-2 | 0.02 | 0.11 | 4820 | 520 |
| Ex. 1-3 | 0.03 | 0.20 | 18900 | 270 |
| Ex. 1-4 | 0.02 | 0.16 | 6100 | 320 |
| Ex. 1-5 | 0.01 | 0.15 | 2350 | 450 |

TABLE 1-1-continued

| | R-value*1 | gel content (wt %) | melt viscosity*2 (P) | epoxy equiv. |
|---|---|---|---|---|
| Comp. Ex. 1-1 | 0.22 | 2.00 | 6900 | 620 |
| Comp. Ex. 1-2 | 0.15 | 1.01 | 6500 | 590 |

*1: value determined by quantitative $^{13}$C-NMR spectroscopy.
*2: value measured with the use of a flow tester at 200° C. under a load of 100 kgf (die: 1 mm in diameter × 10 mm).

The gel content and melt viscosity were higher in Comparative Examples 1-1 and 1-2 than in Examples 1-1 to 1-5. The gel formation is unfavorable because it is detrimental to the processability, compatibility and solubility of the epoxidized block copolymer.

Comparative Example 1-3

A polymer was obtained in the same manner as in Example 1-1, except that no washing with water of the crude epoxidation reaction mixture was effected. The acid value of the obtained polymer was 15.2 mgKOH/g. The epoxy equivalent of the polymer was 540, so that an epoxy group loss was somewhat recognized. The test results thereof are given in Table 1-2. For comparison, the test results of Examples 1-1, 1-3 and 1-4 described above are also given in Table 1-2.

Comparative Example 1-4

A polymer was obtained in the same manner as in Example 1-1, except that no washing with water after the epoxidation reaction was effected. The acid value of the obtained polymer was 40.3 mgKOH/g. The epoxy equivalent of the polymer was 610, so that an epoxy group loss was somewhat recognized. The test results thereof are given in Table 1-2.

Comparative Example 1-5

A polymer was obtained in the same manner as in Example 1-1, except that the washing with water of the crude epoxidation reaction mixture was not completely effected. The acid value of the obtained polymer was 21.5 mgKOH/g. The epoxy equivalent of the polymer was 580, so that an epoxy group loss was somewhat recognized. The test results thereof are given in Table 1-2.

Comparative Example 1-6

A polymer was obtained in the same manner as in Example 1-3, except that no washing with water after the epoxidation reaction was effected. The acid value of the obtained polymer was 82.4 mgKOH/g. The epoxy equivalent of the polymer was 420, so that an epoxy group loss was somewhat recognized. The test results thereof are given in Table 1-2.

Comparative Example 1-7

A polymer was obtained in the same manner as in Example 1-4, except that no washing with water of the crude epoxidation reaction mixture was effected. The acid value of the obtained polymer was 15.1 mgKOH/g. The epoxy equivalent of the polymer was 350, so that an epoxy group loss was somewhat recognized. The test results thereof are given in Table 1-2.

TABLE 1-2

| | R-value | acid value*1 (mgKOH/g) | epoxy equiv. | melt viscosity (P) | gel content (wt %) | gel content after heating (wt %) |
|---|---|---|---|---|---|---|
| Ex. 1-1 | 0.01 | 1.4 | 515 | 4000 | 0.10 | 0.19 |
| Ex. 1-3 | 0.03 | 1.0 | 270 | 18900 | 0.20 | 0.23 |
| Ex. 1-4 | 0.02 | 1.3 | 320 | 6100 | 0.16 | 0.20 |
| Comp. Ex. 1-3 | 0.11 | 15.2 | 540 | 6500 | 0.12 | 4.2 |
| Comp. Ex. 1-4 | 0.18 | 40.3 | 610 | 7100 | 0.15 | 5.3 |
| Comp. Ex. 1-5 | 0.13 | 21.5 | 580 | 6700 | 0.08 | 4.9 |
| Comp. Ex. 1-6 | 0.50 | 82.4 | 420 | immeasurable | 0.35 | 86.0 |
| Comp. Ex. 1-7 | 0.22 | 15.1 | 350 | 7100 | 0.25 | 66.0 |

*1: the weight of potassium hydroxide required for neutralizing acids present in 1 g of the epoxidized block copolymer, as determined by titration.

It is seen that each of the polymers of Comparative Examples 1-3 to 1-7 had an increased gel content after heating at 180° C. for 15 min as compared with those of the polymers of Examples 1-1, 1-3 and 1-4. The gel formation is unfavorable because it is gravely detrimental to the moldability of the polymer.

Comparative Example 1-8

A resin was obtained in the same manner as in Example 1-1, except that ethyl acetate was removed after addition of 0.03 part by weight of sodium chloride to 100 parts by weight of the ethyl acetate solution of epoxidized polystyrene-polybutadiene-polystyrene polymer (ESBS) having an acid value of 1.5 mgKOH/g. The total chlorine concentration of the obtained resin was 1100 ppm.

The resin obtained in each of Example 1 and Comparative Example 1-8 was sheeted and its volume resistivity was measured. It was $8.5 \times 10^{15}$ Ω·cm in Example 1 and $8.5 \times 10^{13}$ Ω·cm in Comparative Example 1-8. This showed that the epoxidized block copolymer according to the first embodiment of the present invention was a material exhibiting excellent electrical insulation.

Example 1-6

70 parts by weight of polybutylene terephthalate (Duranex 400FP produced by Polyplastics Co., Ltd.) was blended with 30 parts by weight of the epoxidized block copolymer obtained in Example 1-1 and melt kneaded by means of a twin-screw extruder, thereby obtaining pellets (melt viscosity of the obtained composition being 1950 P at 250° C.). The composition was molded by means of an injection molding machine into shaped test pieces and tested. The notched Izod impact strength was 89 kgcm/cm.

With respect to the evaluation of the thermoplastic resin composition, the melt viscosity was measured with the use of a flow tester manufactured by Shimadzu Corporation having a die of 1 mm in cavity diameter and 10 mm in length under a load of 100 kg and the Izod impact strength was determined by preparing a mold-notched sample piece and measuring in an atmosphere of a room temperature of 23° C. and the humidity of 50%.

Comparative Example 1-9

Evaluations were made in the same manner as in Example 1-6, except that the epoxidized block copolymer obtained in Comparative Example 1-1 was used as the epoxidized block copolymer. The melt viscosity and notched Izod impact strength of the composition were 2010 P (240° C., flow tester) and 72 kgcm/cm, respectively.

The results showed that the thermoplastic resin composition obtained in Example 1-6 had lower melt viscosity and higher Izod impact strength than those of the thermoplastic resin composition of Comparative Example 1-9. That is, the present invention provides a thermoplastic resin composition which is excellent in not only Izod impact strength but also injection moldability and other processability.

Example 1-7 and Comparative Example 1-10

Resin compositions were obtained by melt kneading the epoxidized block copolymers obtained in Examples 1-1 and 1-4 and Comparative Examples 1-1 and 1-7 together with various thermoplastic resins and elastomers. The blend ratios and mechanical properties of each of the resin compositions are given in Tables 1-3 and 1-4.

The abbreviations used in the tables have the following meaning:

PS: Daicel Styrol R53 produced by Daicel Chemical Industries, Ltd.

PBT: Duranex 400FP produced by Polyplastics Co., Ltd.

PET: Tetoron TR4550BHK produced by Teijin Ltd.

PP: Noblen H501 produced by Sumitomo Chemical Co., Ltd.

HSBR: Dynaron 1320P produced by Japan Synthetic Rubber Co., Ltd.

TPU: Miractran P480 produced by Nihon Miractran K.K.

SEPS: Septon 2063 produced by Kuraray Co., Ltd.

TPEE: Hytrel 4047 produced by Du Pont Toray Co., Ltd.

nylon: Ube Nylon 6 produced by Ube Industries, Ltd.

PC: Panlite L1225 produced by Teijin Chemical Co., Ltd.

TABLE 1-3

| Blend (pts. wt.) | | | Tensile test | | | | |
|---|---|---|---|---|---|---|---|
| resin | | epoxidized block copolymer | 300% stress (kg/cm$^2$) | strength at break (kg/cm$^2$) | elongation (%) | Melt viscosity (P) | Molding appearance |
| HSBR (70) | PP (30) | Ex. 1-1 (20) | 25 | 490 | 950 | 2500/230° C. | good |
| TPU (70) | SEPS (30) | Ex. 1-1 (20) | 35 | 210 | 780 | 3280/230° C. | good |
| SEPS (70) | TPEE (30) | Ex. 1-4 (20) | 40 | 380 | 700 | 8900/230° C. | good |
| HSBR (70) | PBT (30) | Ex. 1-1 (20) | 90 | 410 | 710 | 1900/240° C. | good |
| HSBR (70) | PP (30) | Comp. Ex. 1-1 (20) | 30 | 450 | 780 | 10800/230° C. | fisheye observed |
| TPU (70) | SEPS (30) | Comp. Ex. 1-1 (20) | 45 | 200 | 610 | 7800/230° C. | fisheye observed |
| SEPS (70) | TPEE (30) | Comp. Ex. 1-7 (20) | 45 | 370 | 520 | 19700/230° C. | fisheye observed |
| HSBR (70) | PBT (30) | Comp. Ex. 1-1 (20) | 120 | 420 | 450 | 6200/240° C. | fisheye observed |

TABLE 1-4

| Blend (pts. wt.) | | | strength (notched) (kg · cm/cm) | Melt viscosity (P) | Molding appearance |
|---|---|---|---|---|---|
| resin | | epoxidized block copolymer | | | |
| PBT (90) | PS (10) | Ex. 1-1 (20) | 85 | 2000/240° C. | good |
| PET (80) | PS (20) | Ex. 1-4 (20) | 38 | 1500/270° C. | good |
| PC (20) | PS (80) | Ex. 1-1 (20) | 18 | 5300/260° C. | good |
| nylon (80) | TPU (20) | Ex. 1-1 (20) | 23 | 1500/230° C. | good |
| PBT (80) | SEPS (20) | Ex. 1-1 (20) | 80 | 2300/240° C. | good |
| PET (80) | PS (20) | Comp. Ex. 1-7 (20) | 25 | 4600/270° C. | scorched |
| PC (20) | PS (80) | Comp. Ex. 1-1 (20) | 13 | 9800/260° C. | poor luster |
| nylon (80) | TPU (20) | Comp. Ex. 1-1 (20) | 18 | 4900/230° C. | scorched |
| PBT (90) | PS (10) | Comp. Ex. 1-1 (20) | 70 | 3500/240° C. | scorched |

It is apparent that the resin compositions and elastomer compositions each containing the epoxidized block copolymer according to the first embodiment of the present invention have excellent mechanical properties and flowability (melt viscosity being not increased).

Example 1-8

10 parts by weight of the epoxidized block copolymer obtained in Example 1-1 was blended with 90 parts by weight of an alicyclic epoxy compound (Celloxide 2021 produced by Daicel Chemical Industries, Ltd.), thereby obtaining a transparent liquid composition. This composition was stored at 50° C. and the change of viscosity with the passage of time was measured. The results are given in Table 1-5.

Comparative Example 1-11

10 parts by weight of the epoxidized block copolymer obtained in Comparative Example 1-1 was blended with 90 parts by weight of an alicyclic epoxy compound (Celloxide 2021 produced by Daicel Chemical Industries, Ltd.) and the solution viscosity change was measured in the same manner as in Example 1-8. The results are given in Table 1-5.

Example 1-9

10 parts by weight of the epoxidized block copolymer obtained in Example 1-3 was blended with 90 parts by weight of Epikote 828 produced by Yuka Shell and the solution viscosity change was measured. The results are given in Table 1-5.

TABLE 1-5

| Liq. compsn. | Soln. viscosity at 50° C. (cP) | |
| --- | --- | --- |
| | initial | stored at 50° C. for 1 mo. |
| Ex. 1-8 | 1510 | 1620 |
| Comp. Ex. 1-11 | 1530 | 7810 |
| Ex. 1-9 | 2700 | 2900 |

It is apparent from the results of Table 1-5 that the compositions comprising the epoxidized block copolymer of the present invention and the epoxy compound have excellent thermal stability and storage stability.

Examples 1-10 and 1-11 and Comparative Example 1-12

50 parts by weight of methyltetrahydrophthalic anhydride as a curing agent was added to 100 parts by weight of each of the epoxy compositions obtained in Examples 1-8 and 1-9 and Comparative Example 1-11, applied in a thickness of 50 μm onto an iron plate and cured by heating at 90° C. for 2 hr and at 160° C. for 2 hr. The compositions of Examples 1-8 and 1-9 gave cured films having good appearances, i.e., having good luster and smoothness but the composition of Comparative Example 1-11 gave an uneven cured film of relatively poor luster.

The toughness at break (kic) was measured after preparing sample pieces therefor under the same curing conditions as described above. The Example 1-8 sample piece exhibited a toughness at break of 1.7 MPa·m$^{1/2}$ (glass transition temperature: 160° C.) while the Comparative Example 1-11 sample piece exhibited a toughness at break of 1.0 MPa·m$^{1/2}$ (glass transition temperature: 158° C.). These results demonstrate that the epoxidized block copolymer of the present invention can impart toughness to the cured epoxy resin.

Moreover, when the epoxidized block copolymer is used as a coating composition, a coating film having an excellent appearance is obtained.

Example 1-12

50 parts by weight of the epoxidized block copolymer of Example 1-1 was melt blended at 180° C. with 50 parts by weight of Ultrathene 541L (produced by Tosoh Corporation) and extruded into a film by means of a T die extruder. The obtained film was free of fisheye and gel. The film of 40 μm in thickness had a tensile strength of 290 kgf/cm$^2$ and a tensile elongation of 900%.

Comparative Example 1-13

50 parts by weight of the epoxidized block copolymer of Comparative Example 1-1 was melt blended at 180° C. with 50 parts by weight of Ultrathene 541L (produced by Tosoh Corporation) and extruded into a film by means of a T die extruder. The obtained film suffered from large amounts of fisheyes and gels. The film of 40 μm in thickness had a tensile strength of 250 kgf/cm$^2$ and a tensile elongation of 550%.

Example 1-13 and Comparative Example 1-14

Each of the films obtained in Example 1-12 and Comparative Example 1-13 was interposed between aluminum foils of 0.5 mm in thickness, pressed at 200° C. for 1 min under 2 kg/cm$^2$ and subjected to T-peeling test. The peeling strength of the Example 1-12 sample was 3.5 kg/25 mm and that of the Comparative Example 1-13 sample was 2.0 kg/25 mm. Further, the epoxidized block copolymer obtained in Example 1-1 was extruded into a film and subjected to T-peeling test in the same manner. The peeling strength thereof was 3.2 kg/25 mm.

Examples 1-14 to 1-20 and Comparative Examples 1-15 and 1-16

300 parts by weight of polystyrene-polybutadiene-polystyrene (SBS) block copolymer (trade name: TR-2000, produced by Japan Synthetic Rubber Co., Ltd.) was dissolved in 1500 parts by weight of ethyl acetate. 169 parts by weight of an ethyl acetate solution containing 30% peracetic acid was continuously dropped into the copolymer solution and an epoxidation reaction was carried out at 40° C. for 3 hr under agitation. The resultant reaction mixture was cooled to room temperature and washed with pure water, thereby obtaining an ethyl acetate solution of epoxidized polystyrene-polybutadiene-polystyrene copolymer (copolymer X) having an acid value of 1.1 mgKOH/g. This ethyl acetate solution of the polymer had a concentration of 20 wt. %. Each stabilizer listed in Table 1-6 was added to the solution and satisfactorily agitated. This polymer solution was subjected to steam stripping in which 100 ppm of nonionic surfactant "Pluronic F-108" produced by Asahi Denka Kogyo K.K. was added to water in a steam stripping vessel and the temperature of the water was held at 95° C. The polymer was stably dispersed in the form of crumbs and neither mutual adhesion of polymers nor polymer adhesion to the vessel wall and agitating blade was observed.

The obtained slurry having the polymer dispersed in water was fed into a rotary screen, thereby obtaining hydrous crumbs having a water content of 40 wt. %. The crumbs were fed into a squeeze dehydrating dryer of the twin-screw extruder type which was provided with two slits having a slit spacing of 0.1 mm and two vents so as to simultaneously accomplish water removal and drying. In the extrusion drying, the cylinder temperature was set at 180° C., the screw revolution speed at 200 rpm, the first vent at atmospheric pressure and the second vent at a pressure of 200 Torr. The polymer discharged through an end of the extruder was pelletized by means of a cutter (the R-value of the resultant pelletized resin being 0.01).

The gel content after heating and ΔYI indicating the degree of coloring by heating of the obtained pellets were measured in the methods described below and the results are given in Table 1-6.

Examples 1-21 to 1-23 and Comparative Examples 1-17 and 1-18

300 parts by weight of polystyrene-polybutadiene-polystyrene block copolymer (trade name: TR-2000, produced by Japan Synthetic Rubber Co., Ltd.) was dissolved in 3000 parts by weight of cyclohexane in a jacketed reactor equipped with an agitator and a thermometer. 40 ml of a cyclohexane solution of di-p-tolylbis(1-cyclopentadienyl) titanium (concentration: 1 mmol/liter) and 8 ml of an n-butyllithium solution (concentration: 5 mmol/liter) were mixed together at 0° C. under a hydrogen pressure of 2 kg/cm$^2$ and added to the above polymer solution as a hydrogenation catalyst. A reaction was carried out under a partial pressure of hydrogen of 2.5 kg/cm$^2$ for 30 min. The solvent was removed from the resultant partially hydrogenated polymer solution by vacuum drying, thereby obtaining a polymer (percentage of hydrogenation of double bonds ascribed to butadiene: 50%).

300 parts by weight of this partially hydrogenated block copolymer was dissolved in 1500 parts by weight of cyclohexane. 180 parts by weight of an ethyl acetate solution containing 30% peracetic acid was continuously dropped into the copolymer solution and an epoxidation reaction was carried out at 40° C. for 3 hr under agitation. The resultant reaction mixture was cooled to room temperature and washed thrice with pure water which was used in the same amount as that of the reaction mixture, thereby obtaining a solution of epoxidized partially hydrogenated polystyrene-polybutadiene-polystyrene copolymer (copolymer Y) having an acid value of 1.1 mgKOH/g. This polymer solution was subjected to steam stripping in which 100 ppm of nonionic surfactant "Emulgen PP-290" produced by Kao Corp. was added to water in a steam stripping vessel and the temperature of the water was held at 95° C. The polymer was stably dispersed in the form of crumbs and neither mutual adhesion of polymers nor polymer adhesion to the vessel wall and agitating blade was observed.

The obtained slurry having the polymer dispersed in water was fed into a rotary screen, thereby obtaining hydrous crumbs having a water content of 40 wt. %. The crumbs were fed into a squeeze dehydrating dryer of the twin-screw extruder type which was provided with two slits having a slit spacing of 0.1 mm and two vents so as to simultaneously accomplish water removal and drying. In the extrusion drying, the cylinder temperature was set at 180° C., the screw revolution speed at 200 rpm, the first vent at atmospheric pressure and the second vent at a pressure of 200 Torr. The polymer discharged through an end of the extruder was pelletized by means of a cutter (the R-value of the resultant pelletized resin being 0.02). The residual water content of the dried polymer was 200 ppm.

The gel content and ΔYI of the obtained pellets were measured in the same manner as done for the polymer X and the results are given in Table 1-6.

In Table 1-6, with respect to the type of phenolic stabilizer, numerals 1, 2 and 3 denote tetrakis(methylene-3-(3',5'-di-tert-butyl-4'-hydroxyphenyl)propionate)methane, 1,3,5-trimethyl-2,4,6-tris(3,5-di-tert-butyl-4-hydroxybenzyl)benzene and 2,6-di-tert-butyl-4-methylphenol, respectively. With respect to the type of phosphorous stabilizer, numerals 1 and 2 denote tris-nonylphenyl phosphite and tris(2,5-di-tert-butylphenyl) phosphite, respectively.

The amount of added phenolic stabilizer or phosphorous stabilizer is expressed per 100 parts by weight of the polymer.

The gel content after heating is the weight percentage of THF insolubles contained in the pellets allowed to stand still in an oven at 180° C. for 30 min.

The ΔYI is a YI value difference measured with a color difference meter and represents the one between the YI value before allowing a prepared pressed sheet of 3 mm in thickness to stand still in an oven at 180° C. for 30 min and the YI value thereafter.

TABLE 1-6

| Ex. | Epoxidized block copolymer | Phenolic stabilizer type | Phenolic stabilizer amt. | Phosphorous stabilizer type | Phosphorous stabilizer amt. | Gel content after heating (%) | ΔYI |
|---|---|---|---|---|---|---|---|
| Ex. 1-14 | X | 1 | 0.5 | — | — | 0.02 | 0.8 |
| Ex. 1-15 | X | 1 | 0.5 | 1 | 0.2 | 0.07 | 0.9 |
| Ex. 1-16 | X | 2 | 1 | — | — | 0.01 | 0.7 |
| Ex. 1-17 | X | — | — | 1 | 1.0 | 0.12 | 1.0 |
| Ex. 1-18 | X | 3 | 0.2 | 2 | 0.3 | 0.03 | 0.7 |
| Comp. Ex. 1-15 | X | — | — | — | — | 5.50 | 5.0 |
| Comp. Ex. 1-16 | X | 1 | 0.001 | — | — | 5.45 | 4.9 |
| Ex. 1-19 | X | 1 | 6.0 | — | — | 0.02 | 0.7 |
| Ex. 1-20 | X | 1 | 0.5 | 1 | 6.0 | 0.50 | 0.7 |
| Ex. 1-21 | Y | 1 | 0.5 | — | — | 0.03 | 0.9 |
| Ex. 1-22 | Y | 1 | 0.5 | 1 | 0.2 | 0.06 | 1.0 |
| Comp. Ex. 1-17 | Y | — | — | — | — | 3.20 | 3.3 |
| Comp. Ex. 1-18 | Y | 1 | 0.001 | — | — | 3.00 | 3.2 |
| Ex. 1-23 | Y | — | — | 1 | 6.0 | 0.10 | 0.7 |

Examples 1-24 to 1-33 and Comparative Examples 1-19 to 1-23

300 parts by weight of polystyrene-polybutadiene-polystyrene (SBS) block copolymer (trade name: TR-2000, produced by Japan Synthetic Rubber Co., Ltd.) and 1500 parts by weight of ethyl acetate were charged into a jacketed 5-liter reactor equipped with an agitator and a thermometer, and the SBS was dissolved in the ethyl acetate. The internal temperature of the reactor was raised to 40° C. and, while maintaining this temperature, 169 parts by weight of an ethyl acetate solution containing 30% peracetic acid was continuously dropped into the copolymer solution under agitation over a period of 3 hr to thereby effect an epoxidation reaction.

After the completion of the epoxidation reaction, the internal temperature was lowered to room temperature and the reaction mixture was washed with pure water, thereby obtaining an ethyl acetate solution of epoxidized polystyrene-polybutadiene-polystyrene polymer. This polymer solution was subjected to steam stripping to thereby remove ethyl acetate. Thereafter, the resultant slurry having the polymer dispersed in water was dewatered by the use of a rotary screen and fed into a vented twin-screw extruder. The polymer was melt extruded through a die in the form of strands. The strands were cut into pellets.

After the removal of the solvent, the polymer had a residual water content of 500 ppm, a gel content of not greater than 0.2% by weight, an epoxy equivalent of 520 and an R-value of 0.01. No foaming was observed in the molded item.

According to the method in which the surfaces of the obtained pellets (size: cylindrical form of about 2 mm in diameter and 3 mm in length, the same applies hereinbelow) were covered with the antiblocking agent, each of the antiblocking agents listed in Table 1-7 was deposited on the surfaces of the pellets in the amount specified in Table 1-7 per 100 parts by weight of the pellets by directly dusting the pellets therewith, thereby obtaining an epoxidized block copolymer composition.

The degree of blocking and the haze of each obtained epoxidized block copolymer composition were evaluated by the following methods. The results are given in Table 1-7.

(1) Degree of blocking:

Sample pellets were charged into a plastic cylinder of 5 cm in diameter. The sample had its top loaded with a weight of 2 kg and was allowed to stand still at 40° C. for 48 hr. The sample was taken out and the state of pellet blocking was evaluated. In the results, "o" indicates the absence of blocking, "Δ" the presence of slight blocking and "x" the presence of conspicuous blocking.

(2) Haze:

Sample pellets were compression molded into a 2 mm thick sheet, and the haze of the sheet was measured in accordance with Japanese Industrial Standard K-7105.

TABLE 1-7

| | Antiblocking agent | | Deg. of | Haze |
|---|---|---|---|---|
| | type | amt. (%) | blocking | (%) |
| Ex. 1-24 | silicon oxide | 0.1 | o | 4.2 |
| Ex. 1-25 | silicone oil | 0.1 | o | 4.3 |
| Ex. 1-26 | calcium stearate | 0.1 | o | 4.3 |
| Ex. 1-27 | glycerol monostearate | 0.05 | o | 4.2 |
| Ex. 1-28 | glycerol monostearate | 0.01 | Δ | 4.1 |
| Ex. 1-29 | calcium stearate | 0.05 | o | 4.4 |
| | glycerol monostearate | 0.05 | | |
| Ex. 1-30 | ethylenebisstearamide | 0.1 | o | 4.2 |
| Ex. 1-31 | polyoxyethylene-polyoxypropylene block copolymer | 0.05 | o | 4.2 |
| Ex. 1-32 | sorbitan monostearate | 0.2 | o | 4.4 |
| Ex. 1-33 | silicon oxide | 0.3 | o | 4.5 |
| | sodium stearate | 0.1 | | |
| Comp. Ex. 1-19 | none | — | x | 4.0 |
| Comp. Ex. 1-20 | silicon oxide | 0.0001 | x | 4.0 |
| Comp. Ex. 1-21 | silicon oxide | 6.0 | o | 20 |

TABLE 1-7-continued

| | Antiblocking agent | | Deg. of | Haze |
|---|---|---|---|---|
| | type | amt. (%) | blocking | (%) |
| Comp. Ex. 1-22 | calcium oxide | 0.1 | x | 4.5 |
| Comp. Ex. 1-23 | magnesium sulfate | 0.1 | x | 4.5 |

Examples 1-34 to 1-39 and Comparative Examples 1-24 and 1-27

300 g of polystyrene-polybutadiene-polystyrene (SBS) block copolymer (trade name: TR-2000, produced by Japan Synthetic Rubber Co., Ltd.) and 3000 g of cyclohexane were charged into a jacketed 10-liter reactor equipped with an agitator and a thermometer, and the SBS was dissolved in the cyclohexane. 40 ml of a cyclohexane solution of di-p-tolylbis(1-cyclopentadienyl)titanium (concentration: 1 mmol/liter) and 8 ml of an n-butyllithium solution (concentration: 5 mmol/liter) were mixed together at 0° C. under a hydrogen pressure of 2 kg/cm$^2$ and added to the above polymer solution as a hydrogenation catalyst. A reaction was carried out under a partial pressure of hydrogen of 2.5 kg/cm$^2$ for 30 min. The solvent was removed from the resultant partially hydrogenated polymer solution by vacuum drying, thereby obtaining a polymer (percentage of hydrogenation of double bonds ascribed to butadiene: 50%).

300 parts of this partially hydrogenated block copolymer was dissolved in 1500 parts of cyclohexane, and the internal temperature of the reactor was raised to 40° C. While maintaining this temperature, 180 parts of an ethyl acetate solution containing 30% peracetic acid was continuously dropped into the copolymer solution over a period of 3 hr under agitation to thereby effect an epoxidation reaction. The resultant reaction mixture was cooled to room temperature and washed thrice with pure water which was used in the same amount as that of the reaction mixture, thereby obtaining a solution of epoxidized partially hydrogenated polystyrene-polybutadiene-polystyrene polymer (copolymer Y).

This polymer solution was subjected to steam stripping in which 100 ppm of nonionic surfactant "Emulgen PP-290" produced by Kao Corp. was added to water in a steam stripping vessel and the temperature of the water was held at 95° C. The polymer was stably dispersed in the form of crumbs and neither mutual adhesion of crumbled polymers nor polymer adhesion to the vessel wall and agitating blade was observed. The solvent was removed by this steam stripping, and the obtained slurry having the polymer dispersed in water was fed into a rotary screen to thereby conduct dewatering. Further, the polymer was fed into a vented twin-screw extruder. The polymer was melt kneaded and extruded through a die in the form of strands. The strands were cut into pellets.

According to the method in which the obtained pellets were dusted with the antiblocking agent, each of the antiblocking agents listed in Table 1-8 was deposited on the surfaces of the pellets in the amount specified in Table 1-8 per 100 parts by weight of the pellets, thereby obtaining an epoxidized block copolymer composition.

TABLE 1-8

| | Antiblocking agent | | Deg. of blocking | Haze (%) |
|---|---|---|---|---|
| | type | amt. (%) | | |
| Ex. 1-34 | silicon oxide | 0.2 | ○ | 4.5 |
| Ex. 1-35 | silicone oil | 0.5 | ○ | 4.3 |
| Ex. 1-36 | calcium stearate | 0.1 | ○ | 3.9 |
| Ex. 1-37 | glycerol monostearate | 0.1 | Δ | 4.2 |
| Ex. 1-38 | ethylenebisstearamide | 0.4 | ○ | 4.2 |
| Ex. 1-39 | sodium stearate | 0.1 | ○ | 4.8 |
| | glycerol monostearate | 0.1 | | |
| Comp. Ex. 1-24 | none | — | x | 3.5 |
| Comp. Ex. 1-25 | ethylenebisstearamide | 7 | ○ | 12.0 |
| Comp. Ex. 1-26 | calcium oxide | 0.1 | x | 4.5 |
| Comp. Ex. 1-27 | calcium chloride | 0.1 | x | 4.3 |

Example 1-40

300 parts by weight of polystyrene-polybutadiene-polystyrene (SBS) block copolymer (trade name: TR-2000, produced by Japan Synthetic Rubber Co., Ltd.) was dissolved in 1500 parts by weight of ethyl acetate. 169 parts by weight of an ethyl acetate solution containing 30% peracetic acid was continuously dropped into the copolymer solution and an epoxidation reaction was carried out at 40° C. for 3 hr under agitation. The resultant reaction mixture was cooled to room temperature and washed with pure water, thereby obtaining an ethyl acetate solution of epoxidized polystyrene-polybutadiene-polystyrene polymer (ESBS). This ethyl acetate solution of the polymer had a concentration of 30 wt. %. The above solution was fed into a vented twin-screw two-stage extruder of 40 mm in outer diameter of screw and 38.5 in L/D and the solvent was evaporated off in a vacuum through the vents. This vented extruder was operated with the cylinder temperature set at 160° C., the first vent at a pressure of 200 Torr, the second vent at a pressure of 50 Torr and the screw revolution speed at 200 rpm. The feeding of the solution was conducted so that the rate of production of the polymer was 10 kg/h. The polymer discharged through an end of the extruder was pelletized by means of a cutter. After the removal of the solvent, the polymer had a residual solvent content of 2300 ppm, an epoxy equivalent of 520 and an R-value of 0.01. No foaming was observed in the molded item. With respect to the moldability, the polymer was pressed at 200° C. to thereby obtain a 2 mm thick sheet and the sheet was visually inspected.

Example 1-41

The ethyl acetate solution of epoxidized block copolymer (concentration: 30 wt. %) obtained in exactly the same manner as in Example 1-40 was fed into a vented twin-screw extruder of 40 mm in outer diameter of screw and 9 in L/D which had such a structure that a heating medium could be passed through the internal part of each screw and which possessed a continuous gas phase zone at the upper part of the inside of the extruder, and the solvent was evaporated off in a vacuum through the vent. This vented extruder was operated with the cylinder temperature set at 160° C., the vent at a pressure of 100 Torr and the screw revolution speed at 200 rpm. The feeding of the solution was conducted so that the rate of production of the polymer was 10 kg/h. The polymer discharged through an end of the extruder was pelletized by means of a cutter. After the removal of the solvent, the polymer had a residual solvent content of 420 ppm and an epoxy equivalent of 520. No foaming was observed in the molded item (pressed sheet) as in Example 40.

Example 1-42

300 parts by weight of polystyrene-polybutadiene-polystyrene (SBS) block copolymer (trade name: TR-2000, produced by Japan Synthetic Rubber Co., Ltd.) was dissolved in 3000 parts by weight of cyclohexane in a jacketed reactor equipped with an agitator and a thermometer. 0.40 part by weight of a cyclohexane solution of di-p-tolylbis(1-cyclopentadienyl)titanium (concentration: 1 mmol/liter) and 0.08 part by weight of an n-butyllithium solution (concentration: 5 mmol/liter) were mixed together at 0° C. under a hydrogen pressure of 2 kg/cm$^2$ and added to the above polymer solution as a hydrogenation catalyst. A reaction was carried out under a partial pressure of hydrogen of 2.5 kg/cm$^2$ for 30 min. The solvent was removed from the resultant partially hydrogenated polymer solution by vacuum drying, thereby obtaining a polymer (percentage of hydrogenation of double bonds ascribed to butadiene: 50%).

300 parts by weight of this partially hydrogenated block copolymer was dissolved in 1500 parts by weight of cyclohexane. 180 parts of an ethyl acetate solution containing 30% peracetic acid was continuously dropped into the copolymer solution and an epoxidation reaction was carried out at 40° C. for 3 hr under agitation. The resultant reaction mixture was cooled to room temperature and washed thrice with pure water which was used in the same amount as that of the reaction mixture, thereby obtaining a solution of epoxidized partially hydrogenated polystyrene-polybutadiene-polystyrene copolymer (concentration: 26 wt. %). This polymer solution was fed into a vented twin-screw extruder of 40 mm in outer diameter of screw and 9 in L/D which had such a structure that a heating medium could be passed through the internal part of each screw and which possessed a continuous gas phase zone at the upper part of the inside of the extruder, and the solvent was evaporated off in a vacuum through the vent. This vented extruder was operated with the cylinder temperature set at 170° C., the vent at a pressure of 100 Torr and the screw revolution speed at 200 rpm. The feeding of the solution was conducted so that the rate of production of the polymer was 10 kg/h. The polymer discharged through an end of the extruder was pelletized by means of a cutter. After the removal of the solvent, the polymer had a residual solvent content of 380 ppm, an epoxy equivalent of 285 and an R-value of 0.02. No foaming was observed in the molded item (pressed sheet) as in Example 1-40.

Examples 1-43 to 1-45

The ethyl acetate solution of epoxidized block copolymer (concentration: 30 wt. %) obtained in exactly the same manner as in Example 1-40 was fed into a vented twin-screw extruder of 40 mm in outer diameter of screw and 9 in L/D which had such a structure that a heating medium could be passed through the internal part of each screw and which possessed a continuous gas phase zone at the upper part of the inside of the extruder, and the solvent was evaporated off in a vacuum through the vent. This vented extruder was operated with the cylinder temperature and vent pressure set as specified in Table 1-9 and with the screw revolution speed set at 200 rpm. The feeding of the solution was conducted so that the rate of production of the polymer was 10 kg/h. The polymer discharged through an end of the extruder was pelletized by means of a cutter. The properties of each polymer after the removal of the solvent are collectively given in Table 1-9.

Comparative Example 1-28

A polymer was obtained in the same manner as in Example 1-41, except that the epoxidation reaction was performed with the use of 145 parts by weight of a 35% aqueous peracetic acid solution (peracetic acid/acetic acid/aqueous hydrogen peroxide/sulfuric acid/water) as the epoxidizing agent in place of the ethyl acetate solution containing 30% peracetic acid. The properties of the polymer after the removal of the solvent are specified in Table 1-9.

TABLE 1-9

| | Conditions of evaporator | | | Properties of polymer after solvent removal | | | |
|---|---|---|---|---|---|---|---|
| | extrusion rate of polymer (kg/h) | cylinder temp. (°C.) | vent press. (Torr) | residual solvent content of polymer (ppm)*1 | epoxy equiv. of polymer | R-value | foaming and condition of molded item*2 |
| Ex. 1-43 | 25 | 160 | 50 | 300 | 520 | 0.01 | no foaming |
| Ex. 1-44 | 40 | 160 | 100 | 1100 | 520 | 0.01 | no foaming |
| Ex. 1-45 | 25 | 180 | 100 | 250 | 520 | 0.01 | no foaming |
| Comp. Ex. 1-28 | 25 | 160 | 50 | 350 | 610 | 0.22 | fisheyes, gelation and scorching observed |

*1: Value obtained by dissolving the polymer in toluene and measuring by gas chromatography.
*2: The appearance of the sheet obtained by pressing the polymer at 200° C. was visually inspected.

Example 1-46

300 parts by weight of polystyrene-polybutadiene-polystyrene block copolymer (SBS; TR-2000 produced by Japan Synthetic Rubber Co., Ltd.) was completely dissolved in 1500 parts by weight of ethyl acetate (first step). 169 parts by weight of an ethyl acetate solution containing 30% peracetic acid was continuously dropped into the copolymer solution and an epoxidation reaction was carried out at 40° C. for 3 hr under agitation (second step). The resultant reaction mixture was cooled to room temperature and washed with pure water, thereby obtaining an ethyl acetate solution of epoxidized polystyrene-polybutadiene-polystyrene copolymer (ESBS) (third step). This ethyl acetate solution of epoxidized block copolymer had a concentration of 30 wt. %. The acid value of the solution was 1.0 mgKOH/g.

The above solution was fed into a vented twin-screw extruder of 40 mm in outer diameter of screw and 9 in L/D which had such a structure that a heating medium could be passed through the internal part of each screw and which possessed a continuous gas phase zone at the upper part of the inside of the extruder, and the solvent was evaporated off in a vacuum through the vent. This vented extruder was operated with the cylinder temperature set at 160° C., the vent at a pressure of 100 Torr and the screw revolution speed at 200 rpm. The feeding of the solution was conducted so that the rate of production of the polymer was 10 kg/h.

The polymer discharged through an end of the extruder was pelletized by means of a cutter. After the removal of the solvent, the polymer had a residual solvent content of 420 ppm, a gel content of not greater than 0.2 wt. %, an epoxy equivalent of 520 and an R-value of 0.01. No foaming was observed in the molded item. With respect to the moldability, the polymer was pressed at 200° C. to thereby obtain a 2 mm thick sheet and the sheet was visually inspected. The results are given in Table 1-10.

Example 1-47

The ethyl acetate solution of epoxidized block copolymer (concentration: 30 wt. %) obtained in exactly the same manner as in Example 1-46 was fed into a vented twin-screw two-stage extruder of 40 mm in outer diameter of screw and 38.5 in L/D and the solvent was evaporated off in a vacuum through the vents. This vented extruder was operated with the cylinder temperature set at 160° C., both the first and the second vents at a pressure of 100 Torr and the screw revolution speed at 200 rpm. The feeding of the solution was conducted so that the rate of production of the polymer was 10 kg/h.

The polymer discharged through an end of the extruder was pelletized by means of a cutter. After the removal of the solvent, the polymer had a residual solvent content of 2300 ppm, a gel content of not greater than 0.2 wt. %, an epoxy equivalent of 520 and an R-value of 0.01. No foaming was observed in the molded item. The results are given in Table 1-10.

Example 1-48

300 parts by weight of polystyrene-polybutadiene-polystyrene block copolymer (trade name: TR-2000, produced by Japan Synthetic Rubber Co., Ltd.) was dissolved in 3000 parts by weight of cyclohexane in a jacketed reactor equipped with an agitator and a thermometer. 40 g of a cyclohexane solution of di-p-tolylbis(1-cyclopentadienyl) titanium (concentration: 1 mmol/liter) and 8 g of an n-butyllithium solution (concentration: 5 mmol/liter) were mixed together at 0° C. under a hydrogen pressure of 2 kg/cm$^2$ and added to the above polymer solution as a hydrogenation catalyst. A reaction was carried out under a partial pressure of hydrogen of 2.5 kg/cm$^2$ for 30 min. The solvent was removed from the resultant partially hydrogenated polymer solution by vacuum drying, thereby obtaining a polymer (percentage of hydrogenation of double bonds ascribed to butadiene: 30%). 300 parts by weight of this partially hydrogenated polymer was dissolved in 1500 parts by weight of cyclohexane (first step). 300 parts of an ethyl acetate solution containing 30% peracetic acid was continuously dropped into the polymer solution and an epoxidation reaction was carried out at 40° C. for 3 hr under agitation (second step). The resultant reaction mixture was cooled to room temperature and washed with pure water, thereby obtaining a solution of epoxidized partially hydrogenated polystyrene-polybutadiene-polystyrene copolymer (ESEBS) (third step). This block copolymer solution had a concentration of 22 wt. % and an acid value of 1.3 mgKOH/g.

This solution was fed into exactly the same vented twin-screw two-stage extruder as in Example 1-47 and the Comparative Example 1-30

A block copolymer was obtained in the same manner as in Example 1-48, except that the crude epoxidation reaction mixture was not washed with water in the third step. The obtained resin had a residual solvent content of 1700 ppm, a gel content of 5.3 wt. % and an epoxy equivalent of 340. The results are given in Table 1-10.

TABLE 1-10

| | | Properties of soln. | | Operating conditions of evaporator | | Properties of epoxidized block copolymer | | | | |
|---|---|---|---|---|---|---|---|---|---|---|
| | Type of resin | acid value | concn. (wt %) | temp. (°C.) | press. (Torr) | residual solvent (ppm) | R-value | gel content (wt %) | epoxy equiv. | condition of surface of molded item |
| Ex. 1-46 | ESBS | 1.0 | 30 | 160 | 100 | 420 | 0.01 | <0.2 | 520 | no foaming |
| Ex. 1-47 | ESBS | 1.0 | 30 | 160 | 100 | 2300 | 0.01 | <0.2 | 520 | no foaming |
| Ex. 1-48 | ESEBS | 1.3 | 22 | 160 | 100 | 1500 | 0.02 | <0.2 | 285 | no foaming |
| Ex. 1-49 | ESBS | 1.0 | 30 | 160 | 50 | 300 | 0.01 | <0.2 | 520 | no foaming |
| Ex. 1-50 | ESBS | 1.0 | 35 | 160 | 100 | 720 | 0.01 | <0.2 | 520 | no foaming |
| Ex. 1-51 | ESBS | 1.0 | 35 | 180 | 100 | 350 | 0.01 | <0.2 | 520 | no foaming |
| Comp. Ex. 1-29 | ESBS | 5.5 | 30 | 160 | 100 | 620 | 0.15 | 5.2 | 540 | fisheye observed |
| Comp. Ex. 1-30 | ESEBS | 5.3 | 20 | 160 | 100 | 1700 | 0.20 | 5.3 | 340 | fisheye observed | solvent was evaporated off in a vacuum under exactly the same conditions as in Example 1-47 (fourth step). The polymer discharged through an end of the extruder was pelletized by means of a cutter.

After the removal of the solvent, the polymer had a residual solvent content of 1500 ppm, a gel content of not greater than 0.2 wt. %, an epoxy equivalent of 285 and an R-value of 0.02. The results are given in Table 1-10.

Example 1-49 to 1-51

Polystyrene-polybutadiene-polystyrene block copolymer (SBS; TR-2000 produced by Japan Synthetic Rubber Co., Ltd.) was dissolved in ethyl acetate (first step). An epoxidation reaction was carried out with the use of peracetic acid (second step). The resultant reaction mixture was cooled to room temperature and washed with pure water, thereby obtaining an ethyl acetate solution of epoxidized polystyrene-polybutadiene-polystyrene copolymer (ESBS) having properties specified in Table 1-10 (third step).

This solution was fed into a vented twin-screw extruder of 40 mm in outer diameter of screw and 9 in L/D which had such a structure that a heating medium could be passed through the internal part of each screw and which possessed a continuous gas phase zone at the upper part of the inside of the extruder, and evaporation was carried out in a vacuum under the conditions specified in Table 1-10. The results are given in Table 1-10.

Comparative Example 1-29

A block copolymer was obtained in the same manner as in Example 1-46, except that the crude epoxidation reaction mixture was not washed with water in the third step. The obtained resin had a residual solvent content of 620 ppm, a gel content of 5.2 wt. % and an epoxy equivalent of 620. The results are given in Table 1-10.

Examples 1-52 to 1-56 and Comparative Examples 1-31 and 1-32

300 parts by weight of polystyrene-polybutadiene-polystyrene block copolymer (SBS; TR-2000 produced by Japan Synthetic Rubber Co., Ltd.) was dissolved in 1500 parts by weight of ethyl acetate. 169 parts by weight of an ethyl acetate solution containing 30% peracetic acid was continuously dropped into the copolymer solution and an epoxidation reaction was carried out at 40° C. for 3 hr under agitation. The resultant reaction mixture was cooled to room temperature and washed with pure water, thereby obtaining an ethyl acetate solution of epoxidized polystyrene-polybutadiene-polystyrene polymer (epoxidized SBS copolymer). This ethyl acetate solution of the polymer had a concentration of 30 wt. %. Each of the stabilizers listed in Table 1-11 was added to the solution in the proportion specified in Table 1-11 per finally obtained polymer and satisfactorily mixed together.

The resultant organic solution was fed into a vented twin-screw extruder of 40 mm in outer diameter of screw and 9 in L/D which had such a structure that a heating medium could be passed through the internal part of each screw and which possessed a continuous gas phase zone at the upper part of the inside of the extruder, and the solvent was evaporated off in a vacuum through the vent. This vented extruder was operated with the cylinder temperature set at 160° C., the vent at a pressure of 100 Torr and the screw revolution speed at 200 rpm. The feeding rate of the organic solution was so regulated that the rate of production of the polymer was 10 kg/h. The polymer discharged through an end of the extruder was pelletized by means of a cutter. The residual solvent content, gel content, R-value and hue change of the polymer after the removal of the solvent are given in Table 1-11. The measuring methods therefor were as described below.

Measuring methods:

(1) Residual solvent content: determined by dissolving the polymer in toluene and measuring by gas chromatography.

(2) Gel content after heating: expressed as the weight percentage of tetrahydrofuran (THF) insolubles contained in the pellets allowed to stand still in an oven at 180° C. for 30 min.

(3) Yellow index: expressed as the YI value difference ($\Delta$YI) which represents the one between the YI value before heating a prepared pressed sheet of 3 mm in thickness in an oven at 180° C. for 30 min and the YI value thereafter.

300 parts by weight of this partially hydrogenated block copolymer was dissolved in 1500 parts by weight of cyclohexane. 180 parts of an ethyl acetate solution containing 30% peracetic acid was continuously dropped into the polymer solution and an epoxidation reaction was carried out at 40° C. for 3 hr under agitation. The resultant reaction mixture was cooled to room temperature and washed thrice with pure water which was used in the same amount as that of the reaction mixture, thereby obtaining a solution of epoxidized partially hydrogenated polystyrene-polybutadiene-polystyrene copolymer (concentration: 30 wt. %).

TABLE 1-11

Properties of epoxidized SBS copolymer

| | Phenolic stabilizer | | Phosphorous stabilizer | | Residual solvent content (ppm) | R-value | Gel content after heating (wt %) | $\Delta$YI |
|---|---|---|---|---|---|---|---|---|
| | type | amt. added | type | amt. added | | | | |
| Ex. 1-52 | A | 0.5 | — | — | 480 | 0.01 | <0.2 | 0.9 |
| Ex. 1-53 | A | 0.5 | X | 0.2 | 470 | 0.01 | <0.2 | 0.8 |
| Ex. 1-54 | B | 1 | — | — | 480 | 0.01 | <0.2 | 0.8 |
| Ex. 1-55 | — | — | X | 1.0 | 480 | 0.02 | <0.2 | 1.0 |
| Ex. 1-56 | C | 0.2 | Y | 0.3 | 500 | 0.01 | <0.2 | 0.8 |
| Comp. Ex. 1-31 | — | — | — | — | 490 | 0.01 | 5.49 | 5.1 |
| Comp. Ex. 1-32 | A | 0.001 | — | — | 500 | 0.01 | 5.45 | 4.8 |

A: Irganox 1010 produced by Ciba-Geigy: tetrakis(methylene-3-(3',5'-di-tert-butyl-4'-hydroxyphenyl)propionate)methane
B: Irganox 1330 produced by Ciba-Geigy: 1,3,5-trimethyl-2,4,6-tris(3,5-di-tert-butyl-4-hydroxybenzyl)benzene
C: 2,6-di-tert-butyl-4-methylphenol
X: trisnonylphenyl phosphite
Y: tris(2,5-di-tert-butylphenyl)phosphite

Examples 1-57 and 1-58 and Comparative Examples 1-33 and 1-34

300 parts by weight of polystyrene-polybutadiene-polystyrene block copolymer (SBS; TR-2000 produced by Japan Synthetic Rubber Co., Ltd.) was dissolved in 3000 parts by weight of cyclohexane in a jacketed reactor equipped with an agitator and a thermometer. 40 g of a cyclohexane solution of di-p-tolylbis(1-cyclopentadienyl) titanium (concentration: 1 mmol/liter) and 8 g of an n-butyllithium solution (concentration: 5 mmol/liter) were mixed together at 0° C. under a hydrogen pressure of 2 kg/cm² and added to the above polymer solution as a hydrogenation catalyst. A reaction was carried out under a partial pressure of hydrogen of 2.5 kg/cm² for 30 min. The solvent was removed from the resultant partially hydrogenated polymer solution by vacuum drying, thereby obtaining a polymer (percentage of hydrogenation of double bonds ascribed to butadiene: 50%).

This organic solution was fed into a vented twin-screw extruder of 40 mm in outer diameter of screw and 9 in L/D which had such a structure that a heating medium could be passed through the internal part of each screw and which possessed a continuous gas phase zone at the upper part of the inside of the extruder, and the solvent was evaporated off in a vacuum through the vent. This vented extruder was operated with the cylinder temperature set at 160° C., the vent at a pressure of 100 Torr and the screw revolution speed at 200 rpm. The feeding speed of the organic solution was so regulated that the rate of production of the polymer was 10 kg/h. The polymer discharged through an end of the extruder was pelletized by means of a cutter. The residual solvent content, gel content, R-value and hue change of the polymer after the removal of the solvent are given in Table 1-12.

TABLE 1-12

Properties of epoxidized partially hydrogenated SBS copolymer

| | Phenolic stabilizer | | Phosphorous stabilizer | | Residual solv3ent content (ppm) | R-value | Gel content after heating (wt %) | $\Delta$YI |
|---|---|---|---|---|---|---|---|---|
| | type | amt. added | type | amt. added | | | | |
| Ex. 1-57 | A | 0.5 | — | — | 550 | 0.02 | <0.2 | 0.9 |
| Ex. 1-58 | A | 0.5 | X | 0.2 | 520 | 0.03 | <0.2 | 1.0 |

TABLE 1-12-continued

Properties of epoxidized partially hydrogenated SBS copolymer

|  | Phenolic stabilizer | | Phosphorous stabilizer | | Residual solv3ent content (ppm) | R-value | Gel content after heating (wt %) | ΔYI |
|---|---|---|---|---|---|---|---|---|
|  | type | amt. added | type | amt. added |  |  |  |  |
| Comp. Ex. 1-33 | — | — | — | — | 600 | 0.02 | 3.20 | 3.3 |
| Comp. Ex. 1-34 | A | 0.001 | — | — | 490 | 0.02 | 3.00 | 3.2 |

A: Irganox 1010 produced by Ciba-Geigy: tetrakis(methylene-3-(3',5'-di-tert-butyl-4'-hydroxyphenyl)propionate)methane
X: trisnonylphenyl phosphite Example 1-59

300 parts by weight of polystyrene-polybutadiene-polystyrene block copolymer (SBS; TR-2000 produced by Japan Synthetic Rubber Co., Ltd.; weight ratio of styrene to butadiene: 40/60) was dissolved in 1500 parts by weight of ethyl acetate. 169 parts by weight of an ethyl acetate solution containing 30% peracetic acid was dropped into the copolymer solution and agitated, and an epoxidation reaction was carried out at 40° C. for 3 hr. The resultant reaction mixture was cooled to room temperature and washed with pure water, thereby obtaining an ethyl acetate solution of epoxidized polystyrene-polybutadiene-polystyrene polymer (ESBS). This solution had a polymer concentration of 20 wt. % (hereinafter referred to as the "ethyl acetate dope").

The ethyl acetate dope was fed at a rate of 60 to 80 kg/h (ESBS: 18.0 to 22.5 kg/h) into a heat exchanger of the shell and tube type (hereinafter referred to as the "shell and tube") having a heating surface area of 7.80 m² by the use of a gear pump. The temperature at which the heating medium was fed into the shell and tube was 160° C. and the internal pressure of the system of the shell and tube was 460 Torr. As a result, a concentration was effected so that the volatile content of the epoxidized block copolymer was reduced to 20 wt. % (epoxidized block copolymer concentration: 80 wt. %).

This concentrate was introduced at a rate of 20 to 25 kg/h (ESBS: 18.0 to 22.5 kg/h) into a vented twin-screw kneading evaporator (heating surface area: 1 m² and L/D: 9). The temperature at which the heating medium was fed into the twin-screw kneading evaporator ranged from 150° to 160° C. and the internal pressure of the system of the twin-screw kneading evaporator was 200 Torr.

As a result, the volatile content of the epoxidized block copolymer was reduced to 0.04 wt. % (epoxidized block copolymer concentration: 99.6 wt. %). Table 1-13 specifies the operating conditions, residual organic solvent content of epoxidized block copolymer, etc. In the table, the first-stage concentration means the concentration by the shell and tube and the second-stage concentration means the concentration by the twin-screw kneading evaporator. The gel content of obtained epoxidized block copolymer was measured and the result is also given in Table 1-13.

TABLE 1-13

|  | temp. (°C.) | press. (Torr) | residual solvent content (wt. %) | gel content (wt. %) | R-value |
|---|---|---|---|---|---|
| Ex. 1-59 |  |  |  |  |  |
| 1st-stage concn. | 160 | 460 | 20.00 | — | — |
| 2nd-stage concn. | 160 | 200 | 0.44 | 0.20 | 0.02 |

Second Embodiment

Example 2-1

300 parts by weight of polystyrene-polybutadiene-polystyrene (SBS) block copolymer (trade name: TR-2000, produced by Japan Synthetic Rubber Co., Ltd.) was completely dissolved in 1500 parts by weight of ethyl acetate. 169 parts by weight of an ethyl acetate solution containing 30% peracetic acid was continuously dropped into the copolymer solution and an epoxidation reaction was carried out at 40° C. for 3 hr under agitation. The resultant reaction mixture was cooled to room temperature and washed thrice with pure water which was used in the same amount as that of the reaction mixture, thereby obtaining an ethyl acetate solution of epoxidized polystyrene-polybutadiene-polystyrene polymer (ESBS). This solution was subjected to steam stripping conducted at a water temperature of 90° C., in which 100 ppm of surfactant water and steam was blown from the lower part of a vessel. The resultant crumbled polymer of 3 to 6 mm in diameter was recovered by filtration. The crumbs were fed into a squeezer to thereby effect dewatering and dried by a dryer. The acid value, epoxy equivalent, melt viscosity, molecular weight distribution, etc. of this polymer along with those of the following Examples are collectively given in Table 2-1.

Example 2-2

ESBS was obtained in the same manner as in Example 2-1, except that, after the completion of the epoxidation reaction, the reaction mixture was washed with a 0.1N aqueous sodium bicarbonate solution in place of the pure water. The R-value, melt viscosity, etc. of the obtained epoxidized block copolymer are given in Table 2-1.

Example 2-3

ESBS was obtained in the same manner as in Example 2-1, except that, in the epoxidation reaction, the amount of the ethyl acetate solution containing 30% peracetic acid was changed to 422.5 parts by weight.

Example 2-4

300 parts by weight of polystyrene-polybutadiene-polystyrene block copolymer (trade name: TR-2000, produced by Japan Synthetic Rubber Co., Ltd.) was dissolved in 3000 parts by weight of cyclohexane in a jacketed reactor equipped with an agitator and a thermometer. 40 ml of a cyclohexane solution of di-p-tolylbis(1-cyclopentadienyl) titanium (concentration: 1 mmol/liter) and 8 ml of an n-butyllithium solution (concentration: 5 mmol/liter) were mixed together at 0° C. under a hydrogen pressure of 2 kg/cm$^2$ and added to the above polymer solution as a hydrogenation catalyst. A reaction was carried out under a partial pressure of hydrogen of 2.5 kg/cm$^2$ for 30 min.

The solvent was removed from the resultant partially hydrogenated polymer solution by vacuum drying, thereby obtaining a polymer (percentage of hydrogenation of double bonds ascribed to butadiene: 30%).

300 parts by weight of this partially hydrogenated block copolymer was dissolved in 1500 parts by weight of cyclohexane. 300 parts by weight of an ethyl acetate solution containing 30% peracetic acid was continuously dropped into the copolymer solution and an epoxidation reaction was carried out at 40° C. for 3 hr under agitation. The resultant reaction mixture was cooled to room temperature and washed thrice with pure water which was used in the same amount as that of the reaction mixture, thereby obtaining a solution of epoxidized partially hydrogenated polystyrene-polybutadiene-polystyrene copolymer (ESEBS). Solvent removal and resin recovery from this solution were performed in exactly the same manner as in Example 2-1.

Example 2-5

300 parts by weight of polystyrene-polyisoprene-polystyrene (SIS) block copolymer (trade name: Cariflex TR1111, produced by Shell Chemical Co., Ltd.) was dissolved in 1500 parts by weight of cyclohexane. 222 parts by weight of an ethyl acetate solution containing 30% peracetic acid was continuously dropped into the copolymer solution and an epoxidation reaction was carried out at 40° C. for 3 hr under agitation. The resultant reaction mixture was cooled to room temperature and washed thrice with pure water which was used in the same amount as that of the reaction mixture, thereby obtaining a solution of epoxidized polystyrene-polyisoprene-polystyrene polymer (ESIS). Solvent removal and resin recovery from this solution were performed in exactly the same manner as in Example 2-1. Note 1 of Table 2-1: The epoxy equivalent indicates the value of 1600/oxirane oxygen concentration (%). oxygen concentration (%).

The oxirane oxygen concentration was determined by measuring the weight percentage of oxirane oxygen ascribed to the epoxy of block copolymer by titration with an acetic acid solution of hydrogen bromide. Note 2: indicating the weight percentage of chloroform insoluble contained in the epoxidized block copolymer (separated by a 3 μm filter). Note 3: indicating the value obtained by measuring at 190° C. with the use of a flow tester (die: 1 mm in diameter×10 mm, load: 100 kgf). Note 4: indicating the value obtained by measuring with the use of GPC. Note 5: indicating the weight percentage of chloroform insolubles contained in the epoxidized block copolymer allowed to stand still in an oven at 140° C. for 20 min.

TABLE 2-1

| | A | B | C | D | E | F | G |
|---|---|---|---|---|---|---|---|
| Ex. 2-1 | washed with water | 1.4 | 470 | <0.05 | 4850 | 1.15 | <0.05 |
| Ex. 2-2 | neutralized | 0.8 | 470 | <0.05 | 4820 | 1.15 | <0.05 |
| Ex. 2-3 | washed with water | 1.0 | 230 | <0.05 | 18900 | 1.17 | <0.05 |
| Ex. 2-4 | washed with water | 1.3 | 295 | <0.05 | 2050 | 1.21 | <0.05 |
| Ex. 2-5 | washed with water | 1.3 | 360 | <0.05 | 12300 | 1.20 | <0.05 |

A: Acid removing method.
B: Acid value [mgKOH/g].
C: Epoxy equivalent [1600/oxirane oxygen (%)]. The oxirane oxygen concentration was determined by measuring the weight percentage of oxirane oxygen ascribed to the epoxy of block copolymer by titration with an acetic acid solution of hydrogen bromide.
D: Gel content [wt. %] indicating the weight percentage of chloroform insolubles contained in the epoxidized block copolymer (separated by a 3 μm filter).
E: Melt viscosity [P] indicating the value obtained by measuring at 190° C. with the use of a flow tester (die: 1 mm in diameter × 10 mm, load: 100 kgf).
F: Molecular weight distribution [Mw/Mn] indicating the value obtained by measuring with the use of GPC.
G: Gel content after heating [wt. %] indicating the weight percentage of chloroform insolubles contained in the epoxidized block copolymer allowed to stand still in an oven at 140° C. for 20 min.

Comparative Example 2-1

A polymer was obtained in the same manner as in Example 2-1, except that no washing with water of the crude epoxidation reaction mixture was effected. The acid value of the obtained polymer was 15.2 mgKOH/g. The epoxy equivalent of the polymer was 502, so that an epoxy group loss was somewhat recognized. The test results thereof along with those of the following Comparative Examples are collectively given in Table 2-2. The test particulars of Table 2-2 are the same as noted in Table 2-1. For comparison, the test results of Examples 1-1, 1-3 and 1-4 described above are also given in Table 1-2.

Comparative Example 2-2

A polymer was obtained in the same manner as in Example 2-1, except that no washing with water after the epoxidation reaction was effected and that the solvent removal was performed by the direct solvent removal method (0.1 Torr, 50° C., 2 hr) in place of the steam stripping. The acid value of the obtained polymer was 40.3 mgKOH/g. The epoxy equivalent of the polymer was 510, so that an epoxy group loss was somewhat recognized.

Comparative Example 2-3

A polymer was obtained in the same manner as in Example 2-1, except that no washing with water of the crude epoxidation reaction mixture was completely effected so as to intentionally cause acids to remain and that the solvent removal was performed by the direct solvent removal method (0.1 Torr, 50° C., 2 hr) in place of the steam stripping. The acid value of the obtained polymer was 21.5 mgKOH/g. The epoxy equivalent of the polymer was 492, so that an epoxy group loss was somewhat recognized.

Comparative Example 2-4

A polymer was obtained in the same manner as in Example 2-3, except that no washing with water after the epoxidation reaction was effected and that the solvent removal was performed by the direct solvent removal method (0.1 Torr, 50° C., 2 hr) in place of the steam stripping. The acid value of the obtained polymer was 82.4 mgKOH/g. The epoxy equivalent of the polymer was 270, so that an epoxy group loss was somewhat recognized.

Comparative Example 2-5

A polymer was obtained in the same manner as in Example 2-4, except that no washing with water of the crude epoxidation reaction mixture was effected. The acid value of the obtained polymer was 15.1 mgKOH/g. The epoxy equivalent of the polymer was 330, so that an epoxy group loss was somewhat recognized. The melt viscosity and molecular weight distribution of obtained polymer were higher in Comparative Examples 2-1 to 2-5 without exception than in Example 2-1. In particular, it has been found that the gel content of heated polymer is conspicuously affected by the acid value. The formation of a large amount of gel is unfavorable because it is gravely detrimental to the moldability.

TABLE 2-2

|  | B | C | D | E | F | G |
|---|---|---|---|---|---|---|
| Comp. Ex. 2-1 | 15.2 | 502 | 0.12 | 6500 | 1.34 | 5.50 |
| Comp. Ex. 2-2 | 40.3 | 510 | 0.15 | 7100 | 1.36 | 7.30 |
| Comp. Ex. 2-3 | 21.5 | 492 | 0.08 | 5500 | 1.28 | 6.05 |
| Comp. Ex. 2-4 | 82.4 | 270 | 0.35 | immeasurable | 1.35 | 80.8 |
| Comp. Ex. 2-5 | 15.1 | 330 | 0.25 | 2200 | 1.34 | 4.90 |

B to G have the same meaning as in Table 2-1.

Third Embodiment

Examples 3-1 to 3-7 and Comparative Examples 3-1 and 3-2

300 parts by weight of polystyrene-polybutadiene-polystyrene (SBS) block copolymer (trade name: TR-2000, produced by Japan Synthetic Rubber Co., Ltd.) was dissolved in 1500 parts by weight of ethyl acetate. 169 parts by weight of an ethyl acetate solution containing 30% peracetic acid was continuously dropped into the copolymer solution and an epoxidation reaction was carried out at 40° C. for 3 hr under agitation. The resultant reaction mixture was cooled to room temperature and washed with pure water, thereby obtaining an ethyl acetate solution of epoxidized polystyrene-polybutadiene-polystyrene copolymer (copolymer X). This ethyl acetate solution of the polymer had a concentration of 20 wt. %. Each stabilizer listed in Table 3-1 was added to the solution and satisfactorily agitated. This polymer solution was subjected to steam stripping in which 100 ppm of nonionic surfactant "Pluronic F-108" produced by Asahi Denka Kogyo K.K. was added to water in a steam stripping vessel and the temperature of the water was held at 95° C. The polymer was stably dispersed in the form of crumbs and neither mutual adhesion of polymers nor polymer adhesion to the vessel wall and agitating blade was observed.

The obtained slurry having the polymer dispersed in water was fed into a rotary screen, thereby obtaining hydrous crumbs having a water content of 40 wt. %. The crumbs were fed into a squeeze dehydrating dryer of the twin-screw extruder type which was provided with two slits having a slit spacing of 0.1 mm and two vents so as to simultaneously accomplish water removal and drying. In the extrusion drying, the cylinder temperature was set at 180° C., the screw revolution speed at 200 rpm, the first vent at atmospheric pressure and the second vent at a pressure of 200 Torr. The polymer discharged through an end of the extruder was pelletized by means of a cutter.

The gel content after heating and ΔYI indicating the degree of coloring by heating of the obtained pellets were measured in the methods described below and the results are given in Table 3-1.

Examples 3-8 to 3-10 and Comparative Examples 3-3 and 3-4

300 parts by weight of polystyrene-polybutadiene-polystyrene block copolymer (trade name: TR-2000, produced by Japan Synthetic Rubber Co., Ltd.) was dissolved in 3000 parts by weight of cyclohexane in a jacketed reactor equipped with an agitator and a thermometer. 40 ml of a cyclohexane solution of di-p-tolylbis(1-cyclopentadienyl) titanium (concentration: 1 mmol/liter) and 8 ml of an n-butyllithium solution (concentration: 5 mmol/liter) were mixed together at 0° C. under a hydrogen pressure of 2 kg/cm$^2$ and added to the above polymer solution as a hydrogenation catalyst. A reaction was carried out under a partial pressure of hydrogen of 2.5 kg/cm$^2$ for 30 min. The solvent was removed from the resultant partially hydrogenated polymer solution by vacuum drying, thereby obtaining a polymer (percentage of hydrogenation of double bonds ascribed to butadiene: 50%). 300 parts by weight of this partially hydrogenated block copolymer was dissolved in 1500 parts by weight of cyclohexane. 180 parts by weight of an ethyl acetate solution containing 30% peracetic acid was continuously dropped into the copolymer solution and an epoxidation reaction was carried out at 40° C. for 3 hr under agitation. The resultant reaction mixture was cooled to room temperature and washed thrice with pure water which was used in the same amount as that of the reaction mixture, thereby obtaining a solution of epoxidized partially hydrogenated polystyrene-polybutadiene-polystyrene copolymer (copolymer Y). This polymer solution was subjected to steam stripping in which 100 ppm of nonionic surfactant "Emulgen PP-290" produced by Kao Corp. was added to water in a steam stripping vessel and the temperature of the water was held at 95° C. The polymer was stably dispersed in the form of crumbs and neither mutual adhesion of polymers nor polymer adhesion to the vessel wall and agitating blade was observed.

The obtained slurry having the polymer dispersed in water was fed into a rotary screen, thereby obtaining hydrous crumbs having a water content of 40 wt. %. The crumbs were fed into a squeeze dehydrating dryer of the twin-screw extruder type which was provided with two slits having a slit spacing of 0.1 mm and two vents so as to simultaneously accomplish water removal and drying. In the extrusion drying, the cylinder temperature was set at 180° C., the screw revolution speed at 200 rpm, the first vent at atmospheric pressure and the second vent at a pressure of 200 Torr. The polymer discharged through an end of the extruder was pelletized by means of a cutter. The residual water content of the dried polymer was 200 ppm.

The gel content and ΔYI of the obtained pellets were measured in the same manner as done for the polymer X and the results are given in Table 3-1.

In Table 3-1, with respect to the type of phenolic stabilizer, numerals 1, 2 and 3 denote tetrakis(methylene-3-(3',5'-di-tert-butyl-4'-hydroxyphenyl)propionate)methane, 1,3,5-trimethyl-2,4,6-tris(3,5-di-tert-butyl-4-hydroxybenzyl)benzene and 2,6-di-tert-butyl-4-methylphenol, respectively. With respect to the type of phosphorous stabilizer, numerals 1 and 2 denote tris-nonylphenyl phosphite and tris(2,5-di-tert-butylphenyl) phosphite, respectively.

The amount of added phenolic stabilizer or phosphorous stabilizer is expressed per 100 parts by weight of the polymer.

The gel content after heating is the weight percentage of THF insolubles contained in the pellets allowed to stand still in an oven at 180° C. for 30 min.

The ΔYI is a YI value difference measured with a color difference meter represents the one between the YI value before allowing a prepared pressed sheet of 3 mm in thickness to stand still in an oven at 180° C. for 30 min and the YI value thereafter.

TABLE 3-1

| Ex. | Epoxidized block copolymer | Phenolic stabilizer type | amt. | Phosphorous stabilizer type | amt. | Gel content after heating (%) | ΔYI |
|---|---|---|---|---|---|---|---|
| Ex. 3-1 | X | 1 | 0.5 | — | — | 0.02 | 0.8 |
| Ex. 3-2 | X | 1 | 0.5 | 1 | 0.2 | 0.07 | 0.9 |
| Ex. 3-3 | X | 2 | 1 | — | — | 0.01 | 0.7 |
| Ex. 3-4 | X | — | — | 1 | 1.0 | 0.12 | 1.0 |
| Ex. 3-5 | X | 3 | 0.2 | 2 | 0.3 | 0.03 | 0.7 |
| Comp. Ex. 3-1 | X | — | — | — | — | 5.50 | 5.0 |
| Comp. Ex. 3-2 | X | 1 | 0.001 | — | — | 5.45 | 4.9 |
| Ex. 3-6 | X | 1 | 6.0 | — | — | 0.02 | 0.7 |
| Ex. 3-7 | X | 1 | 0.5 | 1 | 6.0 | 0.50 | 0.7 |
| Ex. 3-8 | Y | 1 | 0.5 | — | — | 0.03 | 0.9 |
| Ex. 3-9 | Y | 1 | 0.5 | 1 | 0.2 | 0.06 | 1.0 |
| Comp. Ex. 3-3 | Y | — | — | — | — | 3.20 | 3.3 |
| Comp. Ex. 3-4 | Y | 1 | 0.001 | — | — | 3.00 | 3.2 |
| Ex. 3-10 | Y | — | — | 1 | 6.0 | 0.10 | 0.7 |

Fourth Embodiment

Hereinbelow, the expressions "parts" and "%" are based on weight.

The degree of blocking and the haze of each obtained epoxidized block copolymer composition were evaluated by the following methods. The results are given in Table 4-1.
(1) Degree of blocking:

Sample pellets were charged into a plastic cylinder of 5 cm in diameter. The sample had its top loaded with a weight of 2 kg and was allowed to stand still at 40° C. for 48 hr. The sample was taken out and the state of pellet blocking was evaluated. In the results, "o" indicates the absence of blocking, "Δ" the presence of slight blocking and "x" the presence of conspicuous blocking.
(2) Haze:

Sample pellets were compression molded into a 2 mm thick sheet, and the haze of the sheet was measured in accordance with Japanese Industrial Standard K-7105.

Examples 4-1 to 4-10 and Comparative Examples 4-1 to 4-5

300 parts of polystyrene-polybutadiene-polystyrene (SBS) block copolymer (trade name: TR-2000, produced by Japan Synthetic Rubber Co., Ltd.) and 1500 parts of ethyl acetate were charged into a jacketed 5-liter reactor equipped with an agitator and a thermometer, and the SBS was dissolved in the ethyl acetate. The internal temperature of the reactor was raised to 40° C. and, while maintaining this temperature, 169 parts of an ethyl acetate solution containing 30% peracetic acid was continuously dropped into the copolymer solution under agitation over a period of 3 hr to thereby effect an epoxidation reaction.

After the completion of the epoxidation reaction, the internal temperature was lowered to room temperature and the reaction mixture was washed with pure water, thereby obtaining an ethyl acetate solution of epoxidized polystyrene-polybutadiene-polystyrene polymer. This polymer solution was subjected to steam stripping to thereby remove ethyl acetate. Thereafter, the resultant slurry having the polymer dispersed in water was dewatered by the use of a rotary screen and fed into a vented twin-screw extruder. The polymer was melt extruded through a die in the form of strands. The strands were cut into pellets.

According to the method in which the surfaces of the obtained pellets (size: cylindrical form of about 2 mm in diameter and 3 mm in length, the same applies hereinbelow) were covered with the antiblocking agent, each of the antiblocking agents listed in Table 4-1 was deposited on the surfaces of the pellets in the amount specified in Table 4-1 per 100 parts of the pellets by directly dusting the pellets therewith, thereby obtaining an epoxidized block copolymer composition.

TABLE 4-1

| | Antiblocking agent type | amt. % | Deg. of blocking | Haze (%) |
|---|---|---|---|---|
| Ex. 4-1 | silicon oxide | 0.1 | o | 4.2 |
| Ex. 4-2 | silicone oil | 0.1 | o | 4.3 |
| Ex. 4-3 | calcium stearate | 0.1 | o | 4.3 |
| Ex. 4-4 | glycerol monostearate | 0.05 | o | 4.2 |
| Ex. 4-5 | glycerol monostearate | 0.01 | Δ | 4.1 |
| Ex. 4-6 | calcium stearate glycerol monostearate | 0.05 0.05 | o | 4.4 |
| Ex. 4-7 | ethylenebisstearamide | 0.1 | o | 4.2 |
| Ex. 4-8 | polyoxyethylene-polyoxypropylene block copolymer | 0.05 | o | 4.2 |
| Ex. 4-9 | sorbitan monostearate | 0.2 | o | 4.4 |
| Ex. 4-10 | silicon oxide sodium stearate | 0.3 0.1 | o | 4.5 |
| Comp. Ex. 4-1 | none | — | x | 4.0 |
| Comp. Ex. 4-2 | silicon oxide | 0.0001 | x | 4.0 |
| Comp. Ex. 4-3 | silicon oxide | 6.0 | o | 20 |
| Comp. Ex. 4-4 | calcium oxide | 0.1 | x | 4.5 |
| Comp. Ex. 4-5 | magnesium oxide | 0.1 | x | 4.5 |

Examples 4-11 to 4-16 and Comparative Examples 4-6 to 4-9

300 g of polystyrene-polybutadiene-polystyrene (SBS) block copolymer (trade name: TR-2000, produced by Japan Synthetic Rubber Co., Ltd.) and 3000 g of cyclohexane were charged into a jacketed 10-liter reactor equipped with an agitator and a thermometer, and the SBS was dissolved in the cyclohexane. 40 ml of a cyclohexane solution of di-p-tolylbis(1-cyclopentadienyl)titanium (concentration: 1 mmol/liter) and 8 ml of an n-butyllithium solution (concentration: 5 mmol/liter) were mixed together at 0° C. under a hydrogen pressure of 2 kg/cm² and added to the above polymer solution as a hydrogenation catalyst. A reaction was carried out under a partial pressure of hydrogen of 2.5 kg/cm² for 30 min. The solvent was removed from the resultant partially hydrogenated polymer solution by vacuum drying, thereby obtaining a polymer. The percentage of hydrogenation of double bonds ascribed to butadiene was 50%.

300 parts of this partially hydrogenated block copolymer was dissolved in 1500 parts of cyclohexane, and the internal temperature of the reactor was raised to 40° C. While maintaining this temperature, 180 parts of an ethyl acetate solution containing 30% peracetic acid was continuously dropped into the copolymer solution over a period of 3 hr under agitation to thereby effect an epoxidation reaction. The resultant reaction mixture was cooled to room temperature and washed thrice with pure water which was used in the same amount as that of the reaction mixture, thereby obtaining a solution of epoxidized partially hydrogenated polystyrene-polybutadiene-polystyrene polymer.

This polymer solution was subjected to steam stripping in which 100 ppm of nonionic surfactant "Emulgen PP-290" produced by Kao Corp. was added to water in a steam stripping vessel and the temperature of the water was held at 95° C. The polymer was stably dispersed in the form of crumbs and neither mutual adhesion of crumbled polymers nor polymer adhesion to the vessel wall and agitating blade was observed. The solvent was removed by this steam stripping, and the obtained slurry having the polymer dispersed in water was fed into a rotary screen to thereby conduct dewatering. Further, the polymer was fed into a vented twin-screw extruder. The polymer was melt kneaded and extruded through a die in the form of strands. The strands were cut into pellets.

According to the method in which the surfaces of the obtained pellets were covered with the anti-blocking agent, each of the antiblocking agents listed in Table 4-2 was deposited on the surfaces of the pellets in the amount specified in Table 4-2 per 100 parts of the pellets by directly dusting the pellets therewith, thereby obtaining an epoxidized block copolymer composition.

TABLE 4-2

| | Antiblocking agent | | Deg of | Haze |
|---|---|---|---|---|
| | type | amt. (%) | blocking | (%) |
| Ex. 4-11 | silicon oxide | 0.2 | o | 4.5 |
| Ex. 4-12 | silicone oil | 0.5 | o | 4.3 |
| Ex. 4-13 | calcium stearate | 0.1 | o | 3.9 |
| Ex. 4-14 | glycerol monostearate | 0.1 | Δ | 4.2 |
| Ex. 4-15 | ethylenebisstearamide | 0.4 | o | 4.2 |
| Ex. 4-16 | sodium stearate | 0.1 | | |
| | glycerol monostearate | 0.1 | o | 4.8 |
| Comp. Ex. 4-6 | none | — | x | 3.5 |
| Comp. Ex. 4-7 | ethylenebisstearamide | 7 | o | 12.0 |
| Comp. Ex. 4-8 | calcium oxide | 0.1 | x | 4.5 |
| Comp. Ex. 4-9 | calcium oxide | 0.1 | x | 4.3 |

Fifth Embodiment

Example 5-1

300 parts by weight of polystyrene-polybutadiene-polystyrene (SBS) block copolymer (trade name: TR-2000, produced by Japan Synthetic Rubber Co., Ltd.) was dissolved in 1500 parts by weight of ethyl acetate. 169 parts by weight of an ethyl acetate solution containing 30% peracetic acid was continuously dropped into the copolymer solution and an epoxidation reaction was carried out at 40° C. for 3 hr under agitation. The resultant reaction mixture was cooled to room temperature and washed with pure water, thereby obtaining an ethyl acetate solution of epoxidized polystyrene-polybutadiene-polystyrene polymer. This ethyl acetate solution of the polymer had a concentration of 30 wt. %. The above solution was fed into a vented twin-screw two-stage extruder of 40 mm in outer diameter of screw and 38.5 in L/D and the solvent was evaporated off in a vacuum through the vents. This vented extruder was operated with the cylinder temperature set at 160° C., the first vent at a pressure of 200 Torr, the second vent at a pressure of 50 Torr and the screw revolution speed at 200 rpm. The feeding of the solution was conducted so that the rate of production of the polymer was 10 kg/h. The polymer discharged through an end of the extruder was pelletized by means of a cutter. After the removal of the solvent, the polymer had a residual solvent content of 2300 ppm and an epoxy equivalent of 520. No foaming was observed in the molded item. With respect to the moldability, the polymer was pressed at 200° C. to thereby obtain a 2 mm thick sheet and the sheet was visually inspected.

Example 5-2

The ethyl acetate solution of epoxidized block copolymer (concentration: 30 wt. %) obtained in exactly the same manner as in Example 5-1 was fed into a vented twin-screw extruder of 40 mm in outer diameter of screw and 9 in L/D which had such a structure that a heating medium could be passed through the internal part of each screw and which possessed a continuous gas phase zone at the upper part of the inside of the extruder, and the solvent was evaporated off in a vacuum through the vent. This vented extruder was operated with the cylinder temperature set at 160° C., the vent at a pressure of 100 Torr and the screw revolution speed at 200 rpm. The feeding of the solution was conducted so that the rate of production of the polymer was 10 kg/h. The polymer discharged through an end of the extruder was pelletized by means of a cutter. After the removal of the solvent, the polymer had a residual solvent content of 420 ppm and an epoxy equivalent of 520. No foaming was observed in the molded item (pressed sheet) as in Example 5-1.

Example 5-3

300 parts by weight of polystyrene-polybutadiene-polystyrene block copolymer (trade name: TR-2000, produced by Japan Synthetic Rubber Co., Ltd.) was dissolved in 3000 parts by weight of cyclohexane in a jacketed reactor equipped with an agitator and a thermometer. 0.40 part by weight of a cyclohexane solution of di-p-tolylbis(1-cyclopentadienyl)titanium (concentration: 1 mmol/liter) and 0.08 part by weight of an n-butyllithium solution (concentration: 5 mmol/liter) were mixed together at 0° C. under a hydrogen pressure of 2 kg/cm$^2$ and added to the above polymer solution as a hydrogenation catalyst. A reaction was carried out under a partial pressure of hydrogen of 2.5 kg/cm$^2$ for 30 min. The solvent was removed from the resultant partially hydrogenated polymer solution by vacuum drying, thereby obtaining a polymer (percentage of hydrogenation of double bonds ascribed to butadiene: 50%). 300 parts by weight of this partially hydrogenated block copolymer was dissolved in 1500 parts by weight of cyclohexane. 180 parts of an ethyl acetate solution containing 30% peracetic acid was continuously dropped into the copolymer solution and an epoxidation reaction was carried out at 40° C. for 3 hr under agitation. The resultant reaction mixture was cooled to room temperature and washed thrice with pure water which was used in the same amount as that of the reaction mixture, thereby obtaining a solution of epoxidized partially hydrogenated polystyrenepolybutadiene-polystyrene copolymer (concentration: 26 wt. %). This polymer solution was fed into a vented twin-screw extruder of 40 mm in outer diameter of screw and 9 in L/D which had such a structure that a heating medium could be passed through the internal part of each screw and which possessed a continuous gas phase zone at the upper part of the inside of the extruder, and the solvent was evaporated off in a vacuum through the vent. This vented extruder was operated with the cylinder temperature set at 170° C., the vent at a pressure of 100 Torr and the screw revolution speed at 200 rpm. The feeding of the solution was conducted so that the rate of production of the polymer was 10 kg/h. The polymer discharged through an end of the extruder was pelletized by means of a cutter. After the removal of the solvent, the polymer had a residual solvent content of 380 ppm and an epoxy equivalent of 285. No foaming was observed in the molded item (pressed sheet) as in Example 5-1.

Comparative Example 5-1

The ethyl acetate solution of epoxidized block copolymer (concentration: 30 wt. %) obtained in exactly the same manner as in Example 5-1 was subjected to steam stripping to thereby remove the solvent. The steam stripping was conducted at a water temperature of 90° C., in which 100 ppm of nonionic surfactant "Emanon 3199" produced by Kao Corp. (polyethylene glycol monostearate, HLB value: 19.1) was added to water in a steam stripping vessel and steam was blown from the lower part of the vessel. However, most of the polymer adhered to the agitating blade and inner wall of vessel, so that the epoxidized block copolymer could not be recovered.

Comparative Example 5-2

The ethyl acetate solution of epoxidized block copolymer (concentration: 30 wt. %) obtained in exactly the same manner as in Example 5-1 was subjected to steam stripping to thereby remove the solvent. The steam stripping was conducted at a water temperature of 95° C., in which 100 ppm of nonionic surfactant "Pluronic F108" produced by Asahi Denka Kogyo K.K. was added to water in a steam stripping vessel. The polymer was stably dispersed in the form of crumbs and neither mutual adhesion of polymers nor polymer adhesion to the vessel wall and agitating blade was observed. The obtained slurry having the polymer dispersed in water was fed into a rotary screen, thereby obtaining hydrous crumbs having a water content of 40 wt. %. The crumbs were fed into a squeeze dehydrator of the twin-screw extruder type which had a slit spacing of 0.05 mm, thereby obtaining a dewatered polymer. The water content of the obtained polymer was 15 wt. %. Thereafter, the obtained polymer was fed into a vented twin-screw one-stage extruder. In the extrusion drying, the cylinder temperature was set at 180° C., the screw revolution speed at 200 rpm and the vent pressure at 200 Torr. In this operation, the crumbs did not well bite into the extruder, so that most of the product could not undergo evaporation treatment. Moreover, water left unevaporated and remaining in the polymer caused the polymer to foam, so that product of poor quality resulted.

A comparison between Examples 5-1 to 5-3 and Comparative Examples 5-1 and 5-2 shows that, while the steam stripping involves a multiplicity of steps so as to be time-consuming and encounters the problems of lowering of not only the polymer recovery but also the efficiency of removing water from the product, the direct solvent removal process enables easy operation with a reduced number of steps.

Examples 5-4 to 5-6 and Comparative Examples 5-3 to 5-5

The ethyl acetate solution of epoxidized block copolymer (concentration: 30 wt. %) obtained in exactly the same manner as in Example 5-1 was fed into a vented twin-screw extruder of 40 mm in outer diameter of screw and 9 in L/D which had such a structure that a heating medium could be passed through the internal part of each screw and which possessed a continuous gas phase zone at the upper part of the inside of the extruder, and the solvent was evaporated off in a vacuum through the vent. This vented extruder was operated with the cylinder temperature and vent pressure set as specified in Table 5-1 and with the screw revolution speed set at 200 rpm. The feeding of the solution was conducted so that the rate of production of the polymer was 10 kg/h. The polymer discharged through an end of the extruder was pelletized by means of a cutter. The properties of each polymer after the removal of the solvent are collectively given in Table 5-1.

TABLE 5-1

| | Conditions of evaporator | | | Properties of polymer after solvent removal | | |
|---|---|---|---|---|---|---|
| | extrusion rate of polymer (kg/h) | cylinder temp. (°C.) | vent press. (Torr) | residual solvent content of polymer (ppm) (note 1) | epoxy equiv. of polymer | foaming and condition of molded item (note 2) |
| Ex. 5-4 | 25 | 160 | 50 | 300 | 520 | no foaming |
| Ex. 5-5 | 40 | 160 | 100 | 1100 | 520 | no foaming |
| Ex. 5-6 | 25 | 180 | 100 | 250 | 520 | no foaming |
| Comp. Ex. 5-3 | 25 | 160 | 700 | 80000 | 520 | gravely foamed |
| Comp. Ex. 5-4 | 25 | 310 | 100 | 50 | 520 | amt. of gel was so large that molding failed. |
| Comp. Ex. 5-5 | 25 | 70 | 100 | 250000 | 520 | amt. of solvent was so large that molding failed. |

Note 1: Value obtained by dissolving the polymer in toluene and measuring by gas chromatography
Note 2: The appearance of the sheet obtained by pressing the polymer at 200° C. was visually inspected.

Sixth Embodiment
(Method of Sample Preparation)

300 parts by weight of polystyrene-polybutadiene-polystyrene block copolymer (SBS; TR-2000 produced by Japan Synthetic Rubber Co., Ltd.; weight ratio of styrene to butadiene 40/60) was dissolved in 1500 parts by weight of ethyl acetate. 169 parts by weight of an ethyl acetate solution containing 30% peracetic acid was dropped into the copolymer solution and agitated, and an epoxidation reaction was carried out at 40° C. for 3 hr. The resultant reaction mixture was cooled to room temperature and washed with pure water, thereby obtaining an ethyl acetate solution of epoxidized polystyrene-polybutadiene-polystyrene polymer (ESBS). This solution had a polymer concentration of 20 wt. % (hereinafter referred to as the "ethyl acetate dope").

Example 6-1

The ethyl acetate dope was fed at a rate of 60 to 80 kg/h (ESBS: 18.0 to 22.5 kg/h) into a heat exchanger of the shell and tube type (hereinafter referred to as the "shell and tube") having a heating surface area of 7.80 m² by the use of a gear pump. The temperature at which the heating medium was fed into the shell and tube was 160° C. and the internal pressure of the system of the shell and tube was 460 Torr. As a result, a concentration was effected so that the volatile content of the epoxidized block copolymer was reduced to 20 wt. % (epoxidized block copolymer concentration: 80 wt. %).

This concentrate was introduced at a rate of 20 to 25 kg/h (ESBS: 18.0 to 22.5 kg/h) into a vented twin-screw kneading evaporator (heating surface area: 1 m² and L/D: 9). The temperature at which the heating medium was fed into the twin-screw kneading evaporator ranged from 150° to 160° C. and the internal pressure of the system of the twin-screw kneading evaporator was 200 Torr.

As a result, the volatile content of the epoxidized block copolymer was reduced to 0.04 wt. % (epoxidized block copolymer concentration: 99.6 wt. %) Table 6-1 specifies the operating conditions, residual organic solvent content of epoxidized block copolymer, etc. In the table, the first-stage concentration means the concentration by the shell and tube and the second-stage concentration means the concentration by the twin-screw kneading evaporator. The gel content of obtained epoxidized block copolymer was measured and the result is also given in Table 6-1.

Comparative Example 6-1

The ethyl acetate dope was fed at a rate of 60 to 80 kg/h (ESBS: 18.0 to 22.5 kg/h) into the shell and tube having a heating surface area of 7.80 m² by the use of a gear pump. The temperature at which the heating medium was fed into the shell and tube was 160° C. and the internal pressure of the system of the shell and tube was 460 Torr. As a result, a concentration was effected so that the volatile content of the epoxidized block copolymer was reduced to 20 wt. % (epoxidized block copolymer concentration: 80 wt. %).

Further concentration was effected with the heating medium feeding temperature set at 180° C. and the internal pressure set at 460 Torr. The volatile content of the epoxidized block copolymer was reduced to 15 wt. % (epoxidized block copolymer concentration: 85 wt. %). However, gelation occurred in the tube, thereby causing adhesion, clogging and channeling, which disenabled further concentration. Table 6-1 specifies the operating conditions, residual organic solvent content of epoxidized block copolymer, etc. In the table, the first-stage concentration means the initial concentration by the shell and tube and the second-stage concentration means the subsequent concentration effected under the changed conditions.

TABLE 6-1

| | Temp. (°C.) | Press. (Torr) | Residual solvent content (wt. %) | Gel content (wt. %) | Remark |
|---|---|---|---|---|---|
| Ex. 6-1 | | | | | |
| 1st-stage concn. | 160 | 460 | 20.00 | — | |
| 2nd-stage concn. | 160 | 200 | 0.04 | 0.20 | |
| Comp. Ex. 6-1 | | | | | |
| 1st-stage concn. | 160 | 460 | 20.00 | 0.20 | |
| 2nd-stage concn. | 180 | 460 | 15.00 | 5.00 | channeling |

Seventh Embodiment (Method of Measuring)

(1) Residual solvent content: determined by dissolving the polymer in toluene and measuring by gas chromatography.

(2) Gel content after heating: expressed as the weight percentage of tetrahydrofuran (THF) insolubles contained in the pellets allowed to stand still in an oven at 180° C. for 30 min.

(3) Yellow index: expressed as the YI value difference ($\Delta$YI) which represents the one between the YI value before heating a prepared pressed sheet of 3 mm in thickness in an oven at 180° C. for 30 min and the YI value thereafter.

Examples 7-1 to 7-5 and Comparative Examples 7-1 and 7-2

300 parts by weight of polystyrene-polybutadiene-polystyrene block copolymer (SBS; TR-2000 produced by Japan Synthetic Rubber Co., Ltd.) was dissolved in 1500 parts by weight of ethyl acetate. 169 parts by weight of an ethyl acetate solution containing 30% peracetic acid was continuously dropped into the copolymer solution and an epoxidation reaction was carried out at 40° C. for 3 hr under agitation. The resultant reaction mixture was cooled to room temperature and washed with pure water, thereby obtaining an ethyl acetate solution of epoxidized polystyrene-polybutadiene-polystyrene polymer (epoxidized SBS copolymer). This ethyl acetate solution of the polymer had a concentration of 30 wt. %. Each of the stabilizers listed in Table 7-1 was added to the solution in the proportion specified in Table 7-1 per finally obtained polymer and satisfactorily mixed together.

The resultant organic solution was fed into a vented twin-screw extruder of 40 mm in outer diameter of screw and 9 in L/D which had such a structure that a heating medium could be passed through the internal part of each screw and which possessed a continuous gas phase zone at the upper part of the inside of the extruder, and the solvent was evaporated off in a vacuum through the vent. This vented extruder was operated with the cylinder temperature set at 160° C., the vent at a pressure of 100 Torr and the screw revolution speed at 200 rpm. The feeding rate of the organic solution was so regulated that the rate of production of the polymer was 10 kg/h. The polymer discharged through an end of the extruder was pelletized by means of a cutter. The residual solvent content, gel content and hue change of the polymer after the removal of the solvent are given in Table 7-1.

TABLE 7-1

Properties of epoxidized SBS copolymer

| Ex. | Phenolic stabilizer type | Phenolic stabilizer amt. added | Phosphorous stabilizer type | Phosphorous stabilizer amt. added | Residual solvent content (ppm) | Gel content after heating (%) | ΔYI |
|---|---|---|---|---|---|---|---|
| Ex. 7-1 | A | 0.5 | — | — | 480 | <0.2 | 0.9 |
| Ex. 7-2 | A | 0.5 | X | 0.2 | 470 | <0.2 | 0.8 |
| Ex. 7-3 | B | 1 | — | — | 480 | <0.2 | 0.8 |
| Ex. 7-4 | — | — | X | 1.0 | 480 | <0.2 | 1.0 |
| Ex. 7-5 | C | 0.2 | Y | 0.3 | 500 | <0.2 | 0.8 |
| Comp. Ex. 7-1 | — | — | — | — | 490 | 5.49 | 5.1 |
| comp. Ex. 7-2 | A | 0.001 | — | — | 500 | 5.49 | 4.8 |

A: Irganox 1010 produced by Ciba-Geigy: tetrakis(methylene-3-(3',5'-di-tert-butyl-4'-hydroxyphenyl)propionate)methane
B Irganox 1330 produced by Ciba-Geigy: 1,3,5-trimethyl-2,4,6-tris(3,5-di-tert-butyl-4-hydroxybenzyl)benzene
C: 2,6-di-tert-butyl-4-methylphenol
X: trisnonylphenyl phosphite
Y: tris(2,5-di-tert-butylphenyl) phosphite

Examples 7-6 and 7-7 and Comparative Examples 7-3 and 7-4

300 parts by weight of polystyrene-polybutadiene-polystyrene block copolymer (SBS; TR-2000 produced by Japan Synthetic Rubber Co., Ltd.) was dissolved in 3000 parts by weight of cyclohexane in a jacketed reactor equipped with an agitator and a thermometer. 40 g of a cyclohexane solution of di-p-tolylbis(1-cyclopentadienyl) titanium (concentration: 1 mmol/liter) and 8 g of an n-butyllithium solution (concentration: 5 mmol/liter) were mixed together at 0° C. under a hydrogen pressure of 2 kg/cm² and added to the above polymer solution as a hydrogenation catalyst. A reaction was carried out under a partial pressure of hydrogen of 2.5 kg/cm² for 30 min. The solvent was removed from the resultant partially hydrogenated polymer solution by vacuum drying, thereby obtaining a polymer (percentage of hydrogenation of double bonds ascribed to butadiene: 50%).

300 parts by weight of this partially hydrogenated block copolymer was dissolved in 1500 parts by weight of cyclohexane. 180 parts of an ethyl acetate solution containing 30% peracetic acid was continuously dropped into the polymer solution and an epoxidation reaction was carried out at 40° C. for 3 hr under agitation. The resultant reaction mixture was cooled to room temperature and washed thrice with pure water which was used in the same amount as that of the reaction mixture, thereby obtaining a solution of epoxidized partially hydrogenated polystyrene-polybutadiene-polystyrene copolymer (concentration: 30 wt. %).

This organic solution was fed into a vented twin-screw extruder of 40 mm in outer diameter of screw and 9 in L/D which had such a structure that a heating medium could be passed through the internal part of each screw and which possessed a continuous gas phase zone at the upper part of the inside of the extruder, and the solvent was evaporated off in a vacuum through the vent. This vented extruder was operated with the cylinder temperature set at 160° C., the vent at a pressure of 100 Torr and the screw revolution speed at 200 rpm. The feeding speed of the organic solution was so regulated that the rate of production of the polymer was 10 kg/h. The polymer discharged through an end of the extruder was pelletized by means of a cutter. The residual solvent content, gel content and hue change of the polymer after the removal of the solvent are given in Table 7-2.

TABLE 7-2

Properties of epoxidized partially hydrogenated SBS copolymer

| Ex. | Phenolic stabilizer type | Phenolic stabilizer amt. added | Phosphorous stabilizer type | Phosphorous stabilizer amt. added | Residual solvent content (ppm) | Gel content after heating (%) | ΔYI |
|---|---|---|---|---|---|---|---|
| Ex. 7-6 | A | 0.5 | — | — | 550 | <0.2 | 0.9 |
| Ex. 7-7 | A | 0.5 | X | 0.2 | 520 | <0.2 | 1.0 |
| Comp. Ex. 7-3 | — | — | — | — | 600 | 3.20 | 3.3 |
| comp. Ex. 7-4 | A | 0.001 | — | — | 490 | 3.00 | 3.2 |

A: Irganox 1010 produced by Ciba-Geigy: tetrakis(methylene-3-(3',5'-di-tert-butyl-4'-hydroxyphenyl)propionate)methane
X: trisnonylphenyl phosphite

Eighth Embodiment

Example 8-1

300 parts by weight of polystyrene-polybutadiene-polystyrene block copolymer (SBS; TR-2000 produced by Japan Synthetic Rubber Co., Ltd.) was completely dissolved in 1500 parts by weight of ethyl acetate (first step). 169 parts by weight of an ethyl acetate solution containing 30% peracetic acid was continuously dropped into the copolymer solution and an epoxidation reaction was carried out at 40° C. for 3 hr under agitation (second step). The resultant reaction mixture was cooled to room temperature and washed with pure water, thereby obtaining an ethyl acetate solution of epoxidized polystyrene-polybutadiene-polystyrene copolymer (ESBS) (third step). This ethyl acetate solution of epoxidized block copolymer had a concentration of 30 wt. %. The acid value of the solution was 1.0 mgKOH/g.

The above solution was fed into a vented twin-screw extruder of 40 mm in outer diameter of screw and 9 in L/D which had such a structure that a heating medium could be passed through the internal part of each screw and which possessed a continuous gas phase zone at the upper part of the inside of the extruder, and the solvent was evaporated off in a vacuum through the vent. This vented extruder was operated with the cylinder temperature set at 160° C., the vent at a pressure of 100 Torr and the screw revolution speed at 200 rpm. The feeding of the solution was conducted so that the rate of production of the polymer was 10 kg/h.

The polymer discharged through an end of the extruder was pelletized by means of a cutter. After the removal of the solvent, the polymer had a residual solvent content of 420 ppm, a gel content of not greater than 0.2 wt. % and an epoxy equivalent of 520. No foaming was observed in the molded item. With respect to the moldability, the polymer was pressed at 200° C. to thereby obtain a 2 mm thick sheet and the sheet was visually inspected. The results are given in Table 8-1.

Example 8-2

The ethyl acetate solution of epoxidized block copolymer (concentration: 30 wt. %) obtained in exactly the same manner as in Example 8-1 was fed into a vented twin-screw two-stage extruder of 40 mm in outer diameter of screw and 38.5 in L/D and the solvent was evaporated off in a vacuum through the vents. This vented extruder was operated with the cylinder temperature set at 160° C., both the first and the second vents at a pressure of 100 Torr and the screw revolution speed at 200 rpm. The feeding of the solution was conducted so that the rate of production of the polymer was 10 kg/h. The polymer discharged through an end of the extruder was pelletized by means of a cutter.

After the removal of the solvent, the polymer had a residual solvent content of 2300 ppm, a gel content of not greater than 0.2 wt. % and an epoxy equivalent of 520. No foaming was observed in the molded item.

Example 8-3

300 parts by weight of polystyrene-polybutadiene-polystyrene block copolymer (TR-2000 produced by Japan Synthetic Rubber Co., Ltd.) was dissolved in 3000 parts by weight of cyclohexane in a jacketed reactor equipped with an agitator and a thermometer. 40 g of a cyclohexane solution of di-p-tolylbis(1-cyclopentadienyl)titanium (concentration: 1 mmol/liter) and 8 g of an n-butyllithium solution (concentration: 5 mmol/liter) were mixed together at 0° C. under a hydrogen pressure of 2 kg/cm$^2$ and added to the above polymer solution as a hydrogenation catalyst. A reaction was carried out under a partial pressure of hydrogen of 2.5 kg/cm$^2$ for 30 min. The solvent was removed from the resultant partially hydrogenated polymer solution by vacuum drying, thereby obtaining a polymer (percentage of hydrogenation of double bonds ascribed to butadiene: 30%). 300 parts by weight of this partially hydrogenated polymer was dissolved in 1500 parts by weight of cyclohexane (first step). 300 parts of an ethyl acetate solution containing 30% peracetic acid was continuously dropped into the polymer solution and an epoxidation reaction was carried out at 40° C. for 3 hr under agitation (second step). The resultant reaction mixture was cooled to room temperature and washed with pure water, thereby obtaining a solution of epoxidized partially hydrogenated polystyrene-polybutadiene-polystyrene copolymer (ESEBS) (third step). This block copolymer solution had a concentration of 22 wt. % and an acid value of 1.3 mgKOH/g.

This solution was fed into exactly the same vented twin-screw two-stage extruder as in Example 8-2 and the solvent was evaporated off in a vacuum under exactly the same conditions as in Example 8-2 (fourth step). The polymer discharged through an end of the extruder was pelletized by means of a cutter.

After the removal of the solvent, the polymer had a residual solvent content of 1500 ppm, a gel content of not greater than 0.2 wt. % and an epoxy equivalent of 285. The results are given in Table 8-1.

Examples 8-4 to 8-6

Polystyrene-polybutadiene-polystyrene block copolymer (SBS, TR-2000 produced by Japan Synthetic Rubber Co., Ltd.) was dissolved in ethyl acetate (first step). An epoxidation reaction was carried out with the use of peracetic acid (second step). The resultant reaction mixture was cooled to room temperature and washed with pure water, thereby obtaining an ethyl acetate solution of epoxidized polystyrene-polybutadiene-polystyrene polymer (ESBS) having properties specified in Table 8-1 (third step).

This solution was fed into a vented twin-screw extruder of 40 mm in outer diameter of screw and 9 in L/D which had such a structure that a heating medium could be passed through the internal part of each screw and which possessed a continuous gas phase zone at the upper part of the inside of the extruder, and evaporation was carried out in a vacuum under the conditions specified in Table 8-1. The results are given in Table 8-1.

Comparative Example 8-1

A block copolymer was obtained in the same manner as in Example 8-1, except that the crude epoxidation reaction mixture was not washed with water in the third step. The obtained resin had a residual solvent content of 620 ppm, a gel content of 5.2 wt. % and an epoxy equivalent of 540. The results are given in Table 8-1.

TABLE 8-1

| | | Properties of soln. | | Operating conditions of evaporator | | Properties of epoxidized block copolymer | | | |
|---|---|---|---|---|---|---|---|---|---|
| | Type of resin | acid value | concn. (wt %) | temp. (°C.) | press. (Torr) | residual solvent (ppm) | gel content (wt %) | epoxy equiv. | condition of surface of molded item |
| Ex. 8-1 | ESBS | 1.0 | 30 | 160 | 100 | 420 | <0.2 | 520 | no foaming |
| Ex. 8-2 | ESBS | 1.0 | 30 | 160 | 100 | 2300 | <0.2 | 520 | no foaming |
| Ex. 8-3 | ESEBS | 1.3 | 22 | 160 | 100 | 1500 | <0.2 | 285 | no foaming |
| Ex. 8-4 | ESBS | 1.0 | 30 | 160 | 50 | 300 | <0.2 | 520 | no foaming |
| Ex. 8-5 | ESBS | 1.0 | 35 | 160 | 100 | 720 | <0.2 | 520 | no foaming |
| Ex. 8-6 | ESBS | 1.0 | 35 | 180 | 100 | 350 | <0.2 | 520 | no foaming |
| Comp. Ex. 8-1 | ESBS | 5.5 | 30 | 160 | 100 | 620 | 5.2 | 540 | fisheye observed |
| Comp. Ex. 8-2 | ESEBS | 5.3 | 20 | 160 | 100 | 1700 | 5.3 | 285 | fisheye observed |
| Comp. Ex. 8-3 | ESBS | 1.0 | 30 | 160 | 620 | 9000 | <0.2 | 530 | amt. of residual solvent was so large that molding failed. |
| Comp. Ex. 8-4 | ESBS | 1.0 | 30 | 310 | 100 | 50 | 50 | 520 | amt. of gel was so large that molding failed. |

Comparative Example 8-2

A block copolymer was obtained in the same manner as in Example 8-3, except that the crude epoxidation reaction mixture was not washed with water in the third step. The obtained resin had a residual solvent content of 1700 ppm, a gel content of 5.3 wt. % and an epoxy equivalent of 285.

Comparative Example 8-3

A block copolymer was obtained in the same manner as in Example 8-1, except that the vent pressure of the extruder was changed to 620 Torr in the fourth step. The obtained resin had a residual solvent content of 9000 ppm. Thus, grave foaming occurred during the molding into a shaped item and no satisfactory molding could be effected.

Comparative Example 8-4

A block copolymer was obtained in the same manner as in Example 8-1, except that the temperature of the extruder was changed to 310° C. in the fourth step. The obtained resin had a residual solvent content of 50 ppm and a gel content of 50 wt. %. Thus, molding could not be effected.

Comparative Example 8-5

Polystyrene-polybutadiene-polystyrene block copolymer (SBS; TR-2000 produced by Japan Synthetic Rubber Co., Ltd.) was dissolved in ethyl acetate (first step). An epoxidation reaction was carried out with the use of peracetic acid (second step). The resultant reaction mixture was cooled to room temperature and washed with pure water, thereby obtaining an ethyl acetate solution of epoxidized polystyrene-polybutadiene-polystyrene polymer (ESBS) (concentration: 2 wt. %, third step). The acid value of this solution was 1.0 mgKOH/g.

This solution was fed into a vented twin-screw extruder of 40 mm in outer diameter of screw and 9 in L/D which had such a structure that a heating medium could be passed through the internal part of each screw and which possessed a continuous gas phase zone at the upper part of the inside of the extruder. However, the viscosity of the solution was so low that the solution leaked out through the die hole of the extruder, thereby disenabling evaporating off the solvent in vacuum.

Comparative Example 8-6

Polystyrene-polybutadiene-polystyrene block copolymer (SBS; TR-2000 produced by Japan Synthetic Rubber Co., Ltd.) was dissolved in ethyl acetate to thereby obtain an organic solvent solution containing 60 wt. % block copolymer (first step). Thereafter, an epoxidation reaction was carried out with the use of peracetic acid (second step). However, the viscosity of the solution was so high that peracetic acid could not homogeneously dispersed in the solution, thereby causing local heat buildup. Thus, continuation of the operation was difficult.

We claim:

1. A process for producing an epoxidized block copolymer, which comprises the steps of:

(1) mixing a block copolymer (C) comprising a polymer block (A) composed mainly of a vinyl aromatic hydrocarbon compound and a polymer block (B) composed mainly of a conjugated diene compound, or a hydrogenation product (D) of the block copolymer (C), with an organic solvent so as to obtain an organic solvent solution or organic solvent slurry having a polymer concentration of 5 to 50% by weight;

(2) epoxidizing unsaturated carbon bonds contained in a polymer block (B) composed mainly of a conjugated diene compound with use of an epoxidizing agent that is an acetic ester solution of peracetic acid, not containing water in the organic solvent solution or organic solvent slurry to thereby obtain a reaction mixture; and (3) evaporating off the organic solvent from the reaction mixture to thereby obtain an epoxidized block copolymer.

2. The process according to claim 1, wherein the epoxidation reaction mixture obtained in the step (2) in the form of a solution or slurry is washed with water and/or neutralized so that the acid value of the solution or slurry may not exceed 5 mgKOH/g prior to being fed to the step (3).

3. The process according to claim 1 or 2, wherein the obtained epoxidized block copolymer meets at least one of the following requisites (1), (2) and (3):

(1) a molar ratio (R) of contained hydroxyl to epoxy ranging from 0.001 to 0.1, said molar ratio (R) being represented by the formula:

$R=(\text{hydroxyl})/(\text{epoxy})$ wherein "(hydroxyl)" represents the amount, in terms of the number of moles, of hydroxyl contained per unit weight of the epoxidized block copolymer and "(epoxy)" represents the amount, in terms of the number of moles, of epoxy contained per unit weight of the epoxidized block copolymer;

(2) a gel content of not greater than 5% by weight; and (3) a chloride ion content of not greater than 7 ppm.

4. The process according to claim 1 or 2, wherein the epoxidation reaction mixture is fed into an evaporator in the step (3) to thereby directly evaporate off the organic solvent.

5. The process according to claim 1 or 2, wherein the epoxidation reaction mixture is fed into an evaporator in the step (3) to thereby evaporate the organic solvent so that the epoxidation reaction mixture is concentrated and the concentrate is fed into a kneading evaporator to thereby remove the organic solvent.

6. The process according to claim 1 or 2, wherein the epoxidation reaction mixture is fed into a thin-film evaporator in the step (3) to thereby evaporate the organic solvent so that the epoxidation reaction mixture is concentrated and the concentrate is fed into a vented twin-screw extruder as one type of kneading evaporator to thereby remove the organic solvent.

7. The process according to claim 5, wherein each of the evaporator and kneading evaporator in the step (3) is at a temperature of 80° to 300° C. and an internal pressure of not greater than 500 Torr.

8. The process according to claim 1 or 2, wherein a phenolic stabilizer and/or a phosphorous stabilizer is added to the epoxidation reaction mixture and the organic solvent is directly evaporated off from the epoxidation reaction mixture.

9. The process according to claim 1 or 2, wherein a phenolic stabilizer and/or a phosphorous stabilizer is added in the step (3) to the epoxidation reaction mixture in an amount of 0.005 to 5 parts by weight per 100 parts by weight of the finally obtained epoxidized block copolymer and the organic solvent is removed from the epoxidation reaction mixture.

10. The process according to claim 1 or 2, wherein the epoxidation reaction mixture in the form of a solution or slurry is quantitatively fed in the step (3) into an evaporator; then a phenolic stabilizer and/or a phosphorous stabilizer is added to the epoxidation reaction mixture in an amount of 0.005 to 10 parts by weight per 100 parts by weight of the finally obtained epoxidized block copolymer; and the organic solvent is removed from the epoxidation reaction mixture.

11. The process according to claim 1 or 2, wherein the epoxidation reaction mixture is fed in the step (3) into a vented twin-screw extruder as one type of evaporator.

12. The process according to claim 11, wherein the vented twin-screw extruder has such a structure that a heating medium can be passed through the internal part of each screw.

* * * * *